(12) United States Patent
Zhang et al.

(10) Patent No.: US 12,137,471 B2
(45) Date of Patent: Nov. 5, 2024

(54) INFORMATION TRANSMISSION METHOD AND APPARATUS

(71) Applicant: ZTE CORPORATION, Shenzhen (CN)

(72) Inventors: Shujuan Zhang, Shenzhen (CN); Chuangxin Jiang, Shenzhen (CN); Zhaohua Lu, Shenzhen (CN); Wusheng Xie, Shenzhen (CN); Wei Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 573 days.

(21) Appl. No.: 17/266,990

(22) PCT Filed: Aug. 8, 2019

(86) PCT No.: PCT/CN2019/099861
§ 371 (c)(1),
(2) Date: Feb. 8, 2021

(87) PCT Pub. No.: WO2020/030064
PCT Pub. Date: Feb. 13, 2020

(65) Prior Publication Data
US 2021/0314955 A1  Oct. 7, 2021

(30) Foreign Application Priority Data
Aug. 8, 2018  (CN) .......................... 201810899188.6

(51) Int. Cl.
*H04W 72/04* (2023.01)
*H04W 72/0446* (2023.01)
(Continued)

(52) U.S. Cl.
CPC ....... *H04W 72/53* (2023.01); *H04W 72/0446* (2013.01); *H04W 72/0453* (2013.01); *H04W 72/23* (2023.01)

(58) Field of Classification Search
CPC ..................... H04W 72/0493; H04W 72/0453
See application file for complete search history.

(56) References Cited

U.S. PATENT DOCUMENTS 10,863,511 B2 * 12/2020 Cheng ..................... H04W 8/24
2018/0049166 A1    2/2018 Sun et al.
(Continued)

FOREIGN PATENT DOCUMENTS

CN    105099634 A    11/2015
CN    107306147 A    10/2017
(Continued)

OTHER PUBLICATIONS

3GPP TS 38.331 V15.1.0 Technical Specification; Technical Specification Group Radio Access Network; NR; Radio Resource Control (RRC) protocol specification (Release 15); Mar. 2018 (271 pages).
(Continued)

*Primary Examiner* — Zhiren Qin
(74) *Attorney, Agent, or Firm* — Foley & Lardner LLP

(57) ABSTRACT

Provided are information transmission method and apparatus. The information transmission method includes that: D control channel resource groups are determined, control information is detected in the D control channel resource groups, and transmission of a channel and/or signal is performed according to control information which is detected.

12 Claims, 13 Drawing Sheets

(51) Int. Cl.
*H04W 72/0453* (2023.01)
*H04W 72/23* (2023.01)
*H04W 72/53* (2023.01)

(56) References Cited

U.S. PATENT DOCUMENTS

| | | | |
|---|---|---|---|
| 2018/0124687 A1 | 5/2018 | Park et al. | |
| 2018/0262313 A1* | 9/2018 | Nam | H04L 5/0044 |
| 2018/0323830 A1* | 11/2018 | Park | H04L 25/02 |
| 2019/0141693 A1* | 5/2019 | Guo | H04W 72/1268 |
| 2019/0159209 A1* | 5/2019 | Xiao | H04W 28/06 |
| 2019/0229792 A1* | 7/2019 | John Wilson | H04L 5/0051 |
| 2019/0239093 A1* | 8/2019 | Zhang | H04L 5/001 |
| 2020/0067735 A1* | 2/2020 | Gao | H04B 7/0417 |
| 2021/0399769 A1* | 12/2021 | Park | H04L 5/005 |

FOREIGN PATENT DOCUMENTS

| | | |
|---|---|---|
| CN | 107370586 A | 11/2017 |
| CN | 107733609 A | 2/2018 |
| EP | 3 793 239 A1 | 3/2021 |
| WO | WO-2018/031664 A1 | 2/2018 |
| WO | WO-2018/121621 A1 | 7/2018 |
| WO | WO-2018/044114 A | 8/2018 |

OTHER PUBLICATIONS

ETRI, "PDCCH design for multi-beam operation," 3GPP TSG RAN WG1 Meeting #91; R1-1720231; Reno, USA; Nov. 27-Dec. 1, 2017 (6 pages).

Huawei, et al., "Multiple NR-PDCCH for Multiple TRP transmission," 3GPP TSG RAN WG1 Meeting #90; R1-1712230; Prague, Czech Republic; Aug. 21-25, 2017 (4 pages).

Office Action for KR App. No. 10-2021-7007016 dated Jun. 25, 2024 (with English translation, 9 pages).

Extended European Search Report for EP Appl. No. 19846887.8, dated Apr. 8, 2022 (11 pages).

Nokia et al., "Summary of AI 6.1.2.3.7 QCL" 3GPP TSG RAN WG1 #90, R1-1715074, Aug. 25, 2017, Prague, Czech Republic (13 pages).

Nokia et al., "Summary of QCL" 3GPP TSG RAN WG1 Meeting AH 1801, R1-1801054, Jan. 26, 2018, Vancouver, Canada (25 pages).

Qualcomm Incorporated, "Discussion on QCL" 3GPP TSG RAN WG1 #90, R1-1713414, Aug. 25, 2017, Prague, Czech (5 pages).

First Office Action for CN Appl. No. 202210304202.X dated Sep. 14, 2023 (with English translation, 18 pages).

Guangdong Oppo Mobile Telecom, "Bandwidth part configuration and frequency resource allocation", 3GPP TSG RAN WG1 NR Ad-Hoc#2, R1-1710164, Qingdao, P.R. China, Jun. 30, 2017 (6 pages).

International Search Report for Application No. PCT/CN2019/099861, dated Oct. 28, 2019, 5 pages including English translation.

NTT Docomo, Inc., "Remaining Issues on Beam Management", 3GPP TSG RAN WG1 Meeting #90 R1-1713964, Aug. 25, 2017 (Aug. 25, 2017).

Samsung, "PUCCH Resource Configuration for Bandwidth Restricted Ue", 3GPP TSG RAN WG1 Meeting #90 R1-1714539, Aug. 25, 2017 (Aug. 25, 2017).

* cited by examiner

INFORMATION TRANSMISSION METHOD AND APPARATUS

CROSS-REFERENCE TO RELATED APPLICATIONS

This is a National Stage Application filed under 35 U.S.C. 371 based on International Patent Application No. PCT/CN2019/099861, filed on Aug. 8, 2019, which claims priority to Chinese Patent Application No. 201810899188.6 filed on Aug. 8, 2018, the disclosures of both of which are incorporated herein by reference in their entireties.

TECHNICAL FIELD

The present disclosure relates to, but is not limited to, the technical field of communications and, specifically, relates to, but is not limited to, information transmission and monitoring methods and apparatuses, a base station, a terminal and a storage medium.

BACKGROUND

As a core technology of communications, the multiple input multiple output (MIMO) technology can greatly improve the spectrum utilization. One core technology of the new radio access technology (NR) is the beam-based communication. The beam communication can reduce interference and enhance coverage. However, since the beam communication is not a full-coverage communication, the robustness of the beam communication is not great.

When multiple transmission and reception points (TRPs) are used for serving one terminal, the physical positions of the multiple TRPs are usually at a certain distance from each other. Therefore, if the diversity of paths from TRPs to the terminal is ensured, the spectrum efficiency can be effectively improved and the communication robustness can be greatly enhanced.

However, how to effectively support multiple TRPs to serve one terminal in a beam mechanism and, in particular, when there is no ideal backhaul (signal tunnel) among the multiple TRPs and the multiple TRPs independently scheduled, how to effectively support multiple TRPs to serve one terminal in a beam mechanism have become urgent problems to be solved.

SUMMARY

Embodiments of the present disclosure provide information transmission and monitoring methods and apparatuses, a base station, a terminal and a storage medium, to solve the problem of how to effectively support that multiple TRPs provide one terminal with effective services in a beam mechanism.

An embodiment of the present disclosure provides an information transmission method. The method includes: determining D control resource set (CORESET) groups in one BWP, detecting control information in the D CORESET groups, and performing transmission of a channel according to control information which is detected. D is a positive integer, and the transmission of the channel comprises sending of the channel or receiving of the channel.

In an embodiment of the present disclosure, the method further includes: determining a first resource, determining the number H of resource groups included in the first resource; and performing transmission of a channel on the first resource according to the H, where transmission of the channel comprises sending of the channel or receiving of the channel. The H resource groups correspond to H sets of configuration information of the channel. The first resource includes a frequency domain resource.

In an embodiment of the present disclosure, the method further includes: determining, by a first communication node, one or more physical downlink control channel (PDCCH) candidates to be monitored in one time unit according to the D COERSET groups; and monitoring control information on the determined one or more PDCCH candidates.

An embodiment of the present disclosure further provides an information transmission apparatus. The apparatus includes a first determination module and a first transmission module.

The first determination module is configured to determine D CORESET groups, and the first transmission module is configured to detect control information in the D CORESET groups and perform transmission of a channel according to control information which is detected. D is a positive integer, and the transmission of the channel comprises sending of the channel or receiving of the channel.

In an embodiment of the present disclosure, the apparatus further includes a second determination module and a second transmission module.

The second determination module is configured to determine a first resource and determine the number H of resource groups included in the first resource. The second transmission module is configured to perform transmission of a channel on the first resource according to the H, where transmission of the channel comprises sending of the channel or receiving of the channel. The H resource groups correspond to H sets of configuration information of the channel. The first resource includes a frequency domain resource.

According to the information transmission method and apparatus provided in the embodiments of the present disclosure, the D CORESET groups in one BWP are determined, the control information is detected in the D CORESET groups, and transmission of the channel and/or signal is performed according to control information which is detected. Thus, when multiple TRPs and/or terminals all transmit information in this way, it can be effectively supported that the multiple TRPs provide one terminal with effective services in a beam mechanism.

In addition, in the embodiments of the present disclosure, the first resource is determined, the number H of resource groups included in the first resource is determined, and the channel is transmitted on the first resource according to H. The H resource groups correspond to the H sets of configuration information of the channel. The first resource includes the frequency domain resource. Thus, when multiple TRPs and/or terminals transmit information in this way, it can be effectively supported that the multiple TRPs provide one terminal with effective services in a beam mechanism, and meanwhile, the complexity of blind detections of control channels by the terminal can be reduced and the signaling overheads can be effectively saved.

In addition, in the embodiments of the present disclosure, the first communication node determines the one or more PDCCH candidates to be monitored in the one time unit according to the D COERSET groups; and further, the control information is monitored on the determined one or more PDCCH candidates. Therefore, when multiple TRPs serve a terminal in a beam mechanism, it is ensured that the terminal which has a limited capability can monitor control channels sent by multiple TRPs or control channels sent by only a part of the TRPs. In this way, it is effectively supported that the multiple TRPs provide the one terminal with effective services in a beam mechanism.

DETAILED DESCRIPTION

Embodiments of the present disclosure are described in detail with reference to drawings. However, the concept of the present disclosure may be embodied in many different forms, and should not be construed as being limited to the embodiments illustrated herein. On the contrary, these embodiments are provided to make the present disclosure thorough and complete and fully convey the concept range of the present disclosure to those have ordinary skill in the art. Throughout the above description and drawings, the same reference numbers and numerals represent the same or similar elements.

It is to be understood that although the terms first, second and the like may be used herein to describe elements or operations, these elements or operations should not be limited by these terms. These terms are only used to distinguish one element or operation from another element or operation. For example, a first condition may be referred to as a second condition, and similarly, a second condition may be referred to as a first condition, without departing from the teachings of the present disclosure.

The terms used herein are for describing particular embodiments and not intended to limit the concept of the present disclosure. As used herein, a singular form "a" "an" and "the" is intended to include a plural form, unless otherwise clearly indicated in the context. It is to be further understood that the term "including" or "comprising" used in the specification specifies the existence of the described features, regions, parts, steps, operations, elements, and/or components, without excluding the existence or addition of one or more other features, regions, parts, steps, operations, elements, components, and/or combinations thereof.

Unless otherwise defined, all the terms (including technical and scientific terms) used herein have the same meanings as those commonly understood by those have ordinary skill in the art to which the present disclosure pertains. It is to be further understood the terms, such as those defined in commonly used dictionaries, should be interpreted as having meanings consistent with their meanings in the context of the related art and/or the present disclosure, and will be interpreted in an idealized or overly formal sense unless expressly so defined herein.

The embodiments of the present disclosure are further described below in detail in conjunction with the drawings and specific implementations.

Embodiment One

Figure 1:
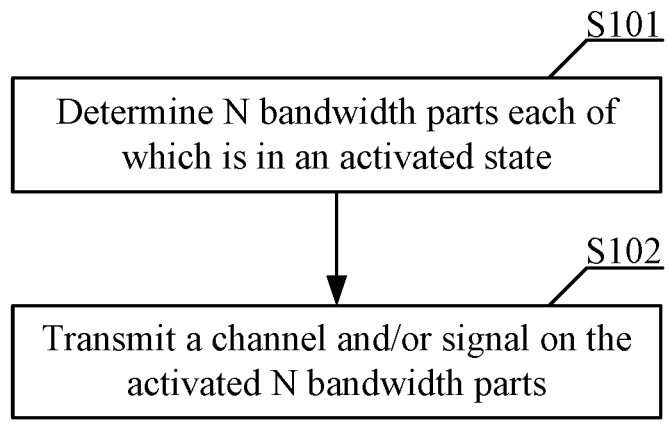
FIG. 1 is a flowchart of an information transmission method according to embodiment one of the present disclosure.
Figure 2:
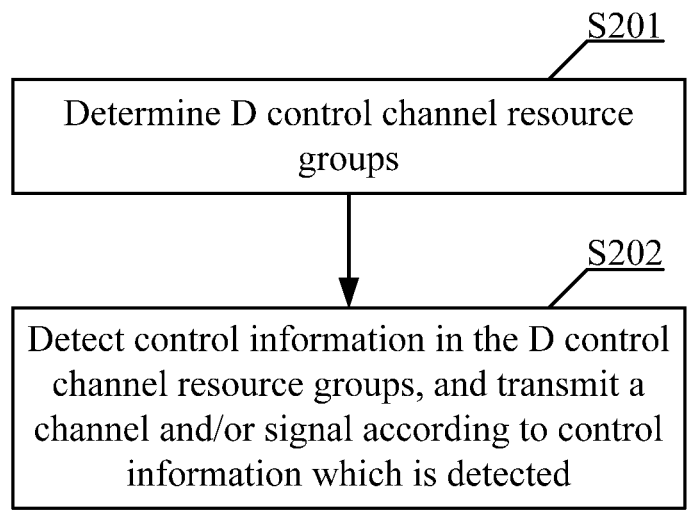
FIG. 2 is a flowchart of another information transmission method according to embodiment one of the present disclosure.

Referring to FIGS. 1 and 2, FIGS. 1 and 2 are flowcharts of information transmission methods provided in embodiment one of the present disclosure. The information transmission methods in this embodiment may be applied to a terminal or a TRP (for example, a base station).

The information transmission method shown in FIG. 1 includes the steps described below.

In step S101, N bandwidth parts each of which is in an activated state are determined.

It is to be understood that, in this embodiment, the terminal and/or the TRP may select N bandwidths meeting a predetermined requirement from all BWPs and activate the N bandwidths, to determine the N BWPs each of which is in an activated state. Alternatively, the terminal and/or the TRP agrees that N bandwidth parts each of which is in an activated state need to meet an agreed requirement.

In step S102, a channel and/or signal is transmitted on the N activated bandwidth parts.

It is to be understood that in this embodiment, the transmitted channel essentially refers to a channel signal. For example, the transmission of a control channel is essentially the transmission of a control channel signal.

The information transmission method shown in FIG. 2 includes the steps described below.

In step S201, D control channel resource groups are determined.

It is to be understood that in this embodiment, the terminal and/or the TRP may select D control channel resource groups meeting a predetermined requirement from all control channel resource groups.

In step S202, control information is detected in the D control channel resource groups, and a channel and/or signal is transmitted according to control information which is detected.

It is further to be understood that in this embodiment, the step of transmitting the channel and/or signal includes sending the channel and/or signal, and/or receiving the channel and/or signal.

It is to be noted that the two information transmission methods shown in FIGS. 1 and 2 may be adopted at the same time or one of them is adopted.

In the information transmission methods provided in this embodiment, at least one of the features described below is to be satisfied.

Feature 1: The N bandwidth parts satisfy a first-type predetermined condition.

Feature 2: The D control channel resource groups satisfy a second-type predetermined condition.

Feature 3: N bandwidth parts triggered by control information in different control channel resource groups of the D control channel resource groups satisfy the first-type predetermined condition.

Feature 4: D1 types of channels and/or signals satisfy a third-type predetermined condition.

It is to be noted that different types of channels and/or signals of the D1 types of channels and/or signals satisfy at least one of the following features: different types of channels and/or signals belonging to different bandwidth parts of the N bandwidth parts; different types of channels and/or signals being scheduled by control information in different control channel resource groups of the D control channel resource groups; different types of channels and/or signals belonging to different component carriers; or different types of channels and/or signals being associated with different group information identifiers; where D1 is a positive integer.

Particularly, it is to be noted that if different types of channels and/or signals are divided according to different bandwidth parts, then each bandwidth part corresponds to a respective type of channels or signals. Therefore, D1 may be less than or equal to N in this embodiment.

In this embodiment, the signals include one or more of the following signals: a reference signal, a synchronization signal, a random access signal, a phase-tracking signal or the like. The channels include one or more of the following channels: a control channel, a data channel, a random access channel or the like.

In this embodiment, one signal belongs to only one bandwidth part. In the N bandwidth parts, signals in different bandwidth parts are different.

In this embodiment, the first-type predetermined condition includes at least one of the conditions described below.

Condition 11: The N bandwidth parts belong to one CC.

Condition 12: An overlap exists between frequency domain resources occupied by two bandwidth parts of the N bandwidth parts.

It is to be noted that in this embodiment, the overlap may be a complete overlap or a partial overlap. In the case of the complete overlap, a difference set of the frequency domain resources occupied by the two bandwidth parts is empty. In the case of the partial overlap, a difference set of the frequency domain resources occupied by the two bandwidth parts is nonempty.

Condition 13: Frequency domain spacing between two bandwidth parts of the N bandwidth parts satisfies a fourth-type predetermined condition.

In this embodiment, the fourth-type predetermined condition includes at least one of conditions 131 to 134 described below.

Condition 131: Among the two bandwidth parts, spacing between the highest frequency domain position of a low frequency domain bandwidth part and the lowest frequency domain position of a high frequency domain bandwidth part is less than or equal to a first predetermined threshold.

Condition 132: Among the two bandwidth parts, spacing between the lowest frequency domain position of a low frequency domain bandwidth part and the highest frequency domain position of a high frequency domain bandwidth part is less than or equal to a second predetermined threshold.

Condition 133: Among the two bandwidth parts, spacing between the highest frequency domain position of a low frequency domain bandwidth part and the lowest frequency domain position of a high frequency domain bandwidth part is greater than a third predetermined threshold.

Condition 134: Among the two bandwidth parts, spacing between the lowest frequency domain position of a low frequency domain bandwidth part and the highest frequency domain position of a high frequency domain bandwidth part is greater than a fourth predetermined threshold.

It is to be noted that the first predetermined threshold, the second predetermined threshold, the third predetermined threshold and the fourth predetermined threshold above may be preset by an engineer according to actual needs or after a large number of experimental analyses. The first predetermined threshold may be less than the second predetermined threshold, and the third predetermined threshold may be less than the fourth predetermined threshold. Meanwhile, the first predetermined threshold may be greater than the third predetermined threshold, and the second predetermined threshold may be greater than the fourth predetermined threshold.

Condition 14: A union of the N bandwidth parts is a subset of a predetermined bandwidth part.

Condition 15: A sub-carrier spacing configuration of the N bandwidth parts satisfies a fifth-type predetermined condition.

In this embodiment, the fifth-type predetermined condition may be that: the number of different pieces of sub-carrier spacing in the N bandwidth parts is less than or equal to N1, where N1 is a positive integer less than or equal to N.

For example, in the N bandwidth parts, each bandwidth part needs to be configured with a respective piece of sub-carrier spacing. In this case, the number of different sub-carriers configured for the N bandwidth parts should be less than or equal to N1.

Condition 16: Cyclic prefixes of the N bandwidth parts satisfy a sixth-type predetermined condition.

In this embodiment, the sixth-type predetermined condition may be that: the number of different types of cyclic prefixes in the N bandwidth parts is less than or equal to N2, where N2 is a positive integer less than or equal to N.

For example, in the N bandwidth parts, each bandwidth part needs to be configured with a respective type of cyclic prefix, but the number of different types of cyclic prefixes configured for the N bandwidth parts should be less than or equal to N2.

Condition 17: Slot structure indication information of the N bandwidth parts satisfies a seventh-type predetermined condition.

In this embodiment, the seventh-type predetermined condition may include at least one of conditions 171 to 173 described below.

Condition 171: The N bandwidth parts comply with the same piece of slot structure indication information.

It is to be noted that in this embodiment, the slot structure indication information includes a slot format indicator (SFI), and a slot structure notified through high layer common information tdd-UL-DL-ConfigurationCommon, tdd-UL-DL-ConfigurationCommon2, or dedicated signaling tdd-UL-DL-ConfigDedicated. The specific meanings of these pieces of signaling can refer to protocols 38.331 and 38.213.

Condition 172: An intersection of a resource occupied by a downlink transmission domain of one bandwidth part of the N bandwidth parts and a resource occupied by an uplink transmission domain of another bandwidth part of the N bandwidth parts is empty.

Here, it is to be noted that, specifically, in the N bandwidth parts, an intersection of a resource occupied by a downlink transmission domain of one bandwidth part and a resource occupied by an uplink transmission domain of any one bandwidth part of the remaining (N−1) bandwidth parts is empty. Alternatively, in the N bandwidth parts, an intersection of a resource occupied by a downlink transmission domain of one bandwidth part and a resource occupied by an uplink transmission domain of at least one bandwidth part of the remaining (N−1) bandwidth parts is empty.

Condition 173: An intersection of a resource occupied by a reserved domain of one bandwidth part of the N bandwidth parts and a resource occupied by a transmission domain of a channel and/or signal of another bandwidth part of the N bandwidth parts is empty.

Here, it is to be noted that, specifically, in the N bandwidth parts, an intersection of a resource occupied by a reserved domain of one bandwidth part and a resource occupied by a transmission domain of a channel and/or signal of any one bandwidth part of the remaining (N−1) bandwidth parts is empty. Alternatively, in the N bandwidth parts, an intersection of a resource occupied by a reserved domain of one bandwidth part and a resource occupied by a transmission domain of a channel and/or signal of at least one bandwidth part of the remaining (N−1) bandwidth parts is empty.

It is further to be noted that in this embodiment, the two bandwidth parts of the N bandwidth parts may be any two bandwidth parts of the N bandwidth parts, or two specific bandwidth parts of the N bandwidth parts. For example, the N bandwidth parts are bandwidth parts {1, 2, 3}, and the two bandwidth parts of the N bandwidth parts include bandwidth parts {1, 2}. Alternatively, the two bandwidth parts of the N bandwidth parts are a combination of all different bandwidth parts of the N bandwidth parts. For example, the two bandwidth parts include bandwidth parts {1, 2}, bandwidth parts {1, 3} and bandwidth parts {2, 3}.

In this embodiment, the second-type predetermined condition includes at least one of the conditions described below.

Condition 21: An intersection of resources occupied by the D control channel resource groups is empty.

Condition 22: Multiple pieces of control information in the D control channel resource groups need to satisfy a preset condition.

For example, different pieces of control information in the D control channel resource groups indicates that channels or signals on the same resource have the same transmission direction. The transmission direction includes a downlink transmission and an uplink transmission.

Condition 23: Multiple pieces of indicator information of bandwidth parts that are each in an activated state in the same time unit and indicated by control information in different control channel resource groups of the D control channel resource groups need to satisfy a preset agreed condition.

In this embodiment, the preset agreed condition includes that the bandwidth parts that are each in an activated state in the same time unit and indicated by the control information in different control channel resource groups are the same.

Condition 24: The number of bits included in a bandwidth part indicator field in control information in D2 control channel resource groups is determined according to the number of bandwidth parts configured in a component carrier.

Condition 25: The number of bits included in a bandwidth part indicator field in control information in D3 control channel resource groups is not determined according to the number of bandwidth parts configured in a component carrier.

The D2 control channel resource groups and the D3 control channel resource groups belong to the D control channel resource groups. D2 and D3 are each an integer less than or equal to D, and/or the sum of D2 and D3 is equal to the value of D.

In this embodiment, the third-type predetermined condition includes at least one of the conditions described below.

Condition 31: An association relationship exists among parameter configurations of the D1 types of channels and/or signals.

Condition 32: The sum of transmit power of the D1 types of channels and/or signals does not exceed a predetermined first threshold.

Condition 33: The sum of receive power of the D1 types of channels and/or signals does not exceed a predetermined second threshold.

Condition 34: When the sum of transmit power of the D1 types of channels and/or signals exceeds a predetermined power value, power priorities of the D1 types of channels and/or signals are determined according to signaling information and/or an agreed rule.

Condition 35: When the sum of transmit power of the D1 types of channels and/or signals exceeds a predetermined power value, a power scaling weight of each type of channels and/or signals of the D1 types of channels and/or signals is determined according to signaling information and/or an agreed rule.

Condition 36: An intersection of different bandwidth parts corresponding to the D1 types of channels and/or signals is nonempty.

Condition 37: An overlap exists among resources occupied by the D1 types of channels and/or signals.

Condition 38: When an overlap exists among resources occupied by two types of channels and/or signals of the D1 types of channels and/or signals, the two types of channels and/or signals have the same transmission direction.

It is to be noted that the transmission direction includes a downlink transmission and an uplink transmission (that is, reception and sending).

Condition 39: An intersection of resources occupied by the D1 types of synchronization signals is empty.

It is to be understood that in this embodiment, the resource includes at least one of a time domain resource, a frequency domain resource, a code domain resource, a spatial domain resource, a port resource or an antenna resource.

It is further to be understood that when different types of channels and/or signals of the D1 types of channels and/or signals belong to different bandwidth parts of the N bandwidth parts, the third-type predetermined condition may include at least one of the conditions described below.

Condition 40: An intersection of resources occupied by control channels in different bandwidth parts of the N bandwidth parts is empty.

Condition 41: An intersection of resources occupied by reference signal sets in different bandwidth parts of the N bandwidth parts is empty.

It is to be noted that, the D1 types of channels and/or signals satisfy the third-type predetermined condition in at least one of the cases described below.

When an intersection of D1 bandwidth parts is nonempty, the D1 types of channels and/or signals may satisfy the third-type predetermined condition. Each bandwidth part of the D1 bandwidth parts includes one type of channels and/or signals of the D1 types of channels and/or signals.

It is to be noted that when the intersection of the D1 bandwidth parts is nonempty, the D1 types of channels and/or signals may not satisfy the third-type predetermined condition.

It is further to be noted that since types of channels and/or signals in different bandwidth parts are different, the D1 bandwidth parts are bandwidth parts corresponding to the D1 types of channels and/or signals.

When an overlap exists among resources occupied by the D1 types of channels and/or signals, the D1 types of channels and/or signals may satisfy the third-type predetermined condition.

It is to be noted that when no overlap exists among resources occupied by the D1 types of channels and/or signals, the D1 types of channels and/or signals may not satisfy the third-type predetermined condition.

It is to be noted that in this embodiment, the association relationship existing between the parameter configurations of the two signals represents at least one of the following features that: 1. a parameter configuration of one signal may be obtained according to a parameter configuration of another signal; 2. certain parameter combinations of two signals are not desired to occur simultaneously (for example, when parameter 1 of a first signal is configured to a first value, parameter 2 of a second signal is not desired to be configured to a second value, where parameter 1 and parameter 2 may be the same type of parameters, or different types of parameters); or 3. a parameter configuration range of one signal may be obtained according to a parameter configuration of another signal.

In this embodiment, when the association relationship exists among the parameter configurations of the D1 types of channels and/or signals, the association relationship includes at least one of the relationships described below.

Relationship 1: A parameter configuration value of one type of channels and/or signals of the D1 types of channels and/or signals is obtained according to a parameter configuration value of another type of channels and/or signals of the D1 types of channels and/or signals.

Relationship 2: A parameter configuration value range of one type of channels and/or signals of the D1 types of channels and/or signals is obtained according to a parameter configuration value of a certain type of channels and/or signals of the D1 types of channels and/or signals.

It is to be noted that the certain type of channels and/or signals of the D1 types of channels and/or signals may be any type of channels and/or signals of the D1 types of channels and/or signals, or a certain dedicated type of channels and/or signals of the D1 types of channels and/or signals.

Relationship 3: In the D1 types of channels and/or signals, parameters which are in different types of channels and/or signals and belong to a first predetermined parameter type set have the same configuration.

Relationship 4: In the D1 types of channels and/or signals, parameters which are in different types of channels and/or signals and belong to a second predetermined parameter type set have different configuration values.

It is to be noted that the second predetermined parameter type set includes a spatial domain parameter. A spatial domain parameter of a channel and/or signal is represented by a reference signal. A spatial transmit filter parameter and/or spatial receive filter parameter of a channel and/or signal is acquired according to a spatial transmit filter parameter and/or spatial receive filter parameter of a reference signal.

Relationship 5: In the D1 types of channels and/or signals, agreed combination values of parameters which are in different types of channels and/or signals and belong to a third predetermined parameter type set are unable to occur simultaneously.

It is to be noted that in this embodiment, an agreed combination represents one parameter type. When a first type of channels and/or signals is configured to value A, a configuration value of a second type of channels and/or signals cannot be B. A combination configuration is composed of a configuration of the parameter type in the first type of channels and/or signals and a configuration of the parameter type in the second type of channels and/or signals.

Relationship 6: Divisions of precoding resource groups associated with different types of channels and/or signals are aligned.

Here, it is to be noted that the alignment represents that one precoding group in a first bandwidth part includes one precoding group in a second bandwidth part, and/or one precoding group in the second bandwidth part includes one precoding group in the first bandwidth part.

Relationship 7: An intersection of the resources occupied by the D1 types of channels and/or signals is nonempty.

Relationship 8: The D1 types of channels and/or signals are located in the same time unit.

It is to be noted that in this embodiment, the first predetermined parameter configuration includes at least one of the following: sub-carrier spacing information, cyclic shift length information, time domain information of a demodulated reference signal, sequence information of a demodulated reference signal, time domain configuration information corresponding to a control channel signal, information about whether transmission precoding is enabled, a scrambling sequence generation parameter of a reference signal, a synchronization signal, a slot structure configuration or a measurement reference signal configuration.

The second predetermined parameter type set includes at least one of the following: a spatial domain parameter of a channel and/or signal, or a scrambling sequence generation parameter of a channel.

The third predetermined parameter type set includes a spatial domain parameter of a channel and/or signal.

It is further to be noted that in this embodiment the parameter includes at least one of the following: sub-carrier spacing information, cyclic shift length information, time domain information of a demodulated reference signal, sequence information of a demodulated reference signal, time domain configuration information corresponding to a control channel signal, information about whether transmission precoding is enabled, a synchronization signal, a measurement reference signal or a slot structure indication.

That is, when the parameter includes at least one of the above, an association relationship may exist among parameter configurations.

In this embodiment, the N bandwidth parts may satisfy at least one of the features described below.

Feature 21: At least one bandwidth part of the N bandwidth parts is in a periodic activated state. A period of the periodic activated state is greater than or equal to one time unit.

In this embodiment, the periodic activated state refers to that a bandwidth part is automatically in an activated state in time units having periodic spacing according to a set period. For example, there are time units [1-10] having a period of 2 (that is, there are two time units in each period), and a bandwidth part is activated in the first time unit in each period. That is, the bandwidth part is activated in time units 1, 3, 5, 7 and 9, and is not activated in time units 2, 4, 6, 8 and 10.

Feature 22: At least one bandwidth part of the N bandwidth parts is in a semi-persistent activated state.

Here, it is to be noted that the semi-persistent activated state refers to that the bandwidth part controls, according to received signaling, whether the bandwidth part is in an activated state or a non-activated state. It is further to be noted that in the semi-persistent activated state, the bandwidth part being in an activated state essentially refers to that the bandwidth part is automatically in a periodic activated state.

Feature 23: At least one primary bandwidth part exists in the N bandwidth parts.

Feature 24: At least one secondary bandwidth part exists in the N bandwidth parts.

It is to be noted that in this embodiment, when a primary bandwidth part and/or secondary bandwidth part exists in the N bandwidth parts, the bandwidth parts should satisfy at least one of the features described below.

Feature 31: A channel and/or signal scheduled by a control channel of the primary bandwidth part is in the secondary bandwidth part.

Feature 32: The primary bandwidth part is in a time unit set in an activated state. The minimum spacing between time units is less than or equal to a predetermined spacing value.

Feature 33: Time units where the primary bandwidth part is located are consecutive.

Feature 34: At least one primary bandwidth part exists in one time unit.

Feature 35: At least one primary bandwidth part exists in a time unit except for a time slot where the primary bandwidth part is switched.

Feature 36: The secondary bandwidth part is in an activated state periodically. One period of the secondary bandwidth part includes one or more time units.

Feature 37: The primary bandwidth part includes a common control channel.

Feature 38: The secondary bandwidth part includes no common control channel.

Feature 39: The secondary bandwidth part includes only a dedicated control channel.

Feature 310: The secondary bandwidth part is in a semi-persistent activated state. The secondary bandwidth part is in an activated state periodically after activated. One period of the secondary bandwidth part includes one or more time units.

Feature 311: The secondary bandwidth part includes no control channel.

Feature 312: A period and/or period offset of the secondary bandwidth part in an activated state is determined according to a predetermined rule or received signaling information.

Feature 313: The primary bandwidth part and the secondary bandwidth part of the N bandwidth parts are determined according to a predetermined rule or received signaling information.

For example, it is determined which bandwidth part is a primary bandwidth part and which bandwidth part is a secondary bandwidth part through a BWP identifier (ID). For example, a bandwidth part with the minimum ID is the primary bandwidth part, and a bandwidth part with the maximum ID is the secondary bandwidth part.

Feature 314: When a CC to which the N bandwidth parts belong is a primary CC of one CC group, the primary bandwidth part exists in the N bandwidth parts.

It is to be noted that in this embodiment, the primary CC of one CC group represents a primary cell (PCell) in a master cell group (MCG), and/or a primary secondary cell (PSCell) (that is, a primary cell in the SCG) in a secondary cell group (SCG).

Feature 315: When a CC to which the N bandwidth parts belong is a secondary CC of one CC group, the N bandwidth parts are all secondary bandwidth parts.

For example, there is certainly a primary bandwidth part in the PCell in the MCG, and there may be no primary bandwidth part in other CCs in the MCG. There is certainly a primary bandwidth part in the PSCell in the SCG, and there may be no primary bandwidth part in other CCs in the SCG.

Feature 316: When a CC to which the N bandwidth parts belong is an activated CC, the primary bandwidth part exists in the N bandwidth parts.

Feature 317: When a CC to which the N bandwidth parts belong is a non-activated CC, the N bandwidth parts are all secondary bandwidth parts.

Feature 318: Dynamic control information transmitted in the primary bandwidth part carries dynamic switching indication information of the primary bandwidth part.

Feature 319: Dynamic control information transmitted in the primary bandwidth part carries dynamic switching indication information of the secondary bandwidth part.

Feature 320: The number of bits of a bandwidth part indicator field in dynamic control information transmitted in the primary bandwidth part is determined according to the number of bandwidth parts configured in a CC.

Feature 321: The number of bits of a bandwidth part indicator field in dynamic control information transmitted in the primary bandwidth part is determined according to the number of bandwidth part sets configured in a CC.

Feature 322: The number of bits of a bandwidth part indicator field in dynamic control information in the secondary bandwidth part is 0.

In this embodiment, the N bandwidth parts may further satisfy at least one of the features described below.

Feature 41: An association relationship exists between a first bandwidth part of the N bandwidth parts and a second bandwidth part of the N bandwidth parts.

In this embodiment, the association relationship existing between the first bandwidth part and the second bandwidth part represents at least one of the following pieces of information that: 1. one bandwidth part may be determined according to the other bandwidth part; 2. activation signaling of one bandwidth part also activates the other bandwidth part simultaneously, or 3. certain parameter combinations of the two bandwidth parts are not desired to occur simultaneously.

Feature 42: A first bandwidth part of the N bandwidth parts belongs to a first bandwidth part group.

Feature 43: A second bandwidth part of the N bandwidth parts belongs to a second bandwidth part group.

Feature 44: A first bandwidth part of the N bandwidth parts share one set of parameter configurations of a channel and/or signal with a second bandwidth part of the N bandwidth parts.

Feature 45: A predetermined configuration condition is satisfied between a parameter configuration of a channel and/or signal carried on a first bandwidth part of the N bandwidth parts and a parameter configuration of a channel and/or signal carried on a second bandwidth part of the N bandwidth parts.

Feature 46: A first bandwidth part and a second bandwidth part are triggered by one piece of signaling information.

Here, it is to be noted that in this embodiment, the first bandwidth part and the second bandwidth part are two bandwidth parts of the N bandwidth parts. The first bandwidth part and the second bandwidth part may be any two bandwidth parts of the N bandwidth parts. The first bandwidth part and the second bandwidth part may be two specific bandwidth parts of the N bandwidth parts. For example, the N bandwidth parts are bandwidth parts {1, 2, 3}, and a combination of the first bandwidth part and the second bandwidth part corresponds to bandwidth parts {1, 2}. Alternatively, the first bandwidth part and the second bandwidth part are a combination of all different bandwidth parts of the N bandwidth parts. For example, the combinations of the first bandwidth part and the second bandwidth part correspond to bandwidth parts {1, 2}, bandwidth parts {1, 3} and bandwidth parts {2, 3}.

In this embodiment, the determined N bandwidth parts may satisfy at least one of the features described below.

Feature 51: The N bandwidth parts are each in an activated state in the same time unit.

Feature 52: The N bandwidth parts belong to one CC.

Feature 53: In the N bandwidth parts, an intersection of time resources of different bandwidth parts in an activated state exists.

Feature 54: In the N bandwidth parts, a channel and/or signal scheduled by a control channel in at least one bandwidth part is in another bandwidth part.

Feature 55: The N bandwidth parts have the same information transmission direction. The information transmission direction includes a downlink transmission direction and an uplink transmission direction.

Feature 56: When N is greater than a predetermined value, a parameter of a parameter set corresponding to each bandwidth part of the N bandwidth parts has a fixed value.

In this embodiment, the parameter having a fixed value represents that the parameter value is not dynamically notified in DCI. In addition, the parameter set includes at least one of the following parameters: a scrambling sequence parameter of a demodulation reference signal, or the number of time domain symbols included in one group of consecutive time domain symbols occupied by a demodulation reference signal.

Feature 57: An information field included in control signaling in one bandwidth part of the N bandwidth parts is determined according to the value of N.

For example, when the value of N is greater than or equal to a predetermined value, the signaling information includes no predetermined indication information. When the value of N is less than a predetermined value, the signaling information includes predetermined indication information. The information field may be determined according to the predetermined indication information.

Feature 58: Physical layer dynamic control information in M1 bandwidth parts of the N bandwidth parts may carry dynamic switching indication information of a bandwidth part.

Feature 59: Physical layer dynamic control information in M2 bandwidth parts of the N bandwidth parts cannot carry dynamic switching indication information of a bandwidth part.

Feature 60: M3 bandwidth parts of the N bandwidth parts include physical layer dynamic control information in a predetermined format.

It is to be noted that in this embodiment, the physical layer dynamic control information in the predetermined format includes a downlink control information format (DCI format) 2_0.

Feature 61: M4 bandwidth parts of the N bandwidth parts include no physical layer dynamic control information in a predetermined format.

Particularly, it is to be noted that in this embodiment, M1, M2, M3 and M4 are each a non-negative integer less than or equal to N; and/or, the sum of M1 and M2 is equal to the value of N, and the sum of M3 and M4 is equal to the value of N.

Particularly, it is to be noted that in this embodiment, when a bandwidth part corresponding to a bandwidth part index indicated by a physical layer control channel belongs to the N bandwidth parts, a bandwidth part switching process is not started. When the bandwidth part corresponding to the bandwidth part index indicated by the physical layer control channel does not belong to the N bandwidth parts, the bandwidth part switching process is started.

In addition, when the information transmission methods provided in this embodiment are applied to the terminal, since the terminal may receive information from multiple TRPs, the total number of control channel candidates may exceed the blind detection capability of the terminal in blind detections. In view of this, this embodiment provides a control channel candidate screening modes described below in the case where the total number of control channel candidates exceeds the blind detection capability of the terminal.

Mode one: When the total number of control channel candidates included in the N bandwidth parts is greater than a first predetermined value, control channel candidates in M bandwidth parts may be monitored according to a predetermined rule and/or signaling information.

It is to be noted that M is an integer less than or equal to N, and the M bandwidth parts are M bandwidth parts of the N bandwidth parts. In addition, it is further to be noted that the number of control channel candidates in the M bandwidth parts should be less than or equal to the first predetermined value.

In addition, in this embodiment, the N bandwidth parts may be located in the same time unit.

Mode two: When the total number of control channel candidates included in the D control channel resource groups is greater than a second predetermined value, control channels in D4 control channel resource groups are monitored according to a predetermined rule and/or signaling information.

It is to be noted that the D4 control channel resource groups are D4 control channel resource groups of the D control channel resource groups.

In this embodiment, the selected M bandwidth parts should satisfy at least one of the features described below.

Feature 61: The M bandwidth parts have higher priorities among the N bandwidth parts.

Feature 62: The number of control channel candidates monitored in each bandwidth part of the M bandwidth parts is less than or equal to the number of candidate channels configured in each bandwidth part.

Feature 63: The M bandwidth parts are from Q bandwidth part groups.

It is to be noted that Q is a positive integer less than or equal to M, and the N bandwidth parts belong to a set of bandwidth parts in the Q bandwidth part groups.

Feature 64: Control channel candidates that need to be monitored are allocated in the M bandwidth parts according to a predetermined proportion.

In this embodiment, when the M bandwidth parts satisfy that the M bandwidth parts are from the Q bandwidth part groups, an intersection of each bandwidth part group of the Q bandwidth part groups and a set composed of the M bandwidth parts is nonempty; and/or at least one bandwidth part of the M bandwidth parts belongs to one bandwidth part group of the Q bandwidth part groups.

In this embodiment, at least one of the factors described below may further be determined according to signaling information and/or an agreed rule.

1. A respective time unit set corresponding to each bandwidth part of the N bandwidth parts may be determined.

In this embodiment, each bandwidth part is in an activated state in the respective time unit set corresponding to each bandwidth part.

2. A correspondence between T1 time unit sets and T1 bandwidth part sets may be determined.

In this embodiment, at least one bandwidth part in each bandwidth part set of the T1 bandwidth part sets is in an activated state in a respective time unit set corresponding to each bandwidth part set; and/or the N bandwidth parts belong to a bandwidth part set corresponding to time units where the N bandwidth parts are located.

3. It may be determined whether a bandwidth part indicator field in dynamic control information in one bandwidth part is acquired according to the number of bandwidth parts configured in a component carrier.

In this embodiment, when the bandwidth part indicator field cannot be acquired according to the number of bandwidth parts configured in the component carrier, the number of bits of the bandwidth part indicator field in the dynamic control information is 0. When the bandwidth part indicator field can be acquired according to the number of bandwidth parts configured in the component carrier, the number of bits of the bandwidth part indicator field in the dynamic control information is acquired according to the number of bandwidth parts configured in the component carrier.

4. It may be determined whether a bandwidth part indicator field in dynamic control information in one bandwidth part is acquired according to the number of bandwidth part sets configured in a component carrier.

In this embodiment, when the bandwidth part indicator field cannot be acquired according to the number of bandwidth part sets configured in the component carrier, the number of bits of the bandwidth part indicator field in the dynamic control information is 0. When the bandwidth part indicator field can be acquired according to the number of bandwidth part sets configured in the component carrier, the number of bits of the bandwidth part indicator field in the dynamic control information is acquired according to the number of bandwidth part sets configured in the component carrier.

5. It may be determined whether one bandwidth part includes dynamic control information in a predetermined format.

In this embodiment, the dynamic control information in the predetermined format may include DCI format 2_0.

6. It may be determined whether a bandwidth part indicator field in dynamic control information in one control channel resource group is acquired according to the number of bandwidth parts configured in a component carrier.

7. It may be determined whether a bandwidth part indicator field in dynamic control information in one control channel resource group is acquired according to the number of bandwidth part sets configured in a component carrier.

8. It may be determined whether one control channel resource group includes dynamic control information in a predetermined format.

In this embodiment, the information transmission method further includes the following steps: it is determined whether a bandwidth part indicator field in dynamic control information in one bandwidth part needs to be obtained according to the number of bandwidth parts configured in a CC; and/or, it is determined whether a bandwidth part indicator field in dynamic control information in one bandwidth part needs to be obtained according to the number of bandwidth part sets configured in a CC.

In this embodiment, the determined N bandwidth parts should be from X CCs (where X is a positive integer greater than 1), and/or the determined N bandwidth parts should be from X1 CC groups (where X1 is a positive integer greater than 1). Further, bandwidth part groups where the N bandwidth parts are located may be determined according to CCs where the N bandwidth parts are located.

In addition, in this embodiment, the determined D control channel resource groups should be from Y CCs and/or Y1 CC groups (where Y and Y1 are each a positive integer greater than 1).

In this embodiment, the CCs should satisfy at least one of the conditions described below.

Condition 41: An overlap exists between a frequency domain resource of a first CC and a frequency domain resource of a second CC.

It is to be noted that the first CC and the second CC are two CCs of the X CCs. The two CCs may be any two CCs of the X CCs, or two specific CCs of the X CCs.

Feature 42: A CC in a first CC group has at least one associated CC in a second CC group.

It is to be noted that the first CC group and the second CC group are two CC groups of the X1 CC groups. The two CC groups may be any two CC groups of the X1 CC groups or two specific CC groups of the X1 CC groups. X1 is less than or equal to X and greater than or equal to 2.

Additionally/Alternatively, the first CC group and the second CC group are two CC groups of the Y1 CC groups. The two CC groups may be any two CC groups of the Y1 CC groups or two specific CC groups of the Y1 CC groups. Y1 is less than or equal to Y and greater than or equal to 2.

Additionally/Alternatively, an association relationship exists between parameter configurations of two CCs associated with each other.

Condition 43: Bandwidth parts included in one CC group belong to one bandwidth part group.

Condition 44: Bandwidth parts included in different CC groups belong to different bandwidth part groups.

Condition 45: Bandwidth parts included in one CC belong to one bandwidth part group.

Condition 46: Bandwidth parts included in different CCs belong to different bandwidth part groups.

Condition 47: An association relationship exists between parameter configurations of two CCs of the X CCs.

It is to be noted that the above parameter configuration may include slot structure indication information.

Condition 48: An association relationship exists between parameter configurations of two CCs of the Y CCs.

It is to be noted that the above parameter configuration may include slot structure indication information.

In this embodiment, the D control channel resource groups correspond to D reference signal sets. Each control channel resource group of the D control channel resource groups corresponds to a respective reference signal set.

In this embodiment, the reference signal set satisfies at least one of the features described below.

Feature 71: The reference signal set is an uplink reference signal set used as a codebook.

Feature 72: The reference signal set is an uplink reference signal set used as a non codebook.

Feature 73: The reference signal set is an aperiodic reference signal set.

Feature 74: A difference set of every two reference signal sets is nonempty.

Feature 75: A reference signal associated with a spatial transmit filter parameter of a demodulation reference signal scheduled by control information in one control channel resource group of the D control channel resource groups belongs to a reference signal set corresponding to the one control channel resource group.

Feature 76: A reference signal associated with a spatial receive filter parameter of a demodulation reference signal scheduled by control information in one control channel resource group of the D control channel resource groups belongs to a reference signal set corresponding to the one control channel resource group.

Feature 77: A reference signal scheduled by control information in one control channel resource group of the D control channel resource groups belongs to a reference signal set corresponding to the one control channel resource group.

In this embodiment, G CCs may further be determined. The G CCs satisfy at least one of the features described below.

1. An overlap exists among frequency domain resources included in the G CCs.

2. Parameter configurations of the G CCs satisfy an eighth-type agreed condition.

It is to be noted that in this embodiment, the eighth-type agreed condition includes at least one of the following: an intersection of resources occupied by synchronization signals of different CCs overlapping with each other in frequency domain is empty, channels or signals on the same resource of different CCs overlapping with each other in frequency domain have the same transmission direction, or different CCs overlapping each other in frequency domain share a set of slot structure configuration information.

3. An association exists among parameter configurations of channels and/or signals in the G CCs.

G is a positive integer greater than or equal to 2.

In addition, it is further to be noted that in practical applications, a conflict may exist among transmitted channels and/or signals. For example, each TRP of two TRPs corresponds to a respective CC of two CCs, and an overlap in frequency domain exists between the two CCs. In this case, a conflict may exist between uplink signals scheduled by the two TRPs.

In this embodiment, when a conflict exists among resources occupied by Z types of channels and/or signals, Z1 types of channels and/or signals of the Z types of channels and/or signals may be transmitted according to signaling information and/or an agreed rule; and/or when a conflict exists among resources occupied by the Z types of channels and/or signals, a third type of channels and/or signals may be transmitted according to signaling information and/or an agreed rule. The third type of channels and/or signals is obtained according to parameter information of at least two types of channels and/or signals of the Z types of channels and/or signals; and/or an intersection of the third type of channels and/or signals and the Z types of channels and/or signals is empty.

Here, it is to be noted that Z is a positive integer greater than or equal to 2, and Z1 is a positive integer less than or equal to Z. In addition, different types of channels and/or signals of the Z types of channels and/or signals belong to different bandwidth parts of the determined N bandwidth parts (that is, different types of channels and/or signals of the Z types of channels and/or signals are carried on different bandwidth parts of the determined N bandwidth parts); and/or different types of channels and/or signals of the Z types of channels and/or signals are scheduled by control information in different control channel resource groups in Z control channel resource groups of the determined D control channel resource groups; and/or the Z types of channels include at least one of the following channel types: a data channel or a control channel, the Z types of signals include at least one of the following signal types: a measurement reference signal, a demodulation reference signal, a random access signal, a synchronization signal, a resource request signal or a phase-tracking signal; and/or different types of channels and/or signals of the Z types of channels and/or signals are associated with different group information identifiers.

In this embodiment, the conflict includes at least one of the conflicts described below.

Conflict 1: An overlap exists among time domain resources occupied by the Z types of channels and/or signals.

Conflict 2: An overlap exists among frequency domain resources occupied by the Z types of channels and/or signals.

Conflict 3: An overlap exists among demodulation reference signal resources included by the Z types of channels.

Conflict 4: An overlap exists among reference signal resources included by the Z types of signals.

Conflict 5: An overlap exists among spatial domain resources occupied by the Z types of channels and/or signals.

Conflict 6: Spatial domain resources occupied by the Z types of channels and/or signals are unable to be transmitted on a first communication node simultaneously.

Conflict 7: An overlap exists among antenna resources occupied by the Z types of channels and/or signals.

Conflict 8: Antenna resources occupied by the Z types of channels and/or signals are unable to be transmitted on a first communication node simultaneously.

Conflict 9: Group information to which reference signals corresponding to spatial domain resources occupied by the Z types of channels and/or signals belong does not satisfy an agreed condition.

Particularly, it is to be noted that in one specific implementation of this embodiment, when any one of conflicts 1 to 9 exists, it may be regarded that a conflict exists among resources occupied by the Z types of channels and/or signals. However, in another specific implementation of this embodiment, only when an overlap exists among time domain resources and/or frequency domain resources occupied by the Z types of channels and/or signals, and an overlap exists among spatial domain resources occupied by the Z types of channels and/or signals, it may be regarded that a conflict exists among resources occupied by the Z types of channels and/or signals; and/or, only when an overlap exists among time domain resources and/or frequency domain resources occupied by the Z types of channels and/or signals, and spatial domain resources occupied by the Z types of channels and/or signals are unable to be transmitted on the first communication node simultaneously, it may be regarded that a conflict exists among resources occupied by the Z types of channels and/or signals; and/or only when an overlap exists among time domain resources and/or frequency domain resources occupied by the Z types of channels and/or signals, and an overlap exists among antenna resources occupied by the Z types of channels and/or signals, it may be regarded that a conflict exists among resources occupied by the Z types of channels and/or signals.

Here, it is to be particularly noted that the first communication node is a communication node for transmitting the Z1 types of channels and/or signals.

In this embodiment, the Z types of channels and/or signals satisfy at least one of the conditions described below.

Condition 51: A spatial domain resource occupied by one type of channels and/or signals of the Z types of channels and/or signals is represented by a reference signal. A spatial transmit filter parameter and/or spatial receive filter parameter of the one type of channels and/or signals is acquired according to a spatial transmit filter parameter and/or spatial receive filter parameter of the reference signal.

It is to be noted that in this embodiment, the one type of channels and/or signals of the Z types of channels and/or signals may be any one type of channels and/or signals of the Z types of channels and/or signals, or may be one certain specific type of channels and/or signals of the Z types of channels and/or signals.

Condition 52: A spatial domain resource occupied by one type of channels and/or signals of the Z types of channels and/or signals is represented by a reference signal. The reference signal and the one type of channels and/or signals satisfy a quasi co-location relationship with respect to one type of quasi co-location parameters.

Condition 53: The spatial domain resources occupied by the Z types of channels and/or signals being unable to be transmitted on the first communication node simultaneously includes that: multiple pieces of group information to which multiple reference signals associated with multiple spatial domain resources occupied by the Z types of channels and/or signals belong do not satisfy an agreed condition, and/or multiple reference signals associated with multiple spatial domain resources occupied by the Z types of channels and/or signals are the same reference signal.

The multiple pieces of group information to which the multiple reference signals belong do not satisfy the agreed condition. The agreed condition includes that the multiple reference signals belong to the same reference signal group, where different reference signals in the same reference signal group may be sent or received simultaneously; reference signals in different reference signal groups cannot be sent or received simultaneously. Alternatively, the constraint condition includes that the multiple reference signals belong to different reference signal groups, where reference signals in different reference signal groups may be sent or received simultaneously; reference signals in the same reference signal group cannot be sent or received simultaneously.

In this embodiment, a reference signal resource included in a reference signal resource group may be indicated to the first communication node by a second communication node through signaling information, and/or may be fed back to the second communication node by the first communication node.

For example, the Z types of channels and/or signals are uplink signals, the spatial domain resources of the Z types of channels and/or signals are indicated through a scheduling request indication (SRI). At least Z SRS resources corresponding to the Z types of channels and/or signals indicated through the SRI belong to the same group but are for different SRSs, indicating that the Z types of channels and/or signals cannot be sent simultaneously. At least Z SRS resources corresponding to the Z types of channels and/or signals indicated through the SRI belong to different groups, indicating that the Z types of channels and/or signals can be sent simultaneously.

In another example of this embodiment, SRS resources corresponding to the SRI belong to the same group, indicating that the Z types of channels and/or signals can be sent simultaneously. SRS resources corresponding to the SRI belong to different groups, indicating that the Z types of channels and/or signals cannot be sent simultaneously.

Similarly, the Z types of channels and/or signal are downlink signals, the spatial domain resources of the Z types of channels and/or signals are indicated through a transmission configuration indicator (TCI). At least Z downlink reference signal or synchronization signal resources corresponding to the Z types of channels and/or signals indicated through the TCI belong to the same group, indicating that the Z types of channels and/or signals cannot be received simultaneously. At least Z downlink reference signal or synchronization signal resources corresponding to the Z types of channels and/or signals indicated through the TCI belong to different groups, indicating that the Z types of channels and/or signals can be received simultaneously.

In another example of this embodiment, Z downlink reference signal/synchronization signal resources corresponding to the TCI belong to the same group, indicating the Z types of channels and/or signals can be received simultaneously. The Z downlink reference signal or synchronization signal resources corresponding to the TCI belong to different groups, indicating that the Z types of channels and/or signals cannot be received simultaneously.

Here, it is to be noted that in this embodiment, group information to which a reference signal belongs may be the same as or different from a group information identifier.

Condition 54: The spatial domain resources occupied by the Z types of channels and/or signals being unable to be transmitted on the first communication node simultaneously includes that: multiple reference signals associated with multiple spatial domain resources occupied by the Z types of channels and/or signals are unable to be transmitted on the first communication node simultaneously.

In this embodiment, at least one of the operations described below is further performed when a conflict exists.

1. The Z1 types of channels and/or signals are determined according to at least one of the following pieces of information: priorities of bandwidth parts associated with the Z types of channels and/or signals; priorities of control channel resource groups associated with the Z types of channels and/or signals; priorities of frequency domain bandwidth groups associated with the Z types of channels and/or signals; or priorities of CCs or CC groups associated with the Z types of channels and/or signals.

The Z1 types of channels and/or signals have higher priorities among the Z types of channels and/or signals.

2. At least one of the following pieces of information is determined according to the Z1 types of channels and/or signals: priorities of bandwidth parts associated with the Z types of channels and/or signals; priorities of control channel resource groups associated with the Z types of channels and/or signals; priorities of frequency domain bandwidth groups associated with the Z types of channels and/or signals; or priorities of CCs or CC groups associated with the Z types of channels and/or signals.

3. The Z1 types of channels and/or signals are determined according to at least one of the following pieces of information: whether bandwidth parts associated with the Z types of channels and/or signals are the same; whether control channel resource groups associated with the Z types of channels and/or signals are the same; whether frequency domain bandwidth groups associated with the Z types of channels and/or signals are the same; whether CCs or CC groups associated with the Z types of channels and/or signals are the same; or whether group information identifiers associated with the Z types of channels and/or signals are the same.

For example, when an overlap exists between a time domain resource of an SRS and a time domain resource of a physical uplink control channel (PUCCH), if the SRS and PUCCH are identical in at least one of the above pieces of information, then it is regarded as a conflict exists and it is necessary to discard one of the SRS or the PUCCH. For example, the SRS is discarded or the PUCCH is discarded. If the SRS and PUCCH are different in at least one of the above pieces of information, then it is regarded that no conflict exists between the SRS and the PUCCH and both of the SRS and the PUCCH are sent.

4. The first communication node transmits none of channels and/or signals which are included in a difference set of the Z types of channels and/or signals and the Z1 types of channels and/or signals.

5. Parameter information, which belongs to a first predetermined parameter set and is in Z2 types of channels and/or signals of the Z1 types of channels and/or signals, is adjusted. The Z1 types of channels and/or signals are sent according to the adjusted parameter information.

Z2 is a non-negative integer less than or equal to Z1. The parameter information in the first predetermined parameter set includes at least one of the following pieces of information: time advance information, sequence information, antenna information, demodulation reference signal information or the number of transmission code blocks.

6. Time advance information in Z2 types of channels and/or signals of the Z1 types of channels and/or signals is adjusted. The Z1 types of channels and/or signals are sent according to an adjusted power parameter. Z2 is a non-negative integer less than or equal to Z1.

In this embodiment, when a conflict exists among the resources occupied by the Z types of channels and/or signals, at least one of the operations described below is further performed.

1. When a conflict exists among the resources occupied by the Z types of channels and/or signals, the Z1 types of channels and/or signals of the Z types of channels and/or signals are transmitted according to signaling information and/or an agreed rule.

2. When a conflict exists among resources occupied by Z types of measurement reference signals, the third type of channels and/or signals is transmitted according to signaling information and/or an agreed rule.

In this embodiment, parameter information of the third type of channels and/or signals is obtained according to configuration information of at least two types of channels and/or signals of the Z1 types of channels and/or signals of the Z types of channels and/or signals. The parameter information includes at least one of the following pieces of information: power information, time advance information, sequence information, antenna information or port information. In this embodiment, the parameter information of the third type of channels and/or signals may further be obtained according to signaling information and/or an agreed rule.

In this embodiment, the conflict existing among the resources occupied by the Z types of channels and/or signals includes that the Z types of channels and/or signals are associated with the same first information.

The first information includes at least one of the following: bandwidth parts associated with the Z types of channels and/or signals, control channel resource groups associated with the Z types of channels and/or signals, frequency domain bandwidth groups associated with the Z types of channels and/or signals, CCs or CC groups associated with the Z types of channels and/or signals, or group information identifiers associated with the Z types of channels and/or signals.

The Z types of channels include at least one of the following channel types: a data channel or a control channel. The Z types of signals include at least one of the following signal types: a measurement reference signal, a demodulation reference signal, a random access signal, a synchronization signal, a resource request signal or a phase-tracking signal.

In this embodiment, when an overlap exists among resources and/or reference signals occupied by the Z types of channels and/or signals, the Z types of channels and/or signals are associated with the same first information, a conflict occurs among the Z types of channels and/or signals, and Z1 is less than the value of Z; and/or, when an overlap exists among the resources occupied by the Z types of channels and/or signals, the Z types of channels and/or signals are associated with different first information, no conflict occurs among the Z types of channels and/or signals, and Z1 is equal to the value of Z.

It is to be noted that, the preceding resources includes at least one of following resources: a time domain resource, a frequency domain resource or a spatial domain resource.

According to the information transmission methods provided in this embodiment of the present disclosure, the N bandwidth parts each of which is in an activated state are determined, and the channel and/or signal is transmitted on the N activated bandwidth parts; and/or the D control channel resource groups are determined, the control information is detected in the D control channel resource groups, and the channel and/or signal is transmitted according to control information which is detected. In this way, when multiple TRPs and/or terminals all transmit information, it can be effectively supported that multiple TRPs provide one terminal with effective services in a beam mechanism.

Embodiment Two

Figure 3:
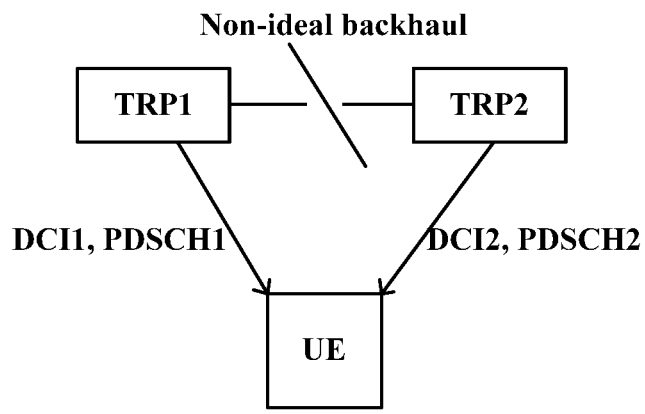
FIG. 3 is a schematic diagram illustrating that there is no ideal backhaul among TRPs in a multi-TRP transmission according to embodiment two of the present disclosure.

In this embodiment, in order to implement multi-TRP transmission, increase system spectral efficiency, and/or improve communication robustness, a terminal may simultaneously receive data transmission from multiple TRPs. As shown in FIG. 3, the terminal may simultaneously receive PDSCH1 and PDSCH2 in the same slot. PDSCH1 is sent by TRP1. PDSCH2 is sent by TRP2. There is no ideal backhaul between the two TRPs. Thus, PDSCH1 is scheduled through DCI1, and PDSCH2 is scheduled through DCI2. Since an overlap may exist between resources occupied by PDSCH1 and PDSCH2, and if it is allowed that channels and/or signals transmitted by the two TRPs may have different parameter configurations, there are schemes described below.

Figure 4:
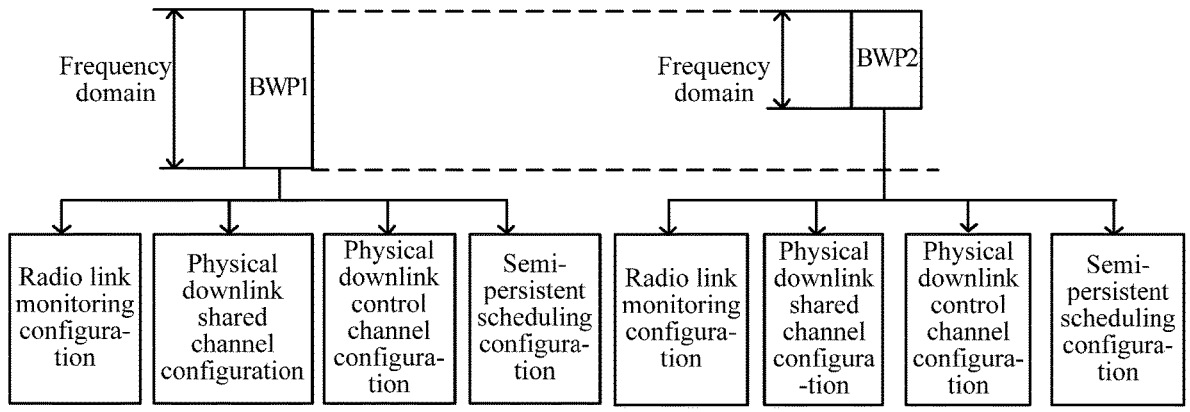
FIG. 4 is a schematic diagram illustrating that in one time unit, each of multiple BWPs each of which is in an activated state in one CC corresponds to respective independent configuration information according to embodiment two of the present disclosure.

In one time unit, one terminal is configured with N BWPs each of which is in an activated state in one CC. Parameter information of a channel and/or signal in each BWP is configured in configuration information of each BWP. As shown in FIG. 4, BWP1 and BWP2 may be configured with their respective physical downlink shared channel configurations (pdsch-config), physical downlink control channel configurations (pdcch-config), semi-persistent scheduling configurations (sps-configure) and radio link monitoring configurations (radiolinkmonitoringconfigure), so that different TRPs may have different parameter configurations. The specific meanings of pdsch-config, pdcch-config, sps-configure and radiolinkmonitoringconfigure can refer to protocol 38.331.

Figure 5:
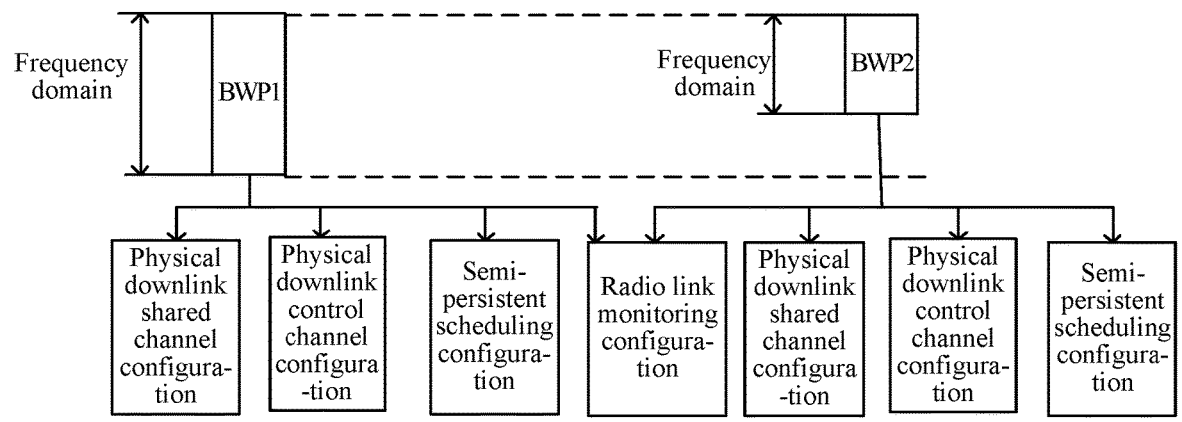
FIG. 5 is a schematic diagram illustrating that in one time unit, for each of multiple BWPs each of which is in an activated state in one CC, a part of configurations is independently configured and a part of configurations is shared according to embodiment two of the present disclosure.
Figure 6:
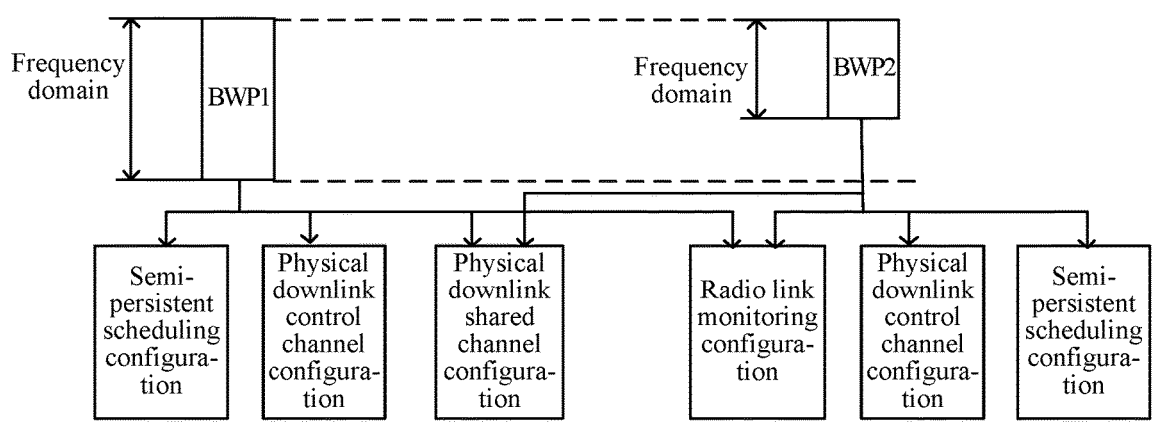
FIG. 6 is another schematic diagram illustrating that in one time unit, for each of multiple BWPs each of which is in an activated state in one CC, a part of configurations is independently configured, and a part of configurations is shared according to embodiment two of the present disclosure.

In FIG. 4, BWP1 and BWP2 are configured with their respective pdsch-config, pdcch-config, sps-configure and radiolinkmonitoringconfigur. This embodiment does not exclude that for each of BWP1 and BWP2, only a part of configurations is independently configured, and a part of configurations is shared. As shown in FIG. 5, radiolinkmonitoringconfigure is shared, and the others are independently configured for each BWP. Certainly, the shared configuration in FIG. 5 is only an example, and the present disclosure does not exclude that the shared configuration is another configuration. For example, as shown in FIG. 6, shared configurations between BWP1 and BWP2 are radiolinkmonitoringconfigure and pdsch-config. In short, the shared configuration may be one or more of pdsch-config, pdcch-config, sps-configure and radiolinkmonitoringconfigure.

In this embodiment, N BWPs each of which is in an activated state in one time unit need to satisfy a predetermined condition. As shown in FIG. 4, BWP2 is a subset of BWP1. In this embodiment, the predetermined condition satisfied by BWP1 and BWP2 may further be one or more of the conditions described below.

Feature one: BWP1 and BWP2 belong to one CC.

Figure 7:
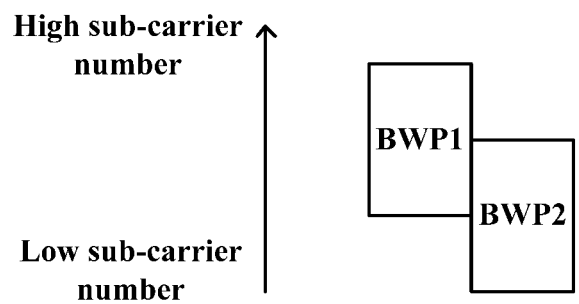
FIG. 7 is a schematic diagram illustrating that in one time unit, a frequency domain overlap exists among multiple BWPs each of which is in an activated state according to embodiment two of the present disclosure.

Feature two: An overlap exists between a frequency domain resource included in BWP1 and a frequency domain resource included in BWP2, as shown in FIG. 7.

Figure 8:
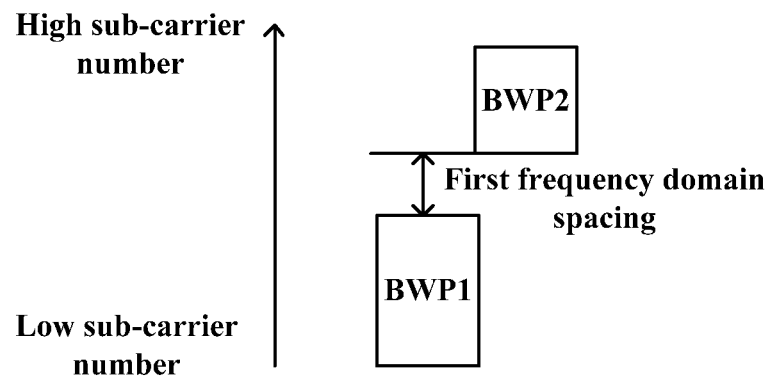
FIG. 8 is a schematic diagram of first frequency domain spacing between multiple BWPs each of which is in an activated state in one time unit according to embodiment two of the present disclosure.

Feature three: Spacing between the highest frequency domain position of BWP1 and the lowest frequency domain position of BWP2 is less than or equal to a first predetermined value. As shown in FIG. 8, first frequency domain spacing is less than or equal to the first predetermined value. A sub-carrier number corresponding to the highest frequency domain position of the BWP1 is less than or equal to a sub-carrier number corresponding to the lowest frequency domain position of BWP2.

Figure 9:
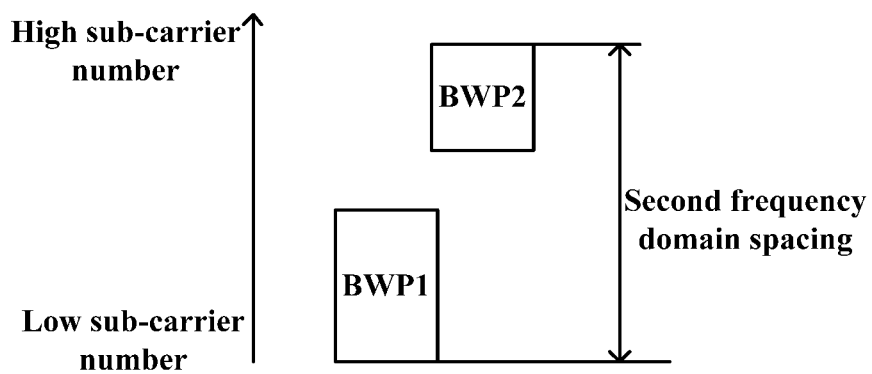
FIG. 9 is a schematic diagram of second frequency domain spacing between multiple BWPs each of which is in an activated state in one time unit according to embodiment two of the present disclosure.

Feature four: Spacing between the lowest frequency domain position of BWP1 and the highest frequency domain position of BWP2 is less than or equal to a predetermined threshold. As shown in FIG. 9, second frequency domain spacing is less than or equal to a second predetermined value. A sub-carrier number corresponding to the highest frequency domain position of BWP1 is less than or equal to a sub-carrier number corresponding to the lowest frequency domain position of BWP2.

Figure 10:
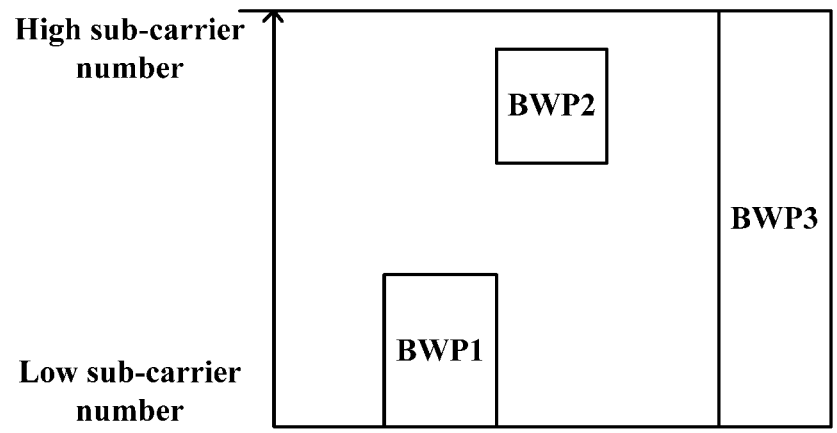
FIG. 10 is a schematic diagram illustrating that in one time unit, frequency domain occupied by multiple BWPs each of which is in an activated state is a subset of frequency domain occupied by a predetermined BWP according to embodiment two of the present disclosure.

Feature five: BWP1 and BWP2 both belong to a predetermined BWP. As shown in FIG. 10, in one time unit, a frequency domain resource occupied by BWP1 in an activated state and a frequency domain resource occupied by BWP2 in an activated state are both a subset of a frequency domain resource occupied by BWP3.

Feature six: An overlap exists between effective time of BWP1 and effective time of BWP2. For example, two BWPs are both in an activated state in one slot.

A direction from a low sub-carrier number to a high sub-carrier number shown in FIGS. 7 to 9 is also a direction from a low frequency domain position to a high frequency domain position.

Particularly, it is to be noted that when it is supported that different sub-carrier spacing can be configured between multiple BWPs each of which is in an activated in the same CC, the different BWPs have different sub-carrier numbers. In view of this, the first frequency domain spacing, the second frequency domain spacing, the first predetermined value and the second predetermined value above may be described by associating with one piece of reference sub-carrier spacing. The overlap existing between frequency domain resources indicates that an overlap exists between frequency domain resources occupied by two BWPs. Here, the overlap may be described by associating with one piece of reference sub-carrier spacing.

The N BWPs each of which is in an activated state in the same time period are enforced to satisfy a certain condition. A main purpose for this is to reduce a processing complexity of the terminal while ensuring that different TRPs correspond to different parameter configurations. That is, each of pieces of spacing among the N BWPs each of which is in an activated state in the same time period is not be too large or even an overlap exists among the N BWPs each of which is in an activated state in the same time period, so that the terminal side actually performs radio frequency reception through one BWP merely. A high layer configuration may be that: different BWPs have different configurations. Different receiving panels of the terminal process signals by using corresponding BWPs. Alternatively, the terminal uses different digital receive beams to receive their respective BWPs, but for the radio frequency band, only a frequency domain resource that can include a union of the N BWPs is used for receiving.

In FIGS. 4 to 6, BWP1 and BWP2 may be independently configured with some parameters. There is no certain constraint association between the independently configured parameters. In another implementation of this embodiment, it may be further limited that: although each BWP can be independently configured with parameters, multiple sets of independently configured parameters need to satisfy a certain condition. Particularly, when an overlap exists between the frequency domain resource occupied by BWP1 and the frequency domain resource occupied by BWP2, or an overlap exists between a frequency domain resource occupied by a channel and/or signal in BWP1 and a frequency domain resource occupied by a channel and/or signal in BWP2, a configuration of the channel and/or signal in BWP1 and a configuration of the channel and/or signal in BWP2 need to satisfy a predetermined condition. For example, the predetermined condition that needs to be satisfied by the configuration of the channel and/or signal in BWP1 and the configuration of the channel and/or signal in BWP2 includes one or more of the conditions described below.

Condition one: Resources occupied by control channels corresponding to different bandwidth parts of the N bandwidth parts are orthogonal. For example, an intersection of time domain resources and/or frequency domain resources occupied by all dedicated search spaces in BWP1 and time domain resources and/or frequency domain resources occupied by all dedicated search spaces in BWP2 is empty. There is no ideal backhaul between TRP1 and TRP2, and TRP1 and TRP2 are scheduled independently, so it is necessary to ensure that a control channel of TRP1 and a control channel of TRP2 are orthogonal while the spectral efficiency is improved through space division of data of TRP1 and TRP2, to increase the robustness of control channels. Otherwise, when both two TRPs transmit control channels on the same time-frequency resource and the space division effect is not great, the robustness of control channels cannot be guaranteed.

Condition two: Resources occupied by reference signals in different bandwidths of the N bandwidth parts are orthogonal. For example, a resource occupied by a demodulation reference signal (DMRS) in BWP1 and a resource occupied by a DMRS in BWP2 are orthogonal. The demodulation reference signal includes one or more of a demodulation reference signal of a control channel and a demodulation reference signal of a data channel. When the demodulation reference signal includes the demodulation reference signal of the control channel, an overlap may exist between time frequency resources occupied by pieces of DCI in two BWPs, but demodulation reference signals of the two BWPs are orthogonal; or there is no intersection of time-frequency resources occupied by pieces of DCI in two BWPs, and demodulation reference signals of control channels of the two BWPs are orthogonal; and/or a resource occupied by a channel state information-reference signal (CSI-RS) in BWP1 and a resource occupied by a CSI-RS in BWP2 are orthogonal; and/or a resource occupied by a phase-tracking reference signal (PTRS) in BWP1 and a resource occupied by a PTRS in BWP2 are orthogonal; and/or a resource occupied by a single side band (SSB)/ physical broadcast channel (PBCH) in BWP1 and a resource occupied by an SSB/PBCH in BWP2 are orthogonal. Resources occupied by two reference signals being orthogonal represents that an intersection of the resources occupied by the two reference signals is empty. The resource includes at least one of the following resources: a time domain resource, a frequency domain resource, a code domain resource, a port resource or a spatial domain resource. The code domain resource may be a pseudo-noise code (PN) sequence of a reference signal, or codes used for code division multiplexing of ports of reference signals. For example, two ports are code division multiplexed through codes having a length of 2. Port 1 uses codes [1, 1], and port 2 uses codes [1, −1]. In this embodiment, one spatial domain resource is associated with one reference signal such as one reference signal in a beam training stage. Different reference signals are associated with different spatial receive filter parameters. Alternatively, different reference signals are associated with different spatial transmit filter parameters.

Condition three: When the total number of control channel candidates included in the N bandwidth parts is greater than a first predetermined value, control channel candidates in M bandwidth parts are monitored according to a predetermined rule and/or signaling information. The M bandwidth parts belong to the N bandwidth parts. M is an integer less than or equal to N. For example, in slot n, the number of control channel candidates in BWP1 is C1, the number of control channel candidates in BWP2 is C2, and C1+C2 is greater than a predetermined value C3, and then control channel candidates monitored by the terminal in slot n may be determined through one of the schemes described below.

Scheme 3.1: a control channel candidate in only one BWP is monitored. For example, BWP1 is a primary BWP, and TRP1 corresponding to BWP1 has a better performance in reaching the terminal than TRP2 corresponding to BWP2, and then a control channel candidate in BWP1 is only monitored.

Scheme 3.2: Control channel candidates monitored in slot n are allocated in M BWPs according to a predetermined proportion. The M BWPs are M BWPs in the N BWPs. M is a positive integer less than or equal to N. For example, using two TRPs as an example, in order to ensure the communication robustness, links in both TRPs need to be maintained. Thus, ⅔ of C control channel candidates are monitored in BWP1, and ⅔ of C control channel candidates are monitored in BWP2. The above is the case where the control channel candidates monitored in slot n are evenly distributed in BWP1 and BWP2. Certainly, this embodiment does not exclude that the control channel candidates monitored in slot n are not allocated in M BWPs in equal proportion. For example, a greater proportion is allocated to the primary BWP, and/or the larger bandwidth of a BWP has, the more candidate channels are allocated. Further, the M bandwidth parts are from Q bandwidth part groups. An intersection of each bandwidth part group of the Q bandwidth part groups and the M bandwidth parts is nonempty. For each bandwidth part group of the Q bandwidth part groups, at least one bandwidth part of the M bandwidth parts belongs to each bandwidth part group. The Q bandwidth part groups are determined according to signaling sent to the terminal by the base station, and/or obtained according to a rule pre-agreed by the base station and the terminal.

Condition three: An association relationship exists among parameter configurations of N channels and/or signals in the N bandwidth parts. An association relationship existing between two parameter configurations is represented as at least one of the following: a parameter configuration of one channel and/or signal may be obtained according to a parameter configuration of another channel and/or signal, or certain parameter combinations of two channels and/or signals are not desired to occur simultaneously. That is, for example, when parameter 1 of a first signal is configured to a first value, parameter 2 of a second signal is not desired to be configured to a second value. Parameter 1 and parameter 2 may be the same type of parameters, or different types of parameters. Specifically, there may be cases about the parameter configurations described below.

Parameter one: Channels in the N bandwidth parts have different scrambling sequence generation parameters. For example, a generation initialization parameter of a scrambling sequence of a PDSCH is as shown in formula (1). The specific generation of a scrambling sequence can refer to protocol 38.211. $n_{ID,1}$ may be configured for a PDSCH in BWP1, and $n_{ID,2}$ may be configured for a PDSCH in BWP2. In this way, when PDSCH1 occupies the same time-frequency resource as PDSCH2 in FIG. 11, interference randomization is performed through the scrambling sequence based on space division, so as to achieve a certain interference cancellation effect. In the above case, the two BWPs correspond to different $n_{ID}$ in formula (1). Certainly, one or more of $n_{RNTI}$ and $n_{ID}$ of different BWPs may be different. Here, $n_{RNTI}$ denotes a temporary identification number of the terminal, q denotes a transmission block index, $n_{ID}$ denotes a parameter of a high layer configuration and may be regarded as a virtual cell number. The specific meanings of the parameters in formula (1) can further refer to protocols 38.211 and 38.331.

$$C_{init} = n_{RNTI} \cdot 2^{15} + q \cdot 2^{14} + n_{ID} \quad (1)$$

Parameter two: Scrambling sequence generation parameters of reference signals in the N bandwidth parts are the same. For example, the generation initialization of a DMRS sequence of a PDSCH is as shown in formula (2). In order for DMRSs in the two BWPs to be orthogonal, DMRS sequences of the two BWPs need to be the same, so that one or more of $$N_{ID}^{nSID},$$

$n_{SCID}$, 1, $$N_{symb}^{slot}$$

and $$n_{sf}^{u}$$

of the two BWPs are the same. To ensure the identity, one scheme is that:

$$N_{ID}^{nSID}$$

may further be dynamically changed, but TRP1 and TRP2 communicates, in an implemented mode, that in the same time unit, $$N_{ID}^{nSID}$$

of the two BWPs are the same when $$N_{ID}^{nSID}$$

is dynamically scheduled. Another scheme is that:

$$N_{ID}^{nSID}$$

is not notified in DCI, that is, $n_{SCID}$ is not included in the DCI, and $N_{ID}$ may be configured to only one value for implementation. The specific meanings of the parameters can refer to protocols 38.211 and 38.331.

$$C_{init} = \left(2^{17}\left(N_{symb}^{slot} n_{s,f}^{u} + l + 1\right)\left(2N_{ID}^{nSCID} + 1\right) + 2N_{ID}^{nSCID} + n_{SCID}\right) \bmod 2^{31} \quad (2)$$

Further, in order for $$N_{symb}^{slot}$$

and $$n_{s,f}^{u}$$

of different BWPs to be the same, there may be the schemes described below.

Scheme 1: Pieces of sub-carrier spacing among different BWPs are limited to the same, and cyclic shift lengths of different BWPs are limited to be the same.

Scheme 2: When DMRS information in formula (2) is acquired by the N BWPs, $$N_{symb}^{slot}, n_{s,f}^{u}$$

and 1 in formula (2) are obtained by all the N BWPs by referring to the same set of (sub-carrier spacing, cyclic shift length). For example, $$N_{symb}^{slot}$$

and $$n_{s,f}^{u}$$

are obtained by both BWP1 and BWP2 by referring (sub-carrier spacing 3, cyclic shift length 3), and a time domain symbol position where a demodulation reference signal is located is converted into a time domain symbol index in a time unit corresponding to (sub-carrier spacing 3, cyclic shift length 3).

In another aspect, in order for time domain resources occupied by demodulation reference signals in different BWPs to be the same, groups of consecutive time domain symbols occupied by demodulation reference signals in different BWPs are limited to include the same number of time domain symbols. That is, single symbol and double symbol in 38.211 are not dynamically changed. Referring to protocols 38.211, 38.212 and 38.331, to implement that single symbol and double symbol are not dynamically changed, one mode is that maxLength is configured to 1 and thus single symbol is fixed. Another mode is that maxLength is configured to 2, but DCI carries no notification information of dynamic changes of single symbol and double symbol, and thus double symbols are fixed. For example, when the value of N is greater than a predetermined value, the DCI includes indication information about first information. When the value of N is less than or equal to a predetermined value, the DCI includes indication information about first information. The first information includes at least one of the following pieces of information: indication information about single symbol or indication information about double symbol, or indication information about $n_{SCID}$.

Figure 11:
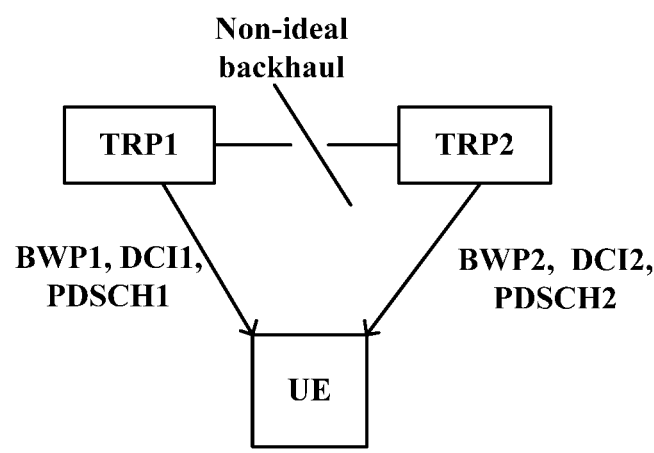
FIG. 11 is a schematic diagram illustrating that different TRPs correspond to different BWPs according to embodiment two of the present disclosure.
Figure 12:
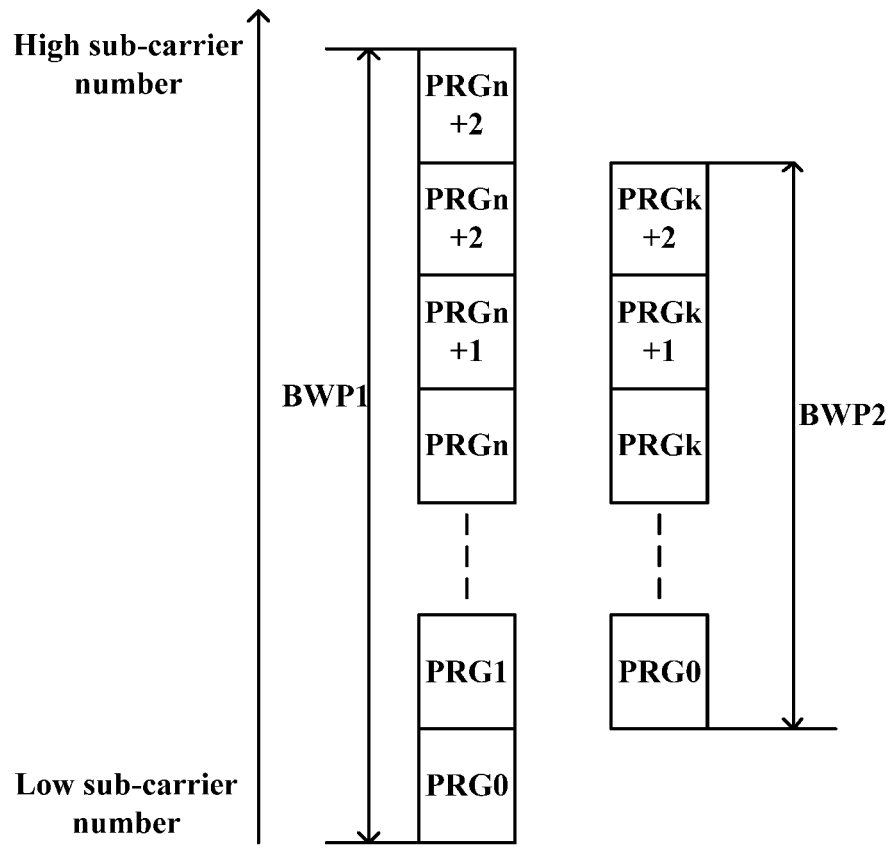
FIG. 12 is a schematic diagram illustrating divisions of precoding groups of multiple BWPs are aligned according to embodiment two of the present disclosure.

Parameter three: Divisions of precoding resource groups in the N bandwidth parts is aligned. The alignment represents that one precoding group in a first bandwidth part includes one precoding group in a second bandwidth part, and/or one precoding group in a second bandwidth part includes one precoding group in a first bandwidth part. As shown in FIG. 12, one precoding groups in BWP1 is the same as one precoding group in BWP2. That is, the one precoding group in BWP1 includes the one precoding group in BWP2, and the one precoding group in BWP2 also includes the one precoding group in BWP1. One precoding group represents that precoding of channel signals (for example, PDSCHs) located in the one precoding group are the same, and/or precoding of reference signals (for example, demodulation reference signals) located in the one precoding group are the same. This is because channels in two BWPs are target channels of one terminal. If precoding groups are aligned, it helps the one terminal to cancel interference. Otherwise, as shown in FIG. 11, one precoding group in PDSCH1 includes two precoding groups of PDSCH2, and thus, it is not easy for a terminal to cancel interference caused by PDSCH2 when the terminal receives PDSCH1.

Parameter four: Parameters, which belong to a predetermined parameter set, of channels and/or signals in the N bandwidth parts have the same configuration. As shown in FIG. 5, two BWPs share a configuration of radiolinkmonitoring. Alternatively, as shown in FIG. 6, radiolinkmonitoring and pdsch-config are shared. FIGS. 5 and 6 show sharing modes. This embodiment does not exclude that each BWP is independently configured with radiolinkmonitoring and/or pdsch-config, merely requiring that radiolinkmonitoring and/or pdsch-config configured in the two BWPs are the same. The parameter in the predetermined parameter set may further be at least one of the following: rate matching information, measurement reference signal information, a notification mode of a precoding resource group (specifically, refer to prb-BundlingType in protocol 38.331), or an aperiodic measurement reference signal.

Parameter five: When an intersection of time domain resources and/or frequency domain resources and/or reference signals occupied by channels and/or signals in the N bandwidths exists, the channels and/or signals in the N bandwidths have the same transmission direction and cannot be on the same resource. One TRP instructs the terminal to perform an uplink transmission. Another TRP instructs the terminal to perform a downlink transmission. Further, an association exists among slot structure configurations in the N bandwidth parts. For example, the terminal cannot be instructed to perform a downlink transmission by BWP2 (corresponding TRP2) on a time domain and/or frequency domain resource which is in BWP1 and used for instructing the terminal to perform an uplink transmission; and/or the terminal cannot be instructed to perform a channel and/or signal transmission by BWP2 (corresponding TRP2) on a reserved time domain and/or frequency domain resource which is used for instructing the terminal. Reserved domains represent that the terminal is to perform rate matching on channels and/or signals in these domains, and cannot perform the channel and/or signal transmission in theses reserved domains, and/or BWP1 and BWP2 share one piece of slot structure indication information.

The description is given above using an example where two BWPs are activated in one CC. The present disclosure does not exclude that N BWPs are activated. N is an integer greater than 2.

In the above, in order to implement that different TRPs may be configured with different parameters, it is adopted that different BWPs are configured for different TRPs, but the activated N BWPs configured for one terminal need to satisfy an agreed condition.

Figure 13:
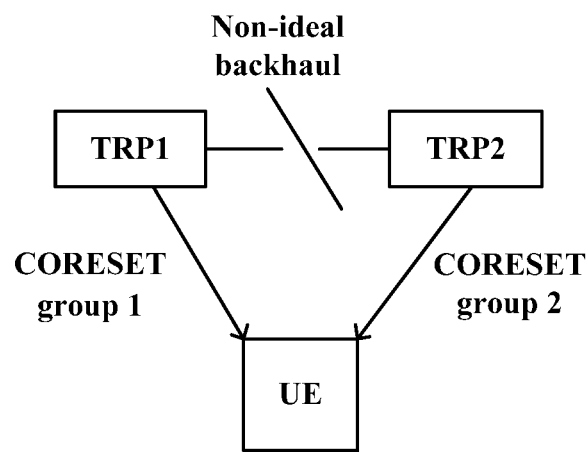
FIG. 13 is a schematic diagram illustrating that in a multiple-TRP transmission, different TRPs correspond to different control channel resource groups according to embodiment two of the present disclosure.

Further, configuration parameters of channels and/or signals in the N bandwidth parts need to satisfy an agreed condition. In another implementation of this embodiment, in order to implement that different TRPs may be configured with different parameters, the following modes may be adopted: there is only one BWP in an activated state at one time instant in one CC, different control channel resource groups included in one BWP correspond to different TRPs, and one BWP may include multiple sets of configurations of PDSCHs/PUCCHs/PUSCHs/reference signals. In this case, a correspondence among multiple sets of control channel resource groups and multiple sets of PDSCHs/PUCCHs/PUSCHs/reference signals is established, and it can be implemented that channels and/or signals of different TRPs have different configurations. As shown in FIG. 13, one CORESET is a control channel resource, and CORESET group 1 may include one or more CORESETs. When there is an intersection of resources occupied by a first type of channels and/or signals scheduled by control information in CORESET group 1 and resources occupied by a second type of channels and/or signals scheduled by control information in CORESET group 2, configuration parameters of the two types of channels and/or signals need to satisfy an agreed condition similar to the above agreed condition that needs to be satisfied by configuration parameters of different types of channels and/or signals belonging to different bandwidth parts.

In another aspect, DCI included in CORESET1 and DCI included in CORESET2 may both indicate BWPs, but two BWPs each of which is in an activated state in the same time unit and indicated by two CORESET groups need to satisfy the above agreed condition that needs to be satisfied by the N BWPs, or it is agreed that activated BWPs of CORESET group 1 and CORESET group 2 in the same time unit are the same.

In FIG. 13, one control channel resource is one CORESET. Certainly, in this embodiment, one control channel resource may be one search space set, or one search space, or one control channel candidate or, certainly, another control channel resource.

Certainly, a group information identifier may be directly configured for one channel and/or signal. For example, the group information identifier is 0, and then the one channel and/or signal is sent by TRP1 or sent to TRP2. For example, the group information identifier is 1, and then the one channel and/or signal is sent by TRP2 or sent to TRP2. Channels and/or signals associated with different group identifiers are different channels and/or signals. Configurations of the channels and/or signals need to satisfy the above constraint condition. Alternatively, the above association relationship exists among parameter configurations of the channels and/or signals.

Embodiment Three

In embodiment two, there are N BWPs each of which is in an activated state in the same time period in one CC, the N BWPs are limited, as much as possible, not to be far away from each other while a BWP corresponding to each TRP is supported to be independently configured with a parameter, so that a terminal side may receive channels and/or signals based on a larger BWP that can include the N BWPs, thus reducing the power consumption of the terminal.

Figure 14:
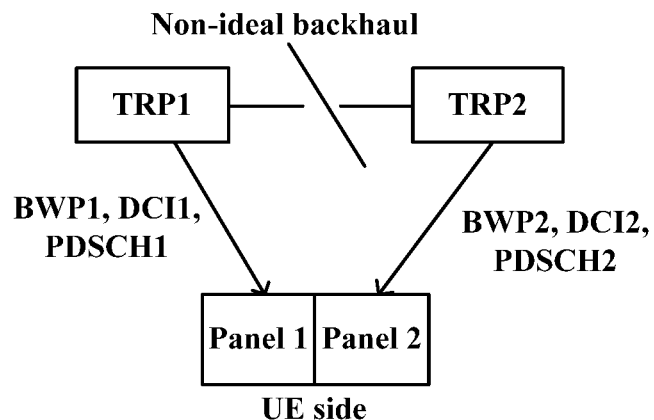
FIG. 14 is a schematic diagram illustrating that different panels of a terminal receive different BWPs according to embodiment three of the present disclosure.
Figure 15:
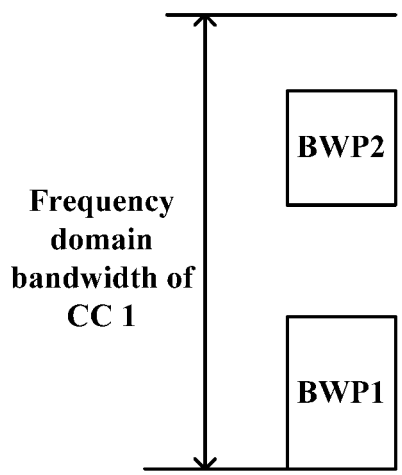
FIG. 15 is a schematic diagram illustrating that N BWPs each of which is in an activated state in the same time period are frequency division multiplexed according to embodiment three of the present disclosure.

In this embodiment, a description is given below from another perspective. The N BWPs each of which is in an activated state in the same time period in one CC need to be frequency division multiplexed. As shown in FIG. 14, there is no ideal backhaul between two TRPs. To reduce the interference between the two TRPs, BWPs corresponding to the two TRPs may be frequency division multiplexed, thus enhancing the robustness and reducing the power consumption. Each panel of the terminal side processes only a smaller bandwidth. As shown in FIG. 14, panel1 of the terminal processes only BWP1 bandwidth, and panel2 of the terminal processes only BWP2 bandwidth. When a link between the terminal and one TRP is interrupted, a link between the terminal and another TRP may be maintained. A frequency domain distribution of BWP1 and a frequency domain distribution of BWP2 in FIG. 14 are shown in FIG. 15. It can be seen that no overlap exists between a frequency domain resource occupied by BWP1 and a frequency domain resource occupied by BWP2.

Figure 16:
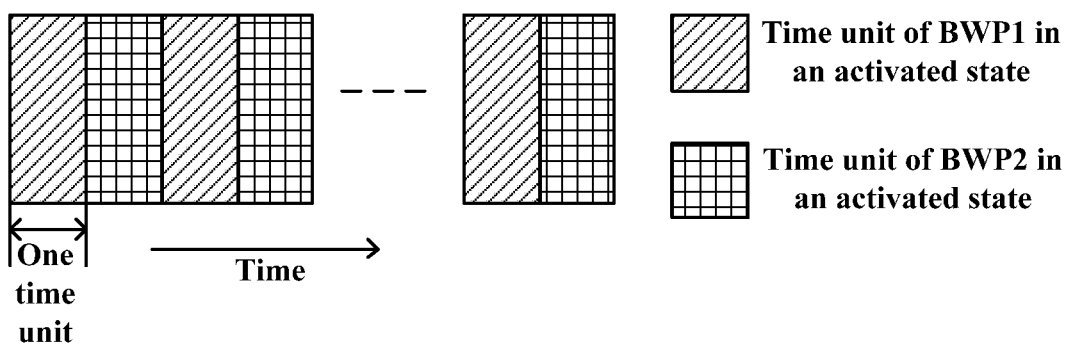
FIG. 16 is a schematic diagram illustrating that different time unit sets correspond to different activated BWP sets according to embodiment three of the present disclosure.

In NR protocols, BWP switching may be implemented in the following three modes: dynamic switching, radio resource control (RRC) reconfiguration or starting time window timing (switching to a predetermined BWP when the timing is over). In another implementation of this embodiment, it is feasible to enable BWP sets activated in different time periods and configured through RRC signaling to be different while the link robustness is enhanced and the power consumption of the terminal is reduced. That is, an association relationship between a time unit set and an activated BWP set is established in RRC signaling. As shown in FIG. 16, in RRC signaling or medium access control-control element (MAC-CE) signaling, it is notified that BWP1 in a first time unit set (that is, in time units represented by oblique lines) is an activated BWP, and that BWP2 in a second time unit set (that is, in time units represented by grids) is an activated BWP. Alternatively, in RRC signaling/MAC-CE signaling, it is notified that BWP1 in a first time unit set (that is, in time units represented by oblique lines) is a default BWP, and that BWP2 in a second time unit set (that is, in time units represented by grids) is a default BWP. The specific meanings of the default BWP and the activated BWP can refer to protocol 38.213. The division of different time unit sets in FIG. 16 is merely an example and other divisions are not excluded. In this embodiment, one time unit may be one slot, a time domain length corresponding to one orthogonal frequency division multiplexing (OFDM) symbol, or a sub-frame. Certainly, this embodiment does not exclude other time units.

Further, a correspondence between T1 time unit sets and T1 activated BWP sets may be determined, and/or a correspondence between T1 time unit sets and T1 default BWP sets may be determined. In this embodiment, the correspondence may be notified in one piece of control signaling. In this embodiment, time units included in one time unit set of the T1 time unit sets are inconsecutive. T1 is a positive integer greater than or equal to 1. Optionally, time units of the T1 time units are present in turn.

Embodiment Four

Figure 17:
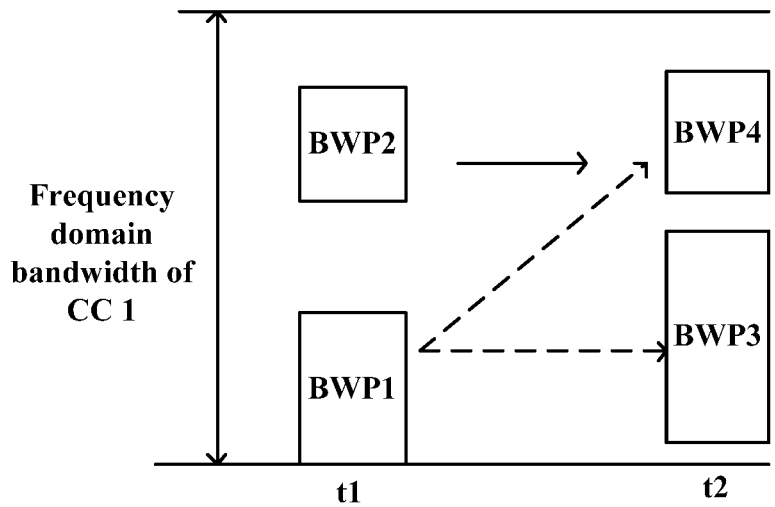
FIG. 17 is a schematic diagram of BWP switching within one time period according to embodiment four of the present disclosure.

In embodiments two and three above, N BWPs each of which is in an activated state in the same time unit satisfy a predetermined condition. As shown in FIG. 17, a BWP set in an activated state at time t1 is {BWP1, BWP2}, a BWP set in an activated state at time t2 is {BWP3, BWP4}, and a control channel in BWP1 and/or BWP2 in an activated state at time t1 triggers and activates BWPs in time period t2 to be {BWP3, BWP4}. When multiple BWPs correspond to multiple TRPs and there is no ideal backhaul among these TRPs, a switching problem of N BWPs needs to be considered.

In FIG. 17, when BWP1 corresponds to TRP1, BWP2 corresponds to TRP2, and there is no ideal backhaul between TRP1 and TRP2, if both TRP1 and TRP2 may dynamically indicate BWP switching indication information, a BWP triggered by dynamic control signaling in BWP1 corresponding to TRP1 and a BWP triggered by dynamic control signaling in BWP2 corresponding to TRP2 cannot satisfy a predetermined condition that needs to be satisfied by the N BWPs each of which is in an activated state in the same time period. In view of this, there may be the schemes described below.

Scheme 1: Only DCI transmitted in one BWP of the N BWPs is allowed to have BWP dynamic switching indication information. For example, DCI in a primary BWP has BWP dynamic switching indication information, and another BWP cannot have dynamic switching indication information. After one BWP is switched, another BWP also needs to be switched. Alternatively, after one BWP is switched, if another BWP does not satisfy an agreed condition, another BWP needs to be switched or deactivated (it is to be noted that "deactivated" refers to that the BWP is in a non-activated state). In this way, in this embodiment, even if multiple BWPs are configured in one CC, it is also necessary to indicate, in configuration information of a BWP, whether a control channel included in the BWP includes BWP switching indication information. That is, the number of bits of a bandwidth part indicator field in DCI1_1 or DCI0_1 in protocol 38.212 is not only acquired according to the number of BWPs configured in a CC, but also determined according to whether BWP_Indicator_Present is configured in a BWP where DCI1_1 or DCI0_1 is located. When BWP_Indicator_Present is enabled, the number of bits of the bandwidth part indicator field in DCI1_1 or DCI0_1 transmitted in the BWP is acquired according to the number of BWPs configured in the CC. When BWP_Indicator_Present is not enabled, the number of bits of the bandwidth part indicator field in DCI1_1 or DCI0_1 transmitted in the BWP is 0, even if the number of BWPs configured in the CC where the BWP is located is greater than 1. The above BWP_Indicator_Present signaling may be referred to as an enable field for indicating whether a BWP indicator field in the DCI can be acquired according to the number of bandwidth parts configured in the CC. BWP_Indicator_Present may have another name.

For example, BWP_Indicator_Present is configured to be enabled in BWP1, and then the number of bits of the bandwidth part indicator field in DCI1_1 and/or DCI0_1 in BWP1 may be greater than 0, thus indicating a BWP dynamic switching. BWP_Indicator_Present is configured to be not enabled in BWP2, the number of bits of the bandwidth part indicator field in DCI1_1 and/or DCI0_1 in BWP2 is 0. That is, DCI1_1 and/or DCI0_1 in BWP2 cannot indicate a BWP dynamic switching.

The value of the bandwidth part indicator field in DCI1_1 and/or DCI0_1 above indicates one BWP. Further, when DCI1_1 and/or DCI0_1 in BWP1 indicates a BWP switching, for example, as shown in FIG. 17, a switching from {BWP1, BWP2} to {BWP3, BWP4} is indicated, each indicator value in the bandwidth part indicator in DCI 1_1 and/or DCI 0_1 may correspond to one or more BWPs, and a correspondence shown in Table 1 is established in high layer signaling. When a difference set of a BWP set indicated by the bandwidth part indicator in the DCI and the currently activated BWP set is empty, no BWP switching is started. When the difference set of the BWP set indicated by the bandwidth part indicator in the DCI and the currently activated BWP set is nonempty, the BWP switching is started. If there are 2 currently activated BWPs in Table 1, and a BWP indicated in DCI is activated to be {BWP5} in Table 1, the number of activated BWPs can be changed from 2 to 1. The BWP_Indicator_Present signaling should be referred to as an enable field indicating whether the BWP indicator field in the DCI can be acquired according to the number of bandwidth part sets configured in a CC. When the BWP_Indicator_Present is enabled, the number of bits of the bandwidth part indicator field is acquired according to the number of bandwidth part sets configured in the CC. As shown in Table 1, four BWP sets are configured, that is, {BWP1, BWP2}, {BWP3, BWP4}, {BWP5}, {BWP6, BWP7}, so the number of bits of the bandwidth part indicator field is 4. When the BWP_Indicator_Present is not enabled, even if multiple BWP sets are configured in the CC, the number of bits of the bandwidth part indicator field in control signaling in the BWP is 0. In Table 1, an intersection of bandwidth parts included in different bandwidth part sets is empty. This embodiment does not exclude that the intersection of the bandwidth parts included in the different bandwidth part sets is nonempty. In Table 1, one bandwidth part set only includes at most 2 BWPs. Certainly, this embodiment does not exclude that more than 2 BWPs may be included. Certainly, in this embodiment, one BWP set may be an empty set. When one BWP set is an empty set, the empty set represents that multiple currently activated BWPs are to be deactivated.

TABLE 1

| Bandwidth Part Indicator Value | Activated BWP |
| --- | --- |
| 00 | {BWP1, BWP2} |
| 01 | {BWP3, BWP4} |
| 10 | {BWP5} |
| 11 | {BWP6, BWP7} |

In the above, BWP_Indicator_Present is configured in the BWP. Certainly, BWP_Indicator_Present may be configured in a CORESET or a search space. Certainly, whether BWP_Indicator_Present is enabled may be acquired according to an agreed rule. For example, there are a primary BWP and a secondary BWP in the N BWPs, BWP_Indicator_Present in the primary BWP is enabled, and BWP_Indicator_Present in the secondary BWP is not enabled.

Similarly, if as shown in FIG. 13, different TRPs correspond to different CORESET groups, then in multiple CORESET groups, BWP_Indicator_Present in control information in only one CORESET group is enabled, and BWP_Indicator_Present in control information in another CORESET group is not enabled. That is, the number of bits of a BWP indicator field in the DCI in the CORESET group is 0, even if the number of candidate BWP sets included in the CC is greater than 1.

Scheme 2: Two BWPs/two CORESET groups may both dynamically trigger a new BWP. If the N BWPs each of which is in an activated state at the same time do not satisfy the agreed condition in embodiment two or three, the terminal deactivates a part of the N BWPs. Further, the terminal may notify a base station of information about the deactivated BWPs, or merely notify the base station of the deactivation action. Alternatively, when the N BWPs do not satisfy a constraint condition, the terminal requests to deactivate one or more BWPs between the base stations.

Embodiment Five

Figure 18:
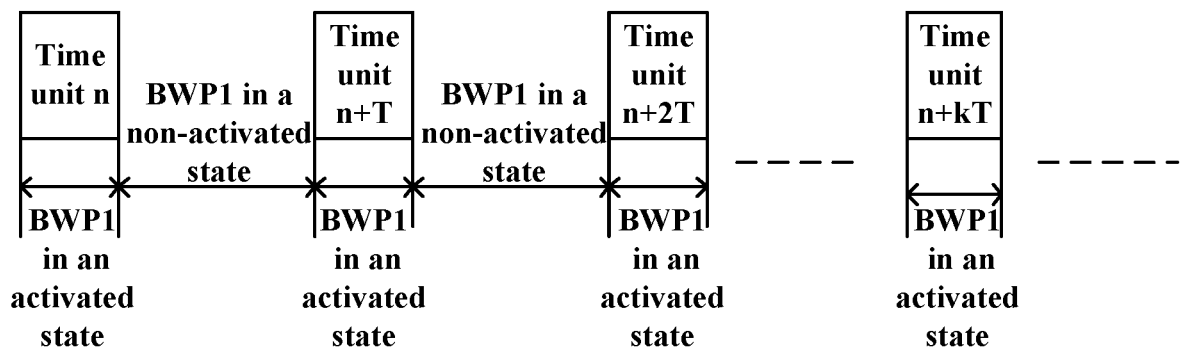
FIG. 18 is a schematic diagram illustrating that BWP1 is in an activated state periodically according to embodiment five of the present disclosure.

In this embodiment, one BWP is in an activated state periodically. For example, one BWP is in an activated state in {slot n, slot n+T, slot n+2T, . . . , slot n+kT, . . . } and in a non-activated state in other slots. T is a positive integer greater than or equal to 1. It is necessary to configure period and period offset information of the one BWP in control signaling of the one BWP. As shown in FIG. 18, BWP1 is in an activated state periodically and in a non-activated state between two periods.

In another implementation of this embodiment, one BWP is in an activated state semi-persistently. That is, the one BWP may be activated into a periodic activated state through control signaling, or be deactivated through control signaling, so that the one BWP is in a non-activated state. This is similar to a semi-persistent reference signal.

When a BWP may be periodic or semi-persistent, there may be no activated BWP in certain time units in one CC, and the terminal may not receive any signals on these time units, thus reducing the power consumption of the terminal. Even if there are previously configured channels and/or signals on these BWPs, the terminal does not receive any channels and/or signals, at least any channels and/or signals in this CC.

Embodiment Six

In this embodiment, there are a primary BWP and a secondary BWP in N BWPs each of which is in an activated state at the same time period. The primary BWP and the secondary BWP have at least one of the features described below.

Feature one: A signal scheduled by a control channel of the primary bandwidth part is in the secondary bandwidth part. That is, control information of the primary bandwidth part may schedule the channel and/or signal of the secondary bandwidth part, but control information of the secondary bandwidth part cannot schedule the channel and/or signal of the primary bandwidth part; or the secondary bandwidth part includes no control channel. Additionally/Alternatively, in this embodiment, the primary bandwidth part includes a common control channel, and the secondary bandwidth part includes no common control channel. Information obtained based on the common control information of the primary bandwidth part may be used for the secondary bandwidth part.

Feature two: The minimum spacing between time units in a time unit set in an activated state where the primary bandwidth part is located is less than or equal to a predetermined value. Time units where the primary bandwidth part is located are consecutive.

Feature three: At least one primary bandwidth part exists in one time unit.

Feature four: At least one primary bandwidth part exists in one time unit except for switching time (i.e. a time slot where the primary bandwidth part is switched) of two primary bandwidth parts.

Through the constraints of features 3 and 4 above, the primary bandwidth part cannot be in a periodic activated state. One period includes more than one time units. That is, at least one primary bandwidth part exists in each time unit. That is, a signal sent to a terminal by a base station in each time unit may be sent by using at least the primary bandwidth part. Otherwise, when the base station needs to send a signal to the terminal in one time unit, but there is no primary bandwidth part in the one time unit, a control channel cannot be sent, or a signal cannot be sent, for example, in the case where the secondary bandwidth part is periodic or semi-persistent.

Feature five: The secondary bandwidth part is in a periodic activated state. One period of the secondary bandwidth part includes one or more time units.

Feature six: The secondary bandwidth part is in an activated state semi-persistently. One period of the secondary bandwidth part includes one or more time units.

It is to be understood that the secondary bandwidth part is in a periodic activated state when activated, thus having a period.

Feature seven: The terminal determines, according to a predetermined rule or received signaling information, a period and/or period offset of the secondary bandwidth part in an activated state. For example, the period and the period offset of the secondary bandwidth part are notified in the signaling information.

Feature eight: The primary bandwidth part and the secondary bandwidth part in the N bandwidth parts are determined according to a predetermined rule or received signaling information.

For example, which bandwidth parts are primary bandwidth parts and which bandwidth parts are secondary bandwidth parts in the N bandwidth parts are notified in the signaling information. Preferably, in the N bandwidth parts, there is only one primary bandwidth part, and other bandwidth parts are all secondary bandwidth parts; or it is determined, according to a bandwidth part identification number (for example, bwp-Id in protocol 38.331), which bandwidth parts are primary bandwidth parts and which bandwidth parts are secondary bandwidth parts in the N bandwidth parts. For example, a BWP corresponding to the lowest bwp-Id is the primary bandwidth part, and other BWPs are secondary bandwidth parts.

Feature nine: When a component carrier to which the N bandwidth parts belong is a primary component carrier of one component carrier group, a primary bandwidth part exists in the N bandwidth parts.

When the component carrier to which the N bandwidth parts belong is a secondary component carrier of one component carrier group, the N bandwidth parts are all secondary bandwidth parts.

For example, there is certainly a primary bandwidth part in a PCell in an MCG, and there may be no primary bandwidth part in other CCs in the MCG. There is certainly a primary bandwidth part in a PSCell in an SCG, and there may be no primary bandwidth part in other CCs in the SCG.

Feature ten: When a component carrier to which the N bandwidth parts belong is an activated component carrier, a primary bandwidth part exists in the N bandwidth parts.

When the component carrier to which the N bandwidth parts belong is a non-activated component carrier, the N bandwidth parts are all secondary bandwidth parts.

Feature eleven: Dynamic control information transmitted in the primary bandwidth part carries dynamic switching indication information of the primary bandwidth part.

Feature twelve: Dynamic control information transmitted in the primary bandwidth part carries dynamic switching indication information of the secondary bandwidth part.

Feature thirteen: The number of bits of a bandwidth part indicator field in dynamic control information transmitted in the primary bandwidth part is acquired according to the number of bandwidth parts configured in a component carrier. Referring to embodiment seven, BWP_Indicator_Present is enabled in the primary bandwidth part.

Feature fourteen: The number of bits of a bandwidth part indicator field in dynamic control information transmitted in the primary bandwidth part is acquired according to the number of bandwidth part sets configured in a component carrier.

Feature fifteen: The number of bits of a bandwidth part indicator field in dynamic control information transmitted in the secondary bandwidth part is 0. Referring to embodiment seven, BWP_Indicator_Present is not enabled in the secondary bandwidth part.

Embodiment Seven

Figure 19:
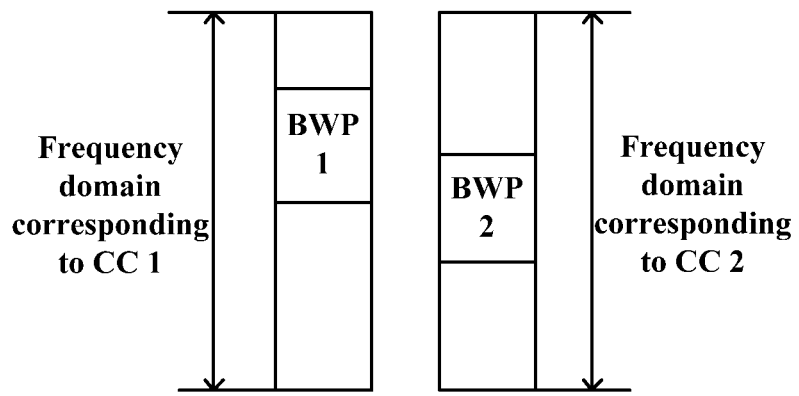
FIG. 19 is a schematic diagram illustrating that multiple BWPs each of which is in an activated state in two co-frequency CCs need to satisfy an agreed condition according to embodiment seven of the present disclosure.
Figure 20:
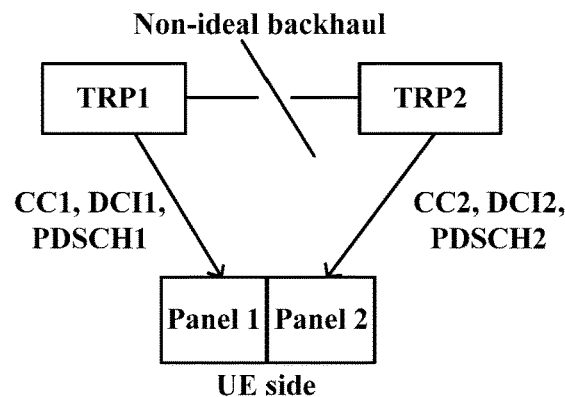
FIG. 20 is a schematic diagram illustrating that different CCs in two co-frequency CCs correspond to different TRPs serving the same terminal according to embodiment seven of the present disclosure.

In this embodiment, BWPs each of which is in an activated state and included in two CCs satisfy a predetermined condition. As shown in FIG. 19, a BWP in an activated state in CC1 is BWP1, and a BWP in an activated state in CC2 is BWP2. BWP1 and BWP2 need to satisfy an agreed condition, and/or a parameter of a channel and/or signal included in BWP1 and a parameter of a channel and/or signal included in BWP2 need to satisfy an agreed condition. The agreed condition may be one or more of the constraint conditions in embodiments one and two. In FIG. 19, an overlap exists between a frequency domain resource occupied by CC1 and a frequency domain resource occupied by CC2. The configurations of them may be as follows: each CC may be independently configured according to the configurations in protocol 38.331. This embodiment also does not exclude that there is an intersection of frequency domain occupied by the two CCs associated with each other, and the two CCs do not necessarily completely overlap with each other. Certainly, there may be no intersection of frequency domain occupied by the two CCs associated with each other. As shown in FIG. 20, each CC of the two CCs corresponds to a respective TRP of the two TRPs.

Further, the BWPs each of which is in an activated state and included in the two CCs need to satisfy the agreed condition and, specifically, BWPs each of which is in an activated state and included in two CCs in one time unit need to satisfy the agreed condition.

Further, since the BWPs each of which is in an activated and included in the two CC need to satisfy the agreed condition, the switching between the BWPs in the CCs cannot be arbitrary. In view of this, there may be the schemes described below.

Scheme 1: In two CCs associated with each other, control signaling of only one CC includes BWP switching indication information. Preferably, the BWP switching indication information indicates BWP switching in the two CCs. For example, in FIG. 19, control signaling in only CC1 includes BWP switching indication information, indicating BWP dynamic switching indication information in CC1 and CC2. When the BWP dynamic switching indication information indicates the current BWP, the related process of BWP switching is not started in a corresponding CC. In this case, CC2 may still include a control channel.

Scheme 2: Two CCs may both include control channels of BWP dynamic switching indication information. When BWPs dynamically triggered in the two CCs does not satisfy a constraint condition, the terminal notifies the base station of this information, and/or the terminal abandons receiving a channel and/or signal in one BWP.

Further, since the two CCs are associated with each other, if the two CCs are located in two different CC groups, for example, CC1 is located in an MCG and CC2 is located in an SCG, then it is necessary to establish an association relationship between a CC in the MCG and a CC in the SCG. Configuration parameters of the two CCs associated with each other need to satisfy an agreed condition, and/or configuration parameters of channels and/or signals in the two CCs associated with each other need to satisfy an agreed condition. Preferably, an overlap exists between frequency domain resources of the two CCs associated with each other. Certainly, this embodiment does not exclude that no overlap exists between the frequency domain resources of the two CCs associated with each other, but an overlap exists between spatial domain resources occupied by the two CCs.

For example, slot structure indications of the two CCs is limited, and the UE cannot be instructed to perform an uplink transmission by CC2 (corresponding to TRP2) on time domain and/or frequency domain where the UE is instructed to perform an uplink transmission by CC1 (corresponding to TRP1); and/or the two CCs share a slot structure indicator field. The slot structure indication information includes an SFI indicated in DCI format 20, and slot structures notified in high layer common information tdd-UL-DL-ConfigurationCommon, tdd-UL-DL-Configuration-Common2, dedicated signaling tdd-UL-DL-ConfigDedicated. A semi-persistent channel configured by a high layer, a periodic reference signal, a semi-persistent reference signal, and a channel and/or signal notified in a DCI. The specific meanings of these pieces of signaling can refer to protocols 38.331 and 38.213. That is, when an overlap exists between a resource occupied by a channel and/or signal in CC1 and a resource occupied by a channel and/or signal in CC2, these two types of channels and/or signals have the same transmission direction, for example, all downlink signals or all uplink signals. Otherwise, one type is uplink, and the other type is downlink, resulting stronger interference.

Embodiment Eight

Figure 21:
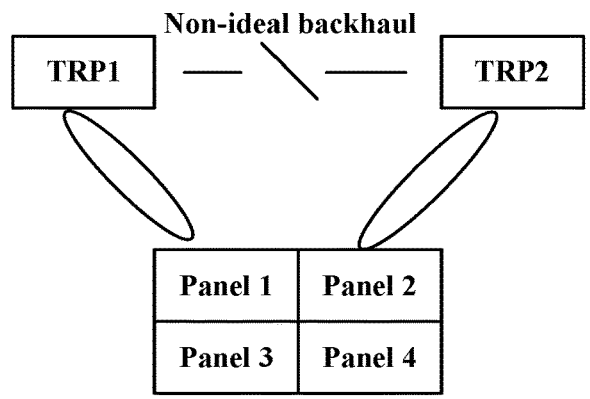
FIG. 21 is a schematic diagram of the case where one terminal is kept connected to two TRPs, there is no ideal backhaul between the two TRPs, and the two TRPs may be independently scheduled according to embodiment eight of the present disclosure.

In this embodiment, as shown in FIG. 21, one terminal (UE) is maintained to be connected to two TRPs, there is no ideal backhaul between the two TRPs, and the two TRPs may be independently scheduled. The UE robustness is enhanced while the throughput rate is increased by increasing the spatial dimension.

For example, two TRPs are in one-to-one correspondence with two CORESET groups or two BWPs or two CCs. Preferably, an overlap exists in frequency domain between the two BWPs and/or the two CCs, so there may be a conflict between uplink signals scheduled by the two TRPs.

For example, TRP1 schedules PUSCH1, and TRP2 schedules PUSCH2. If an overlap exists between only time domain resources and/or frequency domain resources of PUSCH1 and PUSCH2, but demodulation reference signals occupied by PUSCH1 and PUSCH2 are orthogonal and spatial domain resources occupied by PUSCH1 and PUSCH2 are different, that is, spatial transmit filter parameters are different. Moreover, the terminal can simultaneously emit transmit beams of PUSCH1 and PUSCH2 and the sum of transmit power of PUSCH1 and PUSCH2 does not exceed a threshold, then it is regarded that there is no conflict between PUSCH1 and PUSCH2. The terminal sends PUSCH1 and PUSCH2 to the two TRPs by using two respective panels.

It is regarded that there is a conflict between PUSCH1 and PUSCH2 if there is at least one of the following cases between PUSCH1 and PUSCH2 where: a demodulation reference signal in a demodulation reference signal set occupied by PUSCH1 is non-orthogonal to a demodulation reference signal in a demodulation reference signal set occupied by PUSCH2; space transmit filter parameters occupied by PUSCH1 and PUSCH2 are the same; the terminal is unable to simultaneously emit space transmit filter parameters occupied by PUSCH1 and PUSCH2; or the sum of transmit power of PUSCH1 and PUSCH2 exceeds a threshold.

After the conflict occurs, there are the schemes described below.

Scheme one: one of the PUSCHs is selected and sent according to signaling information and/or an agreed rule.

For example, the selected PUSCH is a PUSCH having a higher priority. For example, it is determined, according to priorities of the two TRPs, which PUSCH to be selected and sent. A priority of a TRP may be embodied by a priority of the following pieces of information: a CORESET group/BWP/CC.

For example, PUSCHi is scheduled through control information in CORESETi group, or PUSCHi is located in BWPi, or PUSCHi is located in CCi, where i=1, 2. It is determined, according to priorities of CORESET group 1 and CORESET group 2, whether PUSCH1 or PUSCH2 is selected and sent. Alternatively, it is determined, according to priorities of BWP1 and BWP2, whether PUSCH1 or PUSCH2 is selected and sent. Alternatively, it is determined, according to priorities of CC1 and CC2, whether PUSCH1 or PUSCH2 is selected and sent.

Scheme two: In the overlapping part between the two PUSCHs, one PUSCH is selected and sent. In a non-overlapping part between the two PUSCHs, the two PUSCHs are both sent.

For example, PUSCH1 occupies demodulation reference signal ports {1, 2, 3}, PUSCH2 occupies demodulation reference signal ports {3, 4, 5}, and the same demodulation reference signal port occupied by PUSCH1 and PUSCH2 is demodulation reference signal port 3. Only one channel can be sent on this demodulation reference signal port. For example, PUSCH1 is selected, and then PUSCH1 is sent on demodulation reference ports {1, 2, 3}, and PUSCH2 is sent on ports {4, 5}.

Similarly, for example, PUSCH1 occupies {beam 1 in panel1, beam 2 in panel2}, and PUSCH2 occupies {beam 3 in panel1, beam 4 in panel3}. Since one panel can only emit one transmit beam at one time instant, there is a conflict if there is an overlap among panels. Specifically, if each panel corresponds to a respective SRS set, each beam corresponds to a respective SRS resource, different SRS resources in different SRS sets can be sent simultaneously, and resources in the same SRS set cannot be sent simultaneously, then a spatial transmit filter parameter of PUSCH1 corresponds to {resource1 in set 1, resource2 in set 2}, and a spatial filter transmit parameter of PUSCH2 corresponds to {resource3 in set 1, resource4 in set3}. Since PUSCH1 and PUSCH2 correspond to the same set 1, and the terminal cannot simultaneously emit resource1 in set1 and resource3 in set1, {resource1 in set1, resource2 in set2} are used for sending PUSCH1, and {resource3 in set3} is used for sending PUSCH2.

Further, if a part of demodulation reference signals is discarded or a part of transmit beams is discarded since there is a partial overlap between resources occupied by one PUSCH and resources occupied by the other PUSCH, then transmission blocks (TBs) where the part of demodulation reference signals or the part of transmit beams is located may be discarded. For example, PUSCH1 occupies demodulation reference signal ports {1, 2, 3, 4}, and PUSCH2 occupies demodulation reference signal ports {3, 5, 6}. Since a conflict occurs between the two PUSCHs on port 3, only PUSCH2 is transmitted on port 3. Ports {1, 2} of PUSCH1 are on one transmission block (each transmission block may independently decode a channel), and ports {3, 4} are on another transmission block. Thus, although the conflict occurs on only port 3, ports {3, 4} are both discarded.

If TRP1 schedules SRS1 and TRP2 schedules SRS2, and a port occupied by SRS1 cannot be orthogonal to a port occupied by SRS2, and/or an overlap exists between spatial domain resources occupied by the two SRSs, then it is indicated that there is a conflict between the two SRSs. This can be processed in the processing mode of the two PUSCHs above, or in the mode described below.

Figure 33:
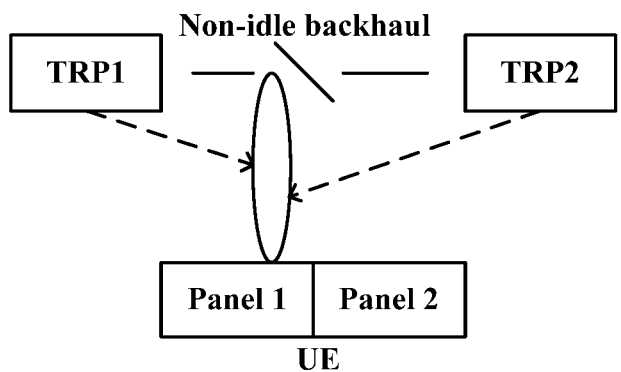
FIG. 33 is a schematic diagram illustrating that beams of channels and/or signals scheduled by two TRPs are the same according to embodiment eight of the present disclosure.
Figure 34:
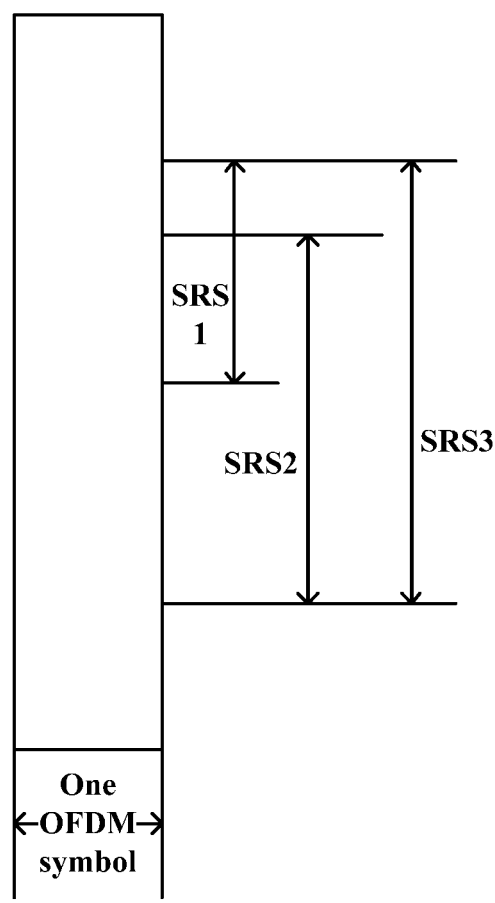
FIG. 34 is a schematic diagram illustrating that two sounding reference signals (SRSs) scheduled by two TRPs and occupying the same beam are combined into one SRS according to embodiment eight of the present disclosure.

As shown in FIG. 33, there is an overlap between a time domain resource occupied by SRS1 and a time domain resource occupied by SRS2, and spatial domain resources of SRS1 and SRS2 are the same. There is a conflict between SRS1 and SRS2 even if ports occupied by these two SRS resources may be orthogonal (for example, frequency domain occupied by these two SRS resources are different, and/or sequences occupied by these two SRS resources are orthogonal, where the sequence orthogonality includes orthogonal cover code (OCC) orthogonality, or different cyclic shifts occupying the same Zadoff-chu (ZC) sequence). Since both the two TRPs desire to measure the same transmit beam, SRS1 and SRS2 may be combined into one measurement reference signal SRS3 (that is, a third type of signals). Further, the sequence length of SRS3 is equal to the length of the intersection part of a frequency domain resource occupied by SRS1 and a frequency domain resource occupied by SRS2 plus the length of a part, other than the intersection part, of the frequency domain resource occupied by SRS1 and the frequency domain resource occupied by SRS2, as shown in FIG. 34. Time advance (TA) and power information of SRS3 may further be adjusted so that both the TRPs can receive SRS3. For example, the TA of SRS3 is the maximum value of TA corresponding to SRS1 and TA corresponding to SRS2, and the power of SRS3 is the maximum value of power of SRS1 and power of SRS2. Certainly, a base station may notify the terminal of the power/TA information of SRS3 through signaling information and/or an agreed rule, so the terminal knows which value of power/TA information of SRS3 to use when SRS3 is used for the sending in the case where there is a conflict between SRS1 and SRS2.

A description is given above using an example where there is a conflict between two types of uplink channels and/or signals. In another implementation of this embodiment, when there is a conflict among resources occupied by multiple types of channels and/or signals scheduled by one TRP, the following mode is adopted that: one type of channels and/or signals is discarded. For example, when an overlap exists between time domain resources occupied by an SRS/PUSCH, one of the SRS or the PUSCH is discarded according to priorities. For example, when there is a conflict between a time domain resource occupied by a PUSCH and a time domain resource occupied by a PUCCH, one of the SRS or the PUSCH is discarded according to priorities. However, if these two types of channels and/or signals are sent to different TRPs and there is no ideal backhaul between the two TRPs, then such a rule should not be adopted. For example, if time domain for sending an SRS to a TRP overlaps with time domain for sending a PUSCH to a different TRP, such a case is not regarded as a conflict, and the SRS and the PUSCH can be sent to different TRPs simultaneously. If time domain for sending an SRS to a TRP overlaps with time domain for sending a PUSCH to the same TRP, such a case is regarded as a conflict, and one of the SRS or the PUSCH is scheduled according to an agreed rule.

The above is described using a conflict between uplink signals as an example. Similarly, a conflict between multiple types of downlink channels and/or signals may be processed in a similar mode.

TRP1 schedules PDSCH1, and TRP2 schedules PDSCH2. If an overlap exists between only time domain resources and/or frequency domain resources of PDSCH1 and PDSCH2, but demodulation reference signals occupied by PDSCH1 and PDSCH2 are orthogonal, and spatial domain resources occupied by PDSCH1 and PDSCH2 are different, that is, spatial transmit filter parameters are different. Moreover, the terminal can simultaneously emit receive beams of PDSCH1 and PDSCH2. Then, it is regarded that there is no conflict between PDSCH1 and PDSCH2. The terminal receives PDSCH1 and PDSCH2 from the two TRPs by using two respective panels.

It is regarded that there is a conflict between PDSCH1 and PDSCH2 if there is at least one of the following cases between PDSCH1 and PDSCH2 where: a demodulation reference signal in a demodulation reference signal set occupied by PDSCH1 is non-orthogonal to a demodulation reference signal in a demodulation reference signal set occupied by PDSCH2; space transmit filter parameters occupied by PDSCH1 and PDSCH2 are the same; or the terminal is unable to simultaneously emit space receive filter parameters occupied by PDSCH1 and PDSCH2. Therefore, it is necessary to solve the conflict problem between PDSCH1 and PDSCH2 by adopting a conflict solution similar to the above conflict solution for PUSCH1 and PUSCH2.

An overlap existing between spatial domain resources occupied by the two types of uplink channels and/or signals indicates that reference signals associated with transmit spatial filters of the two types of uplink channels and/or signals are the same reference signal. For example, a transmit spatial filter of PUSCH1 is associated with SRS1. That is, the transmit spatial filter of PUSCH1 is acquired according to a transmit spatial filter of SRS1.

An overlap existing between spatial domain resources occupied by the two types of uplink channels and/or signals indicates that reference signals associated with transmit spatial filters of the two types of uplink channels and/or signals are the same reference signal. For example, a transmit spatial filter of PUSCH1 is associated with SRS1. That is, the transmit spatial filter of PUSCH1 is acquired according to a transmit spatial filter of SRS1.

The terminal being unable to simultaneously send spatial domain resources occupied by the two types of uplink channels and/or signals includes that group information to which two reference signals associated with transmit spatial filter parameters of the two types of channels and/or signals belong does not satisfy an agreed condition. For example, the two reference signals belong to the same group but are different SRSs, indicating that the spatial transmit filter parameters of the two reference signals cannot be sent simultaneously; the two reference signals belong to different groups, indicating that the terminal can simultaneously send the spatial filter parameters of the two types of channels and/or signals.

Alternatively, the two reference signals belong to the same group, indicating that the spatial transmit filter parameters of the two reference signals can be sent simultaneously; the two reference signals belong to different groups, indicating that the terminal cannot simultaneously send the spatial filter parameters of the two types of channels and/or signals.

The terminal being unable to simultaneously receive spatial domain resources occupied by the two types of uplink channels and/or signals includes that group information to which two reference signals associated with receive spatial filter parameters of the two types of channels and/or signals belong does not satisfy an agreed condition. For example, the two reference signals belong to the same group but are different downlink signals, indicating that the spatial receive filter parameters of the two reference signals cannot be received simultaneously; the two reference signals belong to different groups, indicating that the terminal can simultaneously receive the spatial filter parameters of the two types of channels and/or signals.

Alternatively, the two reference signals belong to the same group, indicating that the spatial receive filter parameters of the two reference signals can be received simultaneously; the two reference signals belong to different groups, indicating that the terminal cannot simultaneously receive the spatial filter parameters of the two types of channels and/or signals.

In the present disclosure, an overlap existing between the two spatial domain resources includes at least one of the following: reference signals associated with the two spatial domain resources are the same; group information to which reference signals associated with the two spatial domain resources belong does not satisfy an agreed condition; or a communication node is unable to simultaneously send reference signals associated with the two spatial domain resources.

An overlap existing between the two reference signals includes that the two reference signals are non-orthogonal.

In the present disclosure, different types of channels and/or signals include one or more of the following cases: a first type of channels and a second type of channels, a first type of channels and a second type of signals, a first type of signals and a second type of signals, a first type of channels and signals and a second type of channels and signals, or a first type of channels and a second type of channels and signals. Different types of channels and/or signals belong to different bandwidth parts of the N bandwidth parts; and/or, different types of channels and/or signals are scheduled by control information in different control channel resource groups of Z control channel resource groups of the D control channel resource groups; and/or the Z types of channels includes at least one of the following channel types: a data channel or a control channel, the Z types of signals include at least one of the following signal types: a measurement reference signal, a demodulation reference signal, a random access signal, a synchronization signal, a resource request signal or a phase-tracking signal.

The channels include one or more of the following channels: a control channel, a data channel or a broadcast channel.

The signals include at least one of the following signals: a demodulation reference signal, a phase-tracking reference signal, a measurement reference signal, a synchronization signal or a random access signal.

In the present disclosure, an association existing between two piece of information includes at least one of the following: one piece of information may be obtained from another piece of information, a configuration range of one piece of information may be obtained according to a configuration of another piece of information, or certain combination values of two pieces of information are unable to occur simultaneously.

In the present disclosure, the resources include at least one of the following resources: a time domain resource, a frequency domain resource, a spatial domain resource, a sequence resource, an antenna resource or a port resource.

Certainly, a group information identifier may be directly configured for an uplink channel and/or signal. For example, the group information identifier is 0, and then the uplink channel and/or signal is a channel and/or signal sent to TRP 1. For example, the group information identifier is 1, and then the uplink channel and/or signal is a channel and/or signal sent to TRP2. Channels and/or signals associated with different group identifiers are different types of channels and/or signals.

Embodiment Ten

Figure 22:
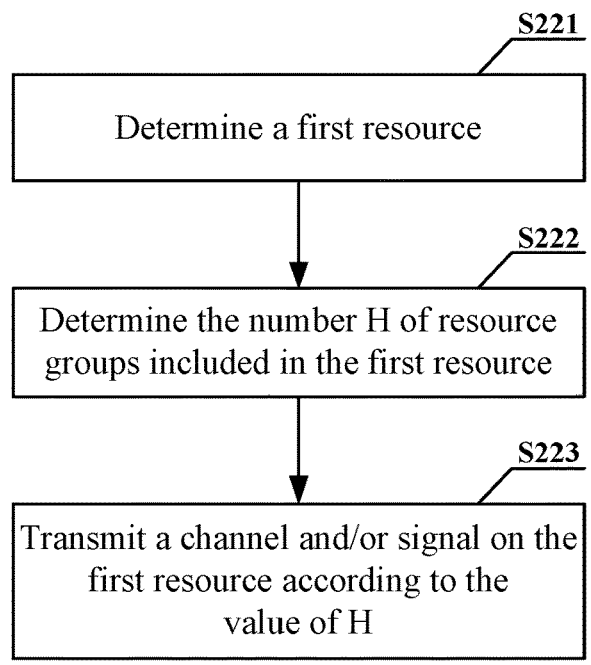
FIG. 22 is a flowchart of an information transmission method according to embodiment ten of the present disclosure.

An information transmission method is provided in this embodiment. As shown in FIG. 22, the method includes the steps described below.

In step S221, a first resource is determined.

In this embodiment, the first resource may be determined according to acquired first control signaling. It is to be noted that the information transmission method provided in this embodiment can be applied to a TRP (for example, a base station) or a terminal. When the method is applied to the base station, the first control signaling may be generated by the base station. When the method is applied to the terminal, the first control signaling may be sent to the terminal by the base station.

In this embodiment, the base station and/or the terminal has resources. The base station and/or the terminal may determine, according to the acquired first control signaling, which resources of the existing resources are used as first resources. For example, there are 100 resource blocks in the terminal originally, and the terminal may determine, according to the first control signaling, which resource blocks are the first resources.

In step 222, the number H of resource groups included in the first resource is determined.

It is to be noted that in this embodiment, a resource group refers to a group divided from the first resource, and the resource group is composed of at least one basic resource unit (for example, a resource block). For example, the first resource has 20 resource blocks numbered 1 to 20, and then resource blocks numbered 1 to 10 may be grouped into one resource group, and resource blocks numbered 11 to 20 may be grouped into one resource group.

In step S223, a channel and/or signal is transmitted on the first resource according to the value of H.

In this embodiment, the resource includes a time domain resource and/or a frequency domain resource.

In this embodiment, H resource groups correspond to H sets of configuration information of the channel and/or signal.

In this embodiment, the H resource groups satisfy at least one of the features described below.

Feature 1: Each resource group of the H resource groups corresponds to respective K quasi co-location reference signal sets, and K groups of demodulation reference signals in each resource group correspond to the respective K quasi co-location reference signal sets corresponding to each resource group.

It is to be noted that K is a positive integer, and demodulation reference signals of a demodulation reference signal group and reference signals in a quasi co-location reference signal set corresponding to the demodulation reference signal group satisfy a quasi co-location relationship with respect to one type of quasi co-location parameters.

Feature 2: Each resource group of the H resource groups corresponds to a respective demodulation reference signal set. A channel in each resource group is transmitted on the respective resource group.

It is to be noted that one demodulation reference signal set includes K1 demodulation reference signal groups, where K1 is a positive integer.

Feature 3: Each resource group of the H resource groups corresponds to a respective channel. A frequency domain resource occupied by the respective channel belongs to each resource group.

Feature 4: The H resource groups correspond to H groups of acknowledgement (ACK)/non-acknowledgement (NACK) information. One group of ACK/NACK information includes a predetermined number of bits, and/or multiple pieces of information in one group of ACK/NACK information are jointly fed back.

Demodulation reference signals in one demodulation reference signal group satisfy a quasi co-location relationship. Demodulation reference signals in different demodulation reference signal groups do not satisfy a quasi co-location relationship.

In this embodiment, the method further includes the following steps: first control information and/or second control information is acquired; and division information and/or H pieces of configuration information of the H resource groups included in the first resource is determined according to the first control information and/or second control information. The first control information may be acquired before the first resource is determined. The second control information may be acquired before the number H of resource groups included in the first resource is determined.

In this embodiment, the value of H may be determined according to one or more of the following pieces of information: information indicated in the first control information, and/or parameter information required for decoding the first control information, and/or configuration information indicated in the first control information.

For example, the first control information may directly carry grouping information, and thus, the value of H may be directly determined according to the grouping information.

It is to be noted that in this embodiment, the first control information satisfies at least one of the following features that: the first control information includes H1 pieces of resource group information, or the first control information includes H3 sets of configuration information.

The second control information satisfies at least one of the following features that: the second control information includes H2 pieces of resource group information, or the second control information includes H4 sets of configuration information.

H1, H2, H3 and H4 are each a non-negative integer.

Here, it is to be noted that the first control information and the second control information may be used for instructing the terminal or the TRP to divide resource groups. The resource group information here may refer to a division of resource groups. Meanwhile, since the H resource groups correspond to the H sets of configuration information of the channel and/or signal, that is, each set of configuration information corresponds to a respective resource group, the division of resource groups may be indicated by the configuration information.

In this embodiment, the configuration information includes at least one of the following pieces of information: a quasi co-location reference signal set of the channel, demodulation reference signal information of the channel, ACK/NACK information of the channel, information about the number of channels, or information about the signal.

According to this embodiment of the present disclosure, the first resource is determined; the number H of resource groups included in the first resource is determined; and the channel and/or signal is transmitted on the first resource according to the value of H. The H resource groups correspond to the H sets of configuration information of the channel and/or signal. The resource includes the time domain resource and/or the frequency domain resource. Thus, when multiple TRPs and/or terminals all transmit information in this way, it can be effectively supported that multiple TRPs provide one terminal with effective services in a beam mechanism.

Embodiment Eleven

In this embodiment, a first resource is notified in first control signaling, and a terminal determines, according to signaling information or an agreed rule, the number H of resource groups included in the first resource. Second control signaling indicates a division of resource groups, and/or at least one of the following pieces of information corresponding to the resource groups: a quasi co-location reference signal set, a demodulation reference signal set, ACK/NACK information, or the number of channels.

Figure 23:
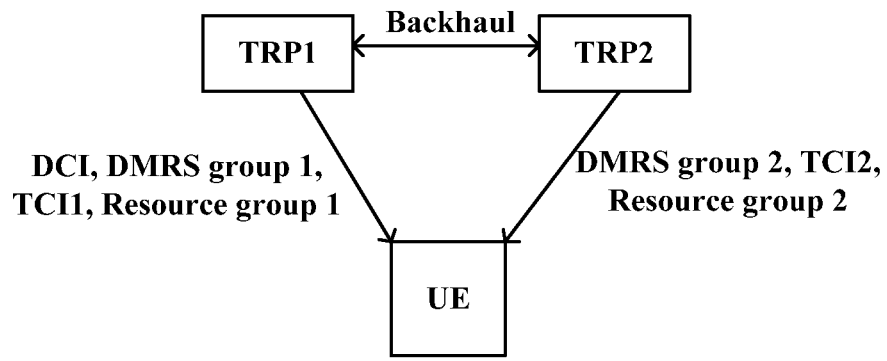
FIG. 23 is a schematic diagram illustrating that different frequency domain groups included in a first resource indicated in one piece of control signaling correspond to different TRPs according to embodiment eleven of the present disclosure.

As shown in FIG. 23, different frequency domain groups correspond to different TRPs. That is, downlink data sent by TRP1 is transmitted in frequency domain group 1, and downlink data sent by TRP2 is transmitted in frequency domain group 2.

Figure 24:
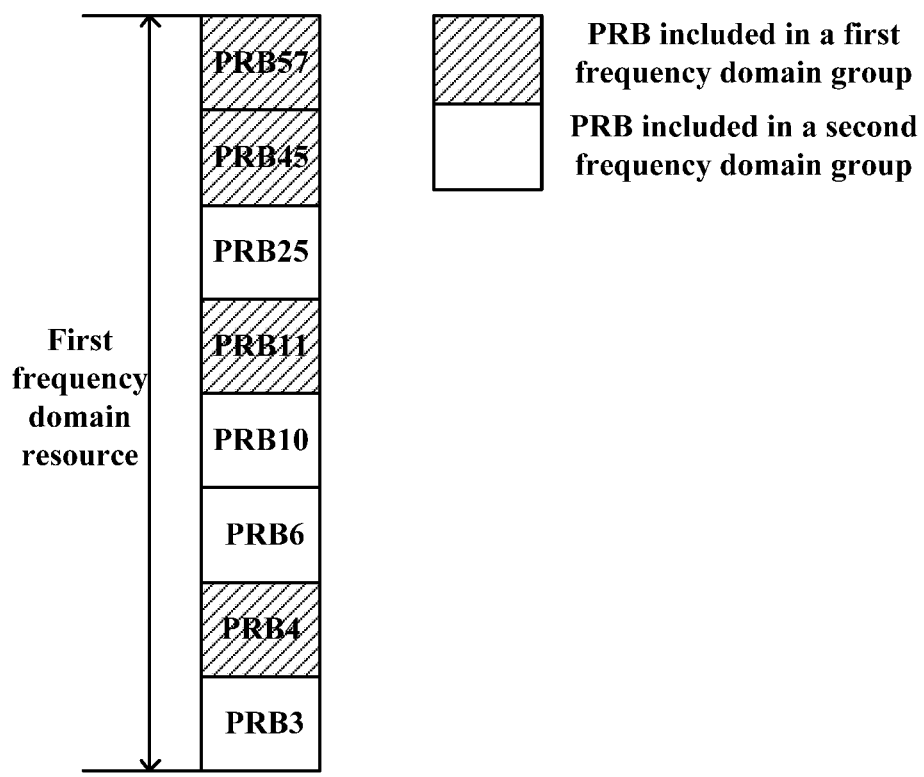
FIG. 24 is a schematic diagram of a division of frequency domain groups included in a first resource indicated in one piece of control signaling according to embodiment eleven of the present disclosure.

In view of this, first frequency domain is notified in the first control signaling. For example, the first frequency domain is physical resource blocks (PRBs) occupied in one BWP (for example, the one BWP includes 100 PRBs). The first frequency domain includes PRBs {3, 4, 6, 10, 11, 25, 45}. The terminal determines, through signaling information or an agreed rule, a frequency domain group included in the first frequency domain. If it is determined that the first frequency domain includes one frequency domain group, then there is no second control signaling. If it is determined that the first frequency domain includes two frequency domain groups, then a division of frequency domain groups included in the first frequency domain is further notified in the second control signaling. As shown in FIG. 24, the first frequency domain group includes PRBs {4, 11, 45, 57}, and the second frequency domain group includes PRBs {3, 6, 10, 25}. In FIG. 24, there is no intersection of PRBs included in two frequency domain groups. In this case, only frequency domain resource blocks occupied by one of the two frequency domain groups may be notified in the second control signaling, and the other frequency domain group is a difference set of the first frequency domain and the one notified frequency domain group.

In another implementation of this embodiment, an intersection of a first frequency domain group and a second frequency domain group exists. In this case, PRBs occupied by each frequency domain group in the first frequency domain may be notified in the second control signaling. Particularly, when the number of PRBs included in a BWP is relatively large, a union of PRBs occupied by data transmitted by two TRPs may be acquired according to the first frequency domain notified in the first control signaling, and then, the division of frequency domain groups may be notified in the second control signaling. Compared with the mode of notifying PRBs occupied by data transmitted by each TRP and the position of the PRBs in the BWP, the mode in this embodiment can save overheads. Moreover, when multiple TRPs and single TRP are dynamically switched, the complexity of blind detections of control channels by the terminal can also be reduced.

After the frequency domain group is determined, it is necessary to determine second information corresponding to each frequency domain group. The second information includes at least one of the following: quasi co-location reference signal information, demodulation reference signal information, ACK/NACK information, or the number of channels. One or more pieces of second information corresponding to each frequency domain group may be notified in the first control signaling, and/or the division of frequency domain groups may be notified in the first control signaling. Then, the terminal obtains the number H of frequency domain groups according to these pieces of information, and thus, it may be determined whether there is the second control signaling. The second information which corresponds to each frequency domain group and is not notified in the first control signaling may be notified in the second control signaling.

For example, two quasi co-location reference signal sets are notified in the first control signaling, and then the terminal knows that the number H of frequency domain groups is 2. If one quasi co-location reference signal set is notified in the first control signaling, the terminal knows that the number H of frequency domain groups is 1. The demodulation signal information may be a set of demodulation reference signal ports corresponding to each resource group, or pattern information of a demodulation reference signal corresponding to each resource group. That is, different resource groups may have different pattern information. For example, different resource groups may have different DMRS type1 information and DMRS type2 information. Certainly, a pattern further includes other information such as time domain and a sequence.

Further, one mode of notifying the quasi co-location reference signal set is that: each quasi co-location reference signal set corresponds to a respective demodulation reference signal set. Demodulation reference signals in the respective demodulation reference signal set satisfy a quasi co-location relationship. A demodulation reference signal in the respective demodulation reference signal set and a reference signal in each quasi co-location reference signal set satisfy a quasi co-location relationship with respect to one type of quasi co-location parameters.

For example, as shown in Table 2, {DMRS1, DMRS2} and RS1 satisfy a quasi co-location relationship with respect to quasi co-location parameters included in typeA, and {DMRS1, DMRS2} and RS2 satisfy a quasi co-location relationship with respect to quasi co-location parameters included in typeD. The quasi co-location parameters included in typeA and typeD can refer to protocol 38.214. In the above mode, the demodulation reference signal set includes one demodulation reference signal group.

Certainly, in another implementation, one demodulation reference signal set may include more than one demodulation reference signal groups. As shown in Table 3, demodulation reference signals in one demodulation reference signal group satisfy a quasi co-location relationship; different demodulation reference signal groups do not satisfy a quasi co-location relationship; one DMRS set includes one or two DMRS groups, and each DMRS group corresponds to a respective quasi co-location reference signal set. DMRSs in the DMRS group and reference signals in a quasi co-location reference signal set corresponding to the DMRSs satisfy a quasi co-location relationship with respect to one type of quasi co-location parameters.

TABLE 2

| DMRS Set | Quasi Co-Location Reference Signal Set |
|---|---|
| {DMRS1, DRMS2} | (RS1, typeA) |
|  | (RS2, typeD) |

TABLE 3

| DMRS Set | DMRS Group |  | Quasi Co-Location Reference Signal Set |
|---|---|---|---|
| DMRS Set 1 | Group 1 | (RS1, typeA) | Quasi Co-Location |
|  | {DMRS11, DRMS12} | (RS2, typeD) | Reference Signal Set 1 |
|  | Group 2 | (RS3, typeA) | Quasi Co-Location |
|  | {DMRS21, DRMS22, DMRS23} | (RS4, typeD) | Reference Signal Set 2 |
| DMRS Set 2 | Group 1 | (RS5, typeA) | Quasi Co-Location |
|  | {DMRS31} | (RS6, typeD) | Reference Signal Set 3 |
|  | Group 2 | (RS7, typeA) | Quasi Co-Location |
|  | DMRS41, DRMS42} | (RS8, typeD) | Reference Signal Set 4 |

In this embodiment, two frequency domain groups may share one or more pieces of second information. For example, demodulation reference signal sets corresponding to the two frequency domain groups are the same.

Preferably, FIG. 23 illustrates that there is an ideal backhaul between two TRPs serving a terminal.

The value of H is determined by using one or more of the methods described below.

Method one: The value of H is determined according to information indicated in the first control information. For example, the indicated value of H is displayed.

Method two: The value of H is determined according to parameter information required for decoding the first control information. The parameter information required for decoding the first control information may include one of the following parameters: cyclic redundancy check (CRC) information of the first control information, or demodulation reference signal information of the first control information. For example, a CRC is a first sequence, and then H is a first value. For example, a CRC is a second sequence, and then H is a second value.

For example, a demodulation reference signal sequence of the first control information is a first sequence, and then H is the first value. For example, a demodulation reference signal sequence of the first control information is a second sequence, and then H is the second value. A demodulation reference signal of the first control information represents a demodulation reference signal of a control channel where the first control information is located. Alternatively, a quasi co-location reference signal of a demodulation reference signal of the first control information belongs to a first group, and then H is the first value; quasi co-location reference signal information of the demodulation reference signal of the first control information belongs to a second group, and then H is the second value. A division of quasi co-location reference signal groups is pre-negotiated.

Method three: The value of H is determined according to demodulation reference signal information of a channel indicated in the first control information. For example, the value of H is the number of demodulation reference signal groups included in the demodulation reference signal set above.

Method four: The value of H is determined according to division information of frequency domain groups indicated in the first control information. For example, the value of H is the number of frequency domain groups.

Method five: The value of H is determined according to quasi co-location reference signal set information indicated in the first control information. For example, the value of H is the number of quasi co-location reference signal sets above.

The first resource may be a frequency domain resource. In this embodiment, the first resource may be a time domain resource. In this case, the value of H is determined to be the number of time domain resource groups included in the first time domain resource.

In the above method, the H resource groups correspond to the H sets of configuration information. The configuration information includes at least one of the following: a demodulation reference signal set, a quasi co-location reference signal set, ACK/NACK information, or information about the number of channels. In the H resource groups, information about H1 resource groups is notified in the first control signaling, and information about H2 resource groups is notified in the second control signaling. Additionally/Alternatively, H3 sets of configuration information are notified in the first control signaling, and H4 sets of configuration information are notified in the second control signaling. H1, H2, H3, H4 are each a non-negative integer. Optionally, H1+H2=H, H3+H4=H, H1=H3, H2=H4.

Embodiment Twelve

Figure 25:
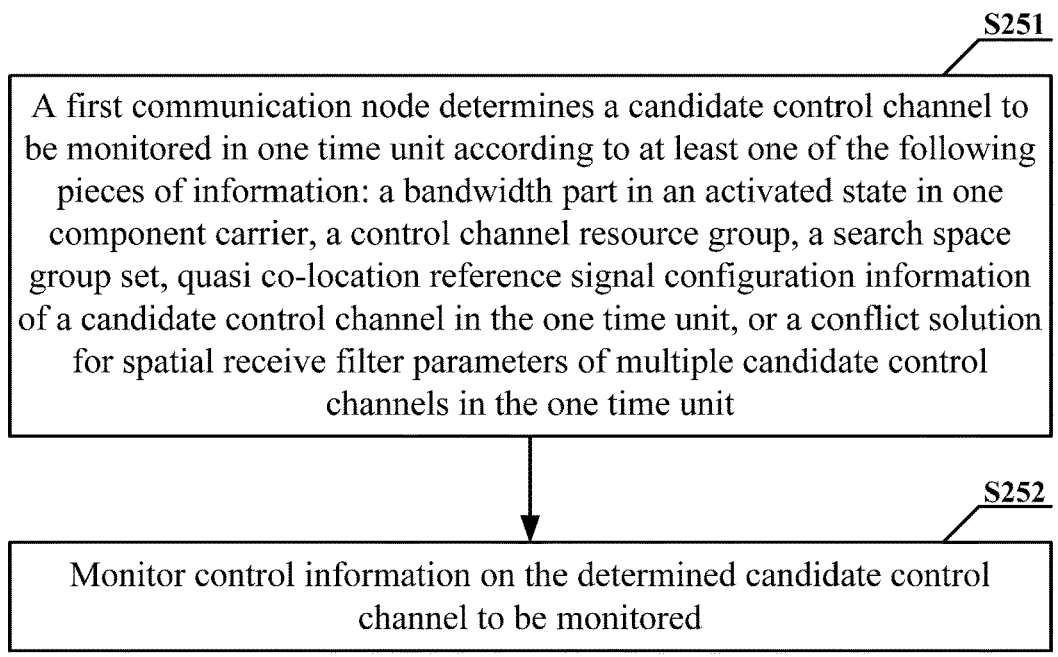
FIG. 25 is a flowchart of a monitoring method according to embodiment twelve of the present disclosure.

This embodiment further provides a monitoring method. As shown in FIG. 25, the method includes the steps described below.

In step 251, a first communication node determines a control channel candidate to be monitored in one time unit according to at least one of the following pieces of information: a bandwidth part in an activated state in one component carrier, a control channel resource group, a set of search space groups, quasi co-location reference signal configuration information of a control channel candidate in the one time unit, or a conflict solution for spatial receive filter parameters of multiple control channel candidates in the one time unit.

In step S252, control information is monitored on the determined control channel candidate to be monitored.

Here, it is to be noted that a conflict exists among the spatial receive filter parameters of the multiple control channel candidates in the time unit in any one of the cases described below.

1. Demodulation reference signals of the multiple control channels in the time unit do not satisfy a quasi co-location (QCL) relationship with respect to spatial receive parameters.

2. In the time unit, demodulation reference signals of multiple control channels overlapping with each other in time domain do not satisfy a QCL relationship with respect to spatial receive parameters.

3. Multiple control channels in the time unit are unable to be received by the first communication node simultaneously.

4. In the time unit, multiple control channels overlapping with each other in time domain are unable to be received by the first communication node simultaneously.

In this embodiment, the conflict solution for the spatial receive filter parameters of the multiple control channel candidates is determined according to at least one of the following pieces of information: 1. the bandwidth part in an activated state in the one component carrier; 2. the control channel resource group; or 3. the set of search space groups.

In this embodiment, the determined control channel candidate should satisfy the features described below.

In the one time unit, a demodulation reference signal of the control channel candidate monitored by the first communication node and a reference signal associated with a spatial receive parameter selected in the conflict solution for spatial receive parameters of the multiple control channel candidates in the time unit satisfy a quasi co-location relationship with respect to one type of quasi co-location parameters.

Additionally/Alternatively, if in the one time unit, a demodulation reference signal of at least one control channel candidate and a reference signal associated with a spatial receive parameter selected in the conflict solution for spatial receive parameters of the multiple control channel candidates do not satisfy a quasi co-location relationship with respect to one type of quasi co-location parameters, the first communication mode does not monitor the control channel candidate.

In this embodiment, the control channel candidate satisfies at least one of the features described below.

Feature 11: Each control channel resource group of multiple control channel resource groups includes at least one control channel candidate to be monitored.

Feature 12: Each set of search space groups of multiple sets of search space groups includes at least one control channel candidate to be monitored.

Feature 13: Each bandwidth part of multiple activated bandwidth parts in one component carrier includes at least one control channel candidate to be monitored.

In this embodiment, the determined control channel candidate to be monitored satisfies at least one of the features described below.

Feature 21: Control channel candidates monitored in the one time unit are allocated in multiple control channel resource groups according to a predetermined proportion.

Feature 22: Control channel candidates monitored in the one time unit are allocated in multiple sets of search space groups according to a predetermined proportion.

Feature 23: Control channel candidates monitored in the one time unit are allocated in multiple activated bandwidth parts in one component carrier according to a predetermined proportion.

Feature 24: An allocation of control channel candidates monitored in the one time unit in multiple control channel resource groups is determined according to the conflict solution for the spatial receive filter parameters of the multiple control channel candidates in the one time unit.

Feature 25: An allocation of control channel candidates monitored in the one time unit in multiple sets of search space groups is determined according to the conflict solution for the spatial receive filter parameters of the multiple control channel candidates in the one time unit.

Feature 26: An allocation of control channel candidates monitored in the one time unit in multiple activated bandwidth parts in the one component carrier is determined according to the conflict solution for the spatial receive filter parameters of the multiple control channel candidates in the one time unit.

In this embodiment, the control channel resource group to which the control channel resource belongs may be determined according to a frequency domain bandwidth where the control channel resource is located. The frequency domain bandwidth includes at least one of the following: a component carrier or a bandwidth part.

In this embodiment, control channels in the one time unit satisfy at least one of the features described below.

Feature 31: The number of control channels in the one time unit is greater than a predetermined threshold number of control channels.

Feature 32: The number of control channels in the one time unit is greater than or equal to the number of determined control channel candidates to be monitored in the one time unit.

According to this embodiment of the present disclosure, the first communication node determines the control channel candidate to be monitored in the one time unit according to at least one of the following pieces of information: the bandwidth part in an activated state in the one component carrier, the control channel resource group, the set of search space groups, the quasi co-location reference signal configuration information of the control channel candidate in the one time unit, or the conflict solution for the spatial receive filter parameters of the multiple control channel candidates in the one time unit; and then, the control information is monitored on the determined control channel candidate to be monitored. In this way, when multiple TRPs serve one terminal in a beam mechanism, the effectiveness of blind detections of control channels by the terminal is ensured, and it is effectively supported that the multiple TRPs provide the one terminal with effective services in the beam mechanism.

Embodiment Thirteen

In this embodiment, a terminal (that is, a first communication node) determines a control channel candidate to be monitored in one time unit according to at least one of the following pieces of information: a bandwidth part in an activated state in one component carrier, a control channel resource group, a set of search space groups, quasi co-location reference signal configuration information of a control channel candidate in the one time unit, or a conflict solution for spatial receive filter parameters of multiple control channel candidates in the one time unit.

Then, control information is monitored on the determined control channel candidate to be monitored.

Further, a conflict exists among the spatial receive filter parameters of the multiple control channel candidates in the time unit in at least one of the cases described below.

Demodulation reference signals of multiple control channels in the time unit do not satisfy a QCL relationship with respect to spatial receive parameters.

In the time unit, demodulation reference signals of multiple control channels overlapping with each other in time domain do not satisfy a QCL relationship with respect to spatial receive parameters. The demodulation reference signals of the multiple control channels not satisfying the QCL relationship with respect to the spatial receive parameters includes that: quasi co-location reference signals of the demodulation reference signals of the multiple control channels with respect to spatial receive filter parameters do not satisfy a QCL relationship. Not satisfying the quasi co-location relationship indicates that multiple control channels have different receive beams on a terminal side. When the terminal can emit only one receive beam in one time unit or one time domain symbol, it is necessary to perform a selection and discard on the multiple receive beams.

Multiple control channel candidates in the time unit are unable to be received by the first communication node simultaneously.

In the time unit, multiple control channel candidates overlapping with each other in time domain are unable to be received by the first communication node simultaneously. The multiple control channel candidates being unable to be received by the first communication node simultaneously includes that: demodulation reference signals of the multiple control channel candidates cannot be received by the first communication node simultaneously, and/or quasi co-location reference signals of the multiple control channel candidates with respect to spatial receive parameters cannot be received by the first communication node simultaneously.

Further, in the one time unit, a demodulation reference signal of the control channel candidate monitored by the first communication node and a reference signal associated with a spatial receive parameter selected in the conflict solution for the spatial receive parameters of the multiple control channel candidates in the one time unit satisfy a quasi co-location relationship with respect to one type of quasi co-location parameters.

Additionally/Alternatively, if a demodulation reference signal of one control channel candidate in the one time unit and a reference signal associated with a spatial receive parameter selected in the conflict solution for the spatial receive parameters of the multiple control channel candidates in the time unit do not satisfy a quasi co-location relationship with respect to one type of quasi co-location parameters, the first communication mode does not monitor the control channel candidate.

For example, in a conflict between receive beams, a part of receive beams is used, and a control channel candidate corresponding to another receive beam is discarded; or in a conflict between receive beams, a part of receive beams is used, and a receive beam of a control channel candidate corresponding to a discarded receive beam is changed to a receive beam selected in the conflict solution.

Further, at least one of the features described below is satisfied.

Each control channel resource group of multiple control channel resource groups includes at least one control channel candidate to be monitored.

Each set of search space groups of multiple sets of search space groups includes at least one control channel candidate to be monitored.

Each bandwidth part of multiple bandwidth parts activated in one component carrier includes at least one control channel candidate to be monitored.

For example, in FIGS. 3 and 13, different TRPs correspond to different CORESET groups/different search space groups/BWPs, and when a conflict exists between beams of control channel candidates and/or the number of control channels is greater than the terminal capability, each TRP reserves a part of control channel candidates, thus ensuring that each TRP can maintain operations with the terminal.

Further, control channel candidates monitored in the one time unit are allocated in multiple control channel resource groups according to a predetermined proportion.

Control channel candidates monitored in the one time unit are allocated in multiple sets of search space groups according to a predetermined proportion.

Control channel candidates monitored in the one time unit are allocated in multiple activated bandwidth parts in the one component carrier according to a predetermined proportion.

For example, in FIGS. 3 and 13, different TRPs correspond to different CORESET groups/different search space groups/BWPs, and when a conflict exists between beams of control channel candidates and/or the number of control channels is greater than the terminal capability, the selection and discard of control channel candidates among TRPs depends on the above predetermined proportion. Specifically, each TRP may reserves a part of control channel candidates, thus ensuring that each TRP can maintain operations with the terminal, or only a TRP having greater performance of reaching the terminal is reserved to communicate with the terminal.

Further, the control channel resource group to which the control channel resource belongs is determined according to a frequency domain bandwidth where the control channel resource is located. The frequency domain bandwidth includes at least one of the following: a component carrier or a bandwidth part. For example, control channel resources included in one CC/BWP belong to one control channel resource group.

The number of control channels in the one time unit is greater than a predetermined threshold. Here, it is to be noted that a control channel in the one time unit is a control channel that is in the one time unit and obtained according to configuration information. For example, it is obtained that slot n includes eight control channels according to the configuration information, but the terminal can monitor only six control channels at most, so it is necessary to discard two control channels, and the determined control channel candidates to be monitored are six control channels of the eight control channels.

The number of control channels in one time unit is greater than or equal to the number of determined control channel candidates to be monitored in the one time unit. A control channel included in the time unit is a control channel that is included in the one time unit and obtained according to configuration information of the base station. For example, it is determined, according to the configuration information, that eighty control channels are included in one time unit. However, the terminal capability is limited, the terminal can monitor only forty-four control channel candidates in the one time unit, and then, it is necessary to determine how to select forty-four control channels from the eighty control channels in the one time unit.

Further, if in the one time unit, not only a conflict exists between beams of control channels, but also the number of control channels exceeds a predetermined value, then a beam conflict solution (that is, selecting a part of quasi co-location reference signal sets from multiple quasi co-location reference signal sets) is first determined. For example, two receive beams are selected from four receive beams, and control channels corresponding to the other two receive beams are not monitored. If the number of control channels corresponding to the selected receive beams does not exceed a predetermined value, the control channels corresponding to the selected receive beams are determined as the control channels to be monitored by the terminal, and these control channels are no longer discarded. When the number of control channels corresponding to the selected receive beams exceeds the predetermined value, the control channel to be monitored is further selected according to the control channel resource group/search space group/BWP information above. Alternatively, when a conflict exists between beams of control channels, it is first ensured that at least one control channel is to be monitored for each piece of different control channel resource groups/search space groups/BWP information, and then, the beam conflict solution for control channels is determined. For example, each TRP includes two receive beams and there are four receive beams in total, while the terminal can only emit two receive beams, and then two receive beams need to correspond to two TRPs instead of one TRP. Certainly, two receive beams selected by the terminal may be from only one TRP.

Embodiment Fourteen

This embodiment provides a control channel monitoring method. The method includes the steps described below.

A load of a first-type control information format is determined according to at least one of the following pieces of information: a time unit where the first-type control information format is located, the number of types of loads associated with the first-type control information format, the total number of types of loads corresponding to M types of control information formats, signaling information, a bandwidth part where a signal scheduled by the first-type control information format is located, or a component carrier where a signal scheduled by the first-type control information format is located.

In this embodiment, the control information format is a DCI format.

Further, the number of types of loads associated with the first-type control information format is determined according to at least one of the following pieces of information:
the number of bits corresponding to a bandwidth part indicator field in the first-type control information format;
the number of bits corresponding to a component carrier indicator field in the first-type control information format;
the number of bandwidth parts included in a bandwidth part set corresponding to a bandwidth part indicator field in the first-type control information format;
the number of component carriers included a component carrier set corresponding to a component carrier indicator field in the first-type control information format; or
a parameter configuration of each bandwidth part included in a bandwidth part set corresponding to a bandwidth part indicator field in the first-type control information format.

In this embodiment, a parameter configuration of one bandwidth part includes at least one of the following:
configuration information of a resource occupied by the bandwidth part, a parameter configuration of a signal in the bandwidth part;
a parameter configuration of each component carrier included in the component carrier set corresponding to the component carrier indicator field in the first-type control information format;
the number of component carriers where multiple search spaces are located, where the first-type control information format is located in the multiple search spaces;
the number of bandwidth parts where multiple search spaces are located, where the first-type control information format is located in the multiple search spaces;
the number of configurations of one type of parameters in multiple control channel resources where the first-type control channel format is located;
the number of configurations of one type of parameters in multiple search spaces where the first-type control channel format is located; or
a difference among the number of bits included by multiple types of loads corresponding to the first-type control channel format.

Further, the first-type control channel information format satisfies at least one of the conditions described blow in different time units.

The first-type control channel information format has different loads in different time units.

The first-type control channel information format has different numbers of types of loads in different time units.

Figure 26:
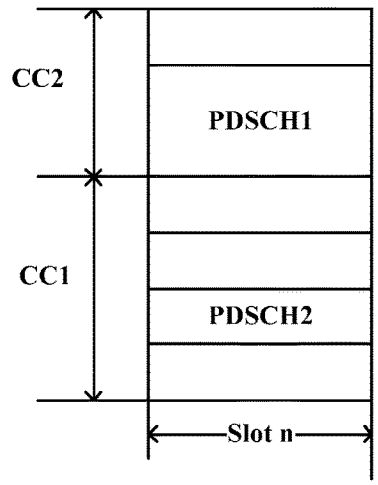
FIG. 26 is a schematic diagram of scheduling two physical downlink shared channels (PDSCHs) of two CCs according to embodiment fourteen of the present disclosure.
Figure 27:
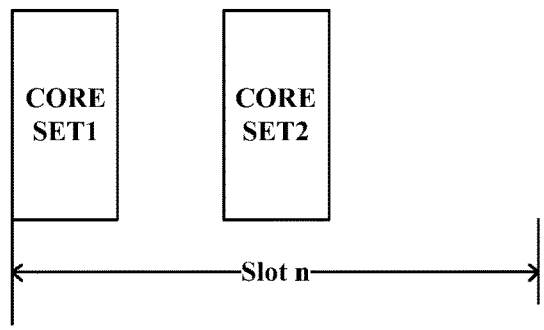
FIG. 27 is a schematic diagram of a control resource set (CORESET) where downlink control information (DCI) 1_1 is located according to embodiment fourteen of the present disclosure.

As shown in FIG. 26, two PDSCHs in two CCs may be scheduled through DCI1_1. First PDSCH1 is scheduled through DCI1_1, and PDSCH2 is scheduled through second DCI1_1. Information included in the first DCI1_1 needs to be understood through parameters configured in CC1. Information included in the second DCI1_1 needs to be understood through parameters configured in CC2. For example, a frequency domain resource notification field in the first DCI1_1 needs to be understood through a frequency domain resource of a BWP included in CC1, and a frequency domain resource notification field in the second DCI1_1 needs be understood through a frequency domain resource of a BWP included in CC2. Since two BWPs may include different frequency domain resources, the number of bits required by frequency domain indicator fields in DCI1_1s is different, so that the number of types of loads in DCI1_1 in one slot may be 2. In another aspect, there are diverse parameters in a CORESET where DCI1_1 is located, for example, DCI included in CORESET1 is configured to include a TCI indicator field in CORESET1, and DCI included in CORESET 2 is configured to include no TCI indicator field in CORESET, as shown in FIG. 27. Therefore, the number of types of loads of DCI1_1 aggregated in the one slot is greater than 1. All the above factors affect the number of types of loads of one DCI1_1, so the number of types of loads/the number of loads of DCI1_1 is different in different time units.

In this embodiment, the control information format may be monitored according to the determined load.

Further, the load of the first-type control information format satisfies at least one of the features described below.

When the number of types of loads associated with the first-type control information format in a time unit is less than or equal to a first predetermined threshold, the number of types of loads of the first-type control information format in the time unit is greater than or equal to 1.

When the number of types of loads associated with the first-type control information format in a time unit is greater than a second predetermined threshold, a first load of the first-type control information format in the time unit is adjusted to a second load.

In this embodiment, the first load may be adjusted to the second load in one of the following modes: the first load is adjusted to the second load by adding 0, and/or the first load is adjusted to the second load by truncation.

When the number of types of loads associated with the first-type control information format in a time unit is greater than a third predetermined threshold, the number of types of loads of the first-type control information format in the time unit is adjusted to a predetermined value.

It is to be noted that the adjustment to a predetermined value represents that F1 types of loads are adjusted to F2 types of loads by adjusting the first load to the second load. F2 is an integer less than or equal to F1.

When the total number of types of loads corresponding to M types of control information formats in a time unit is less than or equal to a fourth predetermined threshold, the number of types of loads of the first-type control information format in the time unit is greater than or equal to 1.

When the total number of types of loads corresponding to M types of control information formats in a time unit is greater than a fifth predetermined threshold, a third load of the first-type control information format in the time unit is adjusted to a fourth load.

It is to be noted that the third load may be adjusted to the fourth load in one of the following modes: the third load is adjusted to the fourth load by adding 0, and/or the third load is adjusted to the fourth load by truncation.

When the total number of types of loads corresponding to M types of control information formats in a time unit is greater than a sixth predetermined threshold, the number of types of loads of the first-type control information format in the time unit is adjusted to a predetermined type value.

The first load and the second load are two types of loads of the first-type control information format in the time unit. The third load and the fourth load are two types of loads of the first-type control information format in the time unit.

For example, when the number of types of loads of DCI1_1 included in one slot is greater than or equal to 2, the loads of DCI1_1 need to be adjusted to two types of loads. The specific adjustment modes are described below.

A large load is truncated into small loads, or 0 is added to a small load to be a large load, thus reducing the load degree of blind detections by the terminal. However, when the number of types of loads of DCI1_1 included in the one slot is less than 2, the loads of DCI1_1 do not need to be adjusted.

Alternatively, when the number of types of loads of all DCI types (including DCI1_1, DCI0_1, DCI1_0 and DCI0_0) included in one slot is greater than or equal to 4, DCI1_1 needs to be adjusted to two types of loads, thus reducing the load degree of blind detections by the terminal. However, when the total number of types of loads of the all DCI types included in the one slot is less than 4, the loads of DCI1_1 do not need to be adjusted. In this case, the number of types of loads of DCI1_1 may be greater than 2. For example, in the one slot, the terminal needs to monitor only DCI1_1 without monitoring other DCI format types.

Further, loads of one type of control information formats satisfy at least one of the features described below.

When the number of types of loads associated with the first-type control information format is less than or equal to a seventh predetermined threshold, the number of types of loads of the first-type control information format is greater than or equal to 1.

When the number of types of loads associated with the first-type control information format is greater than an eighth predetermined threshold, the first load of the first-type control information format is adjusted to the second load.

When the number of types of loads associated with the first-type control information format is greater than a ninth predetermined threshold, the number of types of loads of the first-type control information format is adjusted to a predetermined value.

When the total number of types of loads corresponding to the M types of control information formats is less than or equal to a tenth predetermined threshold, the number of types of loads of the first-type control information format is greater than or equal to 1.

When the total number of types of loads corresponding to the M types of control information formats is greater than an eleventh predetermined threshold, the third load of the first-type control information format is adjusted to the fourth load.

When the total number of types of loads corresponding to the M types of control information formats is greater than a twelfth predetermined threshold, the number of types of loads of the first-type control information format is adjusted to a predetermined value.

The first load and the second load are two types of loads of the first-type control information format in the time unit. The third load and the fourth load are two types of loads of the first-type control information format in the time unit.

The number of types of loads associated with the one type of control information formats is the number of types of loads corresponding to multiple search spaces where the one type of control information formats is located in one bandwidth part.

In FIGS. 26 and 27, whether to adjust loads of one type of DCI formats included in one time unit is determined according to whether the number of types of loads of DCI1_1 in the time unit is greater than a predetermined value, or whether the number of types of loads of all DCI formats included in the time unit is greater than a predetermined value. In another implementation of this embodiment, whether to adjust loads of one type of DCI formats is determined according to whether the number of types of loads of one type of DCI formats needing to be monitored by the terminal in multiple time units included in a certain time period is greater than a predetermined value, or whether the number of types of loads of M types of DCI formats needing to be monitored in the multiple time units is greater than a predetermined value.

Further, the number of types of loads is less than a predetermined value, but the absolute value of the difference between numbers of bits included by different loads is less than a predetermined value. One type of DCI formats does not necessarily have multiple types of loads, and only one type of loads is used. Therefore, the saving of DCI loads is very limited, and the load degree of blind detections by the terminal is increased.

Further, the step in which the load of the first-type control information format is determined according to signaling information includes the steps described below.

The signaling information includes determination mode information of the load of the first-type control information format; and/or the signaling information includes indication information, where the indication information indicates whether to determine the load of the first-type control information format according to first information. The first information includes at least one of the following pieces of information: a time unit where the first-type control information format is located, the number of types of loads associated with the first-type control information format, or the total number of types of loads corresponding to the M types of control information formats.

That is, whether to determine the load of the one type of control information formats in the above modes is determined according to the signaling information. When it is notified that the load is determined according to the first information, the above modes may be used for the determination. When the load is not determined according to the first information, an agreed rule may be used. For example, one type of control information formats has only one type of loads in all time units.

Further, the loads of the M types of control information formats satisfy at least one of the features described below.

The M types of control channel formats are M types of control channel formats needing to be monitored by a first communication node in one time unit.

The M types of control channel formats are M types of control channel formats needing to be monitored by a first communication node in one bandwidth of one time unit.

The M types of control channel formats are M types of control channel formats needing to be monitored by a first communication node in a bandwidth part.

The first communication node is a communication node for monitoring the M types of control channel formats.

Further, in one bandwidth part of the time unit, the load of the first-type control information format is determined in at least one of the modes described below.

When the number of configurations of one type of parameters in multiple control channel resources where the first-type control information format is located is greater than a predetermined parameter configuration value, the first load of the first-type control information format is adjusted to the second load. The first load is obtained according to a first configuration of the one type of parameters in a first control channel resource. The second load is obtained according to a second configuration of the one type of parameters in a second control channel resource. For example, if all CORESETs are configured to include no TCI, there is only one type of loads; if a part of the all CORESETs is configured to include a TCI and a part of the all CORESETs is configured to include no TCI, there may be two types of loads.

When the number of frequency domain bandwidths where D signals scheduled through the first-type control information format are located is a predetermined number E of frequency domain bandwidths, the number of types of loads of the first-type control information format is greater than a predetermined value caused by different configurations of signals in different bandwidths. For example, multiple scheduled CCs have different configurations, but when loads caused by configurations of the multiple CCs are the same, the number of loads does not increase as the number of CCs increasing.

Embodiment Fifteen

Figure 28:
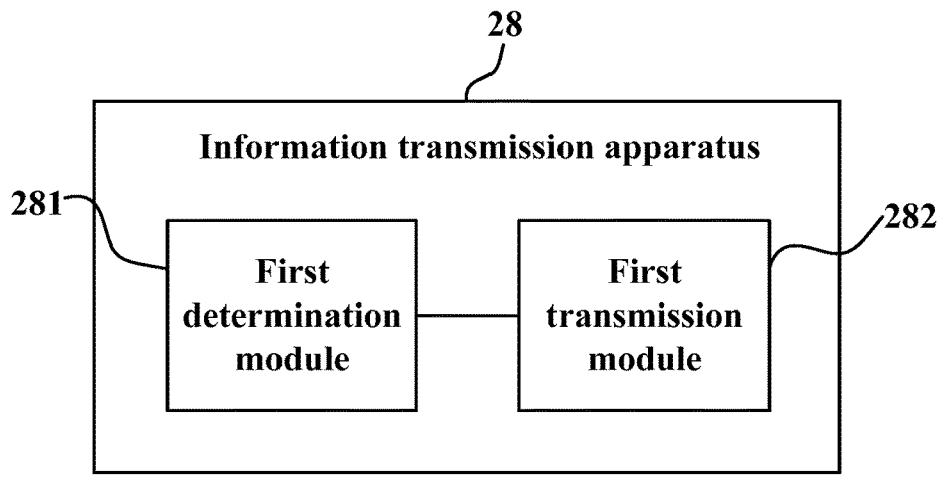
FIG. 28 is a structural diagram of an information transmission apparatus according to embodiment fifteen of the present disclosure.

This embodiment provides an information transmission apparatus. It is to be noted that the information transmission apparatus in this embodiment may be applied to a terminal or a TRP (for example, a base station). Referring to FIG. 28, FIG. 28 shows an information transmission apparatus 28 according to this embodiment. The apparatus includes a first determination module 281 and a first transmission module 282.

The first determination module 281 is configured to determine N bandwidth parts each of which is in an activated state.

It is to be understood that in this embodiment, the first determination module 281 may select N bandwidths meeting a predetermined requirement from all BWPs and activate the N bandwidths, to determine the N BWPs each of which is in an activated state. Alternatively, the terminal and/or the TRP agree that the N bandwidth parts each of which is in an activated state need to satisfy an agreed requirement.

The first transmission module 282 is configured to transmit a channel and/or signal on the N activated bandwidth parts.

It is to be understood that in this embodiment, the transmitted channel essentially refers to a channel signal. For example, the transmission of a control channel is essentially the transmission of a control channel signal.

Additionally/Alternatively, the first determination module 281 is configured to determine D control channel resource groups.

It is to be understood that in this embodiment, the first determination module 281 may select D control channel resource groups meeting a predetermined requirement from all control channel resource groups.

The first transmission module 282 is configured to detect control information in the D control channel resource groups, and transmit a channel and/or signal according to control information which is detected.

It is further to be understood that in this embodiment, transmitting the channel and/or signal includes sending the channel and/or signal, and/or receiving the channel and/or signal.

In this embodiment, the N bandwidth parts and/or the D control channel resource groups should satisfy at least one of the features described below.

Feature 1: The N bandwidth parts satisfy a first-type predetermined condition.

Feature 2: The D control channel resource groups satisfy a second-type predetermined condition.

Feature 3: N bandwidth parts triggered by control information in different control channel resource groups of the D control channel resource groups satisfy the first-type predetermined condition.

Feature 4: D1 types of channels and/or signals satisfy a third-type predetermined condition.

Here, it is to be noted here that different types of channels and/or signals of the D1 types of channels and/or signals belong to different bandwidth parts of the N bandwidth parts, and/or different types of channels and/or signals of the D1 types of channels and/or signals are scheduled by control information in different control channel resource groups of the D control channel resource groups.

Particularly, it is to be noted that one bandwidth part usually has one type of channels and/or signals. That is, D1 types of channels and/or signals usually correspond to D1 bandwidth parts. Therefore, in this embodiment, D1 may be less than or equal to N.

In this embodiment, the signals include one or more of the following signals: a reference signal, a synchronization signal, a channel signal or the like. The channels include one or more of the following channels: a control channel, a data channel, a random access channel or the like.

In this embodiment, one signal belongs to only one bandwidth part. In the N bandwidth parts, signals in different bandwidth parts are different.

In this embodiment, the first-type predetermined condition includes at least one of conditions described below.

Condition 11: The N bandwidth parts belong to one CC.

Condition 12: An overlap exists between frequency domain resources occupied by two bandwidth parts of the N bandwidth parts.

It is to be noted that in this embodiment, the overlap may be a complete overlap or a partial overlap. In the case of the complete overlap, a difference set of the frequency domain resources occupied by the two bandwidth parts is empty. In the case of the partial overlap, a difference set of the frequency domain resources occupied by the two bandwidth parts is nonempty.

Condition 13: Frequency domain spacing between two bandwidth parts of the N bandwidth parts satisfies a fourth-type predetermined condition.

In this embodiment, the fourth-type predetermined condition includes at least one of conditions 131 to 134 described below.

Condition 131: Among the two bandwidth parts, spacing between the highest frequency domain position of a low frequency domain bandwidth part and the lowest frequency domain position of a high frequency domain bandwidth part is less than or equal to a first predetermined threshold.

Condition 132: Among the two bandwidth parts, spacing between the lowest frequency domain position of a low frequency domain bandwidth part and the highest frequency domain position of a high frequency domain bandwidth part is less than or equal to a second predetermined threshold.

Condition 133: Among the two bandwidth parts, spacing between the highest frequency domain position of a low frequency domain bandwidth part and the lowest frequency domain position of a high frequency domain bandwidth part is greater than a third predetermined threshold.

Condition 134: Among the two bandwidth parts, spacing between the lowest frequency domain position of a low frequency domain bandwidth part and the highest frequency domain position of a high frequency domain bandwidth part is greater than a fourth predetermined threshold.

It is to be noted that the first predetermined threshold, the second predetermined threshold, the third predetermined threshold and the fourth predetermined threshold may be preset by an engineer according to actual needs or after a large number of experimental analyses. The first predetermined threshold may be less than the second predetermined threshold, and the third predetermined threshold may be less than the fourth predetermined threshold. Meanwhile, the first predetermined threshold may be greater than the third predetermined threshold, and the second predetermined threshold may be greater than the fourth predetermined threshold.

Condition 14: A union of the N bandwidth parts is a subset of a predetermined bandwidth part.

Condition 15: A sub-carrier spacing configuration of the N bandwidth parts satisfies a fifth-type predetermined condition.

In this embodiment, the fifth-type predetermined condition may be that: the number of different pieces of sub-carrier spacing in the N bandwidth parts is less than or equal to N1, where N1 is a positive integer less than or equal to N.

For example, in the N bandwidth parts, each bandwidth part needs to be configured with a respective piece of sub-carrier spacing. In this case, the number of different sub-carriers configured for the N bandwidth parts should be less than or equal to N1.

Condition 16: Cyclic prefixes of the N bandwidth parts satisfy a sixth-type predetermined condition.

In this embodiment, the sixth-type predetermined condition may be that: the number of different types of cyclic prefixes in the N bandwidth parts is less than or equal to N2, where N2 is a positive integer less than or equal to N For example, in the N bandwidth parts, each bandwidth part needs to be configured with a respective type of cyclic prefix, but the number of different types of cyclic prefixes configured for the N bandwidth parts should be less than or equal to N2.

Condition 17: Slot structure indication information of the N bandwidth parts satisfies a seventh-type predetermined condition.

In this embodiment, the seventh-type predetermined condition may include at least one of conditions 171 to 173 described below.

Condition 171: The N bandwidth parts comply with the same piece of slot structure indication information.

It is to be noted that in this embodiment, the slot structure indication information includes an SFI, and a slot structure notified through high layer common information tdd-UL-DL-ConfigurationCommon, tdd-UL-DL-Configuration-Common2 or dedicated signaling tdd-UL-DL-ConfigDedicated. The specific signaling meanings can refer to protocols 38.331 and 38.213.

Condition 172: An intersection of a resource occupied by a downlink transmission domain of one bandwidth part of the N bandwidth parts and a resource occupied by an uplink transmission domain of another bandwidth part of the N bandwidth parts is empty.

Here, it is to be noted that, specifically, in the N bandwidth parts, an intersection of a resource occupied by a downlink transmission domain of one bandwidth part and a resource occupied by an uplink transmission domain of any one bandwidth part of the remaining (N−1) bandwidth parts is empty. Alternatively, in the N bandwidth parts, an intersection of a resource occupied by a downlink transmission domain of one bandwidth part and a resource occupied by an uplink transmission domain of at least one bandwidth part of the remaining (N−1) bandwidth parts is empty.

Condition 173: In the N bandwidth parts, an intersection of a resource occupied by a reserved domain of one bandwidth part and a resource occupied by a transmission domain of a channel and/or signal of another bandwidth part is empty.

Here, it is to be noted that, specifically, in the N bandwidth parts, an intersection of a resource occupied by a reserved domain of one bandwidth part and a resource occupied by a transmission domain of a channel and/or signal of any one bandwidth part of the remaining (N−1) bandwidth parts is empty. Alternatively, in the N bandwidth parts, an intersection of a resource occupied by a reserved domain of one bandwidth part and a resource occupied by a transmission domain of a channel and/or signal of at least one bandwidth part of the remaining (N−1) bandwidth parts is empty.

It is further to be noted that in this embodiment, two bandwidth parts of the N bandwidth parts may be any two bandwidth parts of the N bandwidth parts, or two specific bandwidth parts of the N bandwidth parts.

In this embodiment, the second-type predetermined condition includes at least one of the conditions described below.

Condition 21: An intersection of resources occupied by the D control channel resource groups is empty.

Condition 22: Multiple pieces of control information in the D control channel resource groups need to satisfy a preset condition.

Condition 23: Multiple pieces of indicator information of bandwidth parts that are each in an activated state in the same time unit and indicated by control information in different control channel resource groups of the D control channel resource groups needs to satisfy a preset agreed condition.

In this embodiment, the preset agreed condition includes that bandwidth parts that are each in an activated state in the same time unit and indicated by the control information in different control channel resource groups are the same.

Condition 24: The number of bits included in a bandwidth part indicator field in control information in D2 control channel resource groups is determined according to the number of bandwidth parts configured in a component carrier.

Condition 25: The number of bits included in a bandwidth part indicator field in control information in D3 control channel resource groups is not determined according to the number of bandwidth parts configured in a component carrier.

Condition 26: D4 control channel resource groups include control information in a predetermined format.

Condition 27: D5 control channel resource groups include no control information in a predetermined format.

Condition 28: Slot structures indicated by different control channel resource groups of the D control channel resource groups need to satisfy an agreed condition.

In this embodiment, the agreed condition includes that: an intersection of a resource occupied by a downlink transmission domain indicated by control information in one control channel resource group and a resource occupied by an uplink transmission domain indicated by control information in another control channel resource group is empty; and/or an intersection of a resource occupied by a reserved domain indicated by control information in one control channel resource group and a resource occupied by a transmission domain indicated by control information in another control channel resource group is empty.

Condition 29: A control channel resource group where a control channel resource is located is determined according to a frequency domain bandwidth or a frequency domain bandwidth group where the control channel resource is located.

In this embodiment, the frequency domain bandwidth includes a component carrier and/or a bandwidth part.

The D2 control channel resource groups, the D3 control channel resource groups, the D4 control channel resource groups and the D5 control channel resource groups belong to the D control channel resource groups. D2, D3, D4, D5 are each an integer less than or equal to D, and/or the sum of D2 and D3 is equal to the value of D, and/or the sum of D4 and D5 is equal to the value of D.

In this embodiment, the third-type predetermined condition includes at least one of the conditions described below.

Condition 31: An association relationship exists among parameter configurations of the D1 types of channels and/or signals.

Condition 32: The sum of transmit power of the D1 types of channels and/or signals does not exceed a predetermined first threshold.

Condition 33: The sum of receive power of the D1 types of channels and/or signals does not exceed a predetermined second threshold.

Condition 34: When the sum of transmit power of the D1 types of channels and/or signals exceeds a predetermined power value, power priorities of the D1 types of channels and/or signals are determined according to signaling information and/or an agreed rule.

Condition 35: When the sum of transmit power of the D1 types of channels and/or signals exceeds a predetermined power value, a power scaling weight of each type of channels and/or signals of the D1 types of channels and/or signals is determined according to signaling information or an agreed rule.

Condition 36: An intersection of different bandwidth parts corresponding to the D1 types of channels and/or signals is nonempty.

Condition 37: An overlap exists among resources occupied by the D1 types of channels and/or signals.

Condition 38: When an overlap exists between resources occupied by two types of channels and/or signals of the D1 types of channels and/or signals, the two types of channels and/or signals have the same transmission direction.

It is to be noted that the transmission direction includes a downlink transmission and an uplink transmission (that is, reception and sending).

It is to be understood that in this embodiment, the resource includes at least one of a time domain resource, a frequency domain resource, a code domain resource, a spatial domain resource or a port resource.

It is further to be understood that when different types of channels and/or signals of the D1 types of channels and/or signals belong to different bandwidth parts of the N bandwidth parts, the third-type predetermined condition may include at least one of the conditions described below.

Condition 39: Resources occupied by control channels in different bandwidth parts of the N bandwidth parts are orthogonal.

Condition 40: An intersection of resources occupied by reference signal sets in different bandwidth parts of the N bandwidth parts is empty.

It is to be noted that the D1 types of channels and/or signals satisfy the third-type predetermined condition in at least one of the cases described below.

When an intersection of D1 bandwidth parts is nonempty, the D1 types of channels and/or signals may satisfy the third-type predetermined condition. Each bandwidth part of the D1 bandwidth parts includes one type of channels and/or signals of the D1 types of channels and/or signals.

It is to be noted that when the intersection of the D1 bandwidth parts is empty, the D1 types of channels and/or signals may not satisfy the third-type predetermined condition.

It is further to be noted that since types of channels and/or signals in different bandwidth parts are different, the D1 bandwidth parts are bandwidth parts corresponding to the D1 types of channels and/or signals.

When an overlap exists among resources occupied by the D1 types of channels and/or signals, the D1 types of channels and/or signals may satisfy the third-type predetermined condition.

It is to be noted that no overlap exists among resources occupied by the D1 types of channels and/or signals, the D1 types of channels and/or signals may not satisfy the third-type predetermined condition.

It is to be noted that in this embodiment, an association relationship existing between parameter configurations of two signals represents at least one of the following features: 1. a parameter configuration of one signal may be obtained according to a parameter configuration of another signal; or 2. certain parameter combinations of the two signals are not desired to occur simultaneously (for example, when parameter 1 of a first signal is configured to a first value, parameter 2 of a second signal is not desired to be configured to a second value, where parameter 1 and parameter 2 may be the same type of parameters, or different types of parameters).

In this embodiment, when the association relationship exists among the parameter configurations of the D1 types of channels and/or signals, the association relationship includes at least one of the relationships described below.

Relationship 1: A parameter configuration value range of one type of channels and/or signals of the D1 types of channels and/or signals is obtained according to a parameter configuration value of another certain type of channels and/or signals of the D1 types of channels and/or signals.

It is to be noted that a certain type of channels and/or signals of the D1 types of channels and/or signals may be any one type of channels and/or signals of the D1 types of channels and/or signals, or one certain specific type of channels and/or signals of the D1 types of channels and/or signals.

Relationship 2: In the D1 types of channels and/or signals, parameters which are in different types of channels and/or signals and belong to a first predetermined parameter type set have the same configuration.

Relationship 3: In the D1 types of channels and/or signals, parameters which are in different types of channels and/or signals and belong to a second predetermined parameter type set have the same configuration.

It is to be noted that the second predetermined parameter type set includes a spatial domain parameter. A spatial domain parameter of a channel and/or signal is represented by a reference signal. A spatial transmit filter parameter and/or spatial receive filter parameter of a channel and/or signal is acquired according to a spatial transmit filter parameter and/or spatial receive filter parameter of a reference signal.

Relationship 4: In the D1 types of channels and/or signals, agreed combination values of parameters which are in different types of channels and/or signals belong to a third predetermined parameter type set are unable to occur simultaneously.

It is to be noted that in this embodiment, an agreed combination represents one parameter type. When a first type of channels and/or signals is configured to value A, a configuration value of a second type of channels and/or signals cannot be configured to B. A combination configuration is composed of a configuration of the parameter type in the first type of channels and/or signals and a configuration of the parameter type in the second type of channels and/or signals.

Divisions of precoding resource groups associated with different types of channels and/or signals are aligned.

Here, it is to be noted that the alignment represents that one precoding group in a first bandwidth part includes one precoding group in a second bandwidth part, and/or one precoding group in the second bandwidth part includes one precoding group in the first bandwidth part.

Relationship 5: An intersection of the resources occupied by the D1 types of channels and/or signals is nonempty.

Relationship 6: The D1 types of channels and/or signals are located in the same time unit.

It is to be noted that in this embodiment, the first predetermined parameter type set includes at least one of the following: sub-carrier spacing information, cyclic shift length information, time domain information of a demodulation reference signal, sequence information of a demodulation reference signal, time domain configuration information corresponding to a control channel signal, information about whether transmission precoding is enabled, or a scrambling sequence generation parameter of a reference signal.

The second predetermined parameter type set includes at least one of the following: a spatial domain parameter of a channel and/or signal, or a scrambling sequence generation parameter of a channel.

The third predetermined parameter type set includes a spatial domain parameter of a channel and/or signal.

It is further to be noted that in this embodiment, the parameter includes at least one of the following: sub-carrier spacing information, cyclic shift length information, time domain information of a demodulation reference signal, sequence information of a demodulation reference signal, time domain configuration information corresponding to a control channel signal, or information about whether transmission precoding is enabled.

That is, when the parameter includes at least one of the above, an association relationship may exist among parameter configurations.

In this embodiment, the N bandwidth parts may satisfy at least one of the features described below.

Feature 21: At least one bandwidth part of the N bandwidth parts is in a periodic activated state. A period of the periodic activated state is greater than or equal to one time unit.

In this embodiment, the periodic activated state refers to that a bandwidth part is automatically in an activated state in time units having periodic spacing according to a set period. For example, there are time units [1-10] having a period of 2 (that is, there are two time units in each period), and a bandwidth part is activated in the first time unit in each period. That is, the bandwidth part is activated in time units 1, 3, 5, 7 and 9, and is not activated in time units 2, 4, 6, 8 and 10.

Feature 22: At least one bandwidth part of the N bandwidth parts is in a semi-persistent activated state.

Here, it is to be noted that the semi-persistent activated state refers to that the bandwidth part controls, according to received signaling, whether the bandwidth part is in an activated state or a non-activated state. It is further to be noted that in the semi-persistent activated state, when the bandwidth part being in an activated state essentially refers to that the bandwidth part is automatically in a periodic activated state.

Feature 23: At least one primary bandwidth part exists in the N bandwidth parts.

Feature 24: At least one secondary bandwidth part exists in the N bandwidth parts.

It is to be noted that in this embodiment, when a primary bandwidth part and/or a secondary bandwidth part exists in the N bandwidth parts, the bandwidth parts should satisfy at least one of the features described below.

Feature 31: A channel and/or signal scheduled by a control channel of the primary bandwidth part is in the secondary bandwidth part.

Feature 32: The primary bandwidth part is in a time unit set in an activated state. The minimum spacing between time units is less than or equal to a predetermined spacing value.

Feature 33: Time units where the primary bandwidth part is located are consecutive.

Feature 34: At least one primary bandwidth part exists in one time unit.

Feature 35: At least one primary bandwidth part exists in a time unit except for a time slot where the primary bandwidth part is switched.

Feature 36: The secondary bandwidth part is in an activated state periodically. One period of the secondary bandwidth part includes one or more one time units.

Feature 37: The primary bandwidth part includes a common control channel.

Feature 38: The secondary bandwidth part includes no common control channel.

Feature 39: The secondary bandwidth part includes only a dedicated control channel.

Feature 310: The secondary bandwidth part is in a semi-persistent activated state. The secondary bandwidth part is in an activated state periodically after activated. One period of the secondary bandwidth part includes one or more time units.

Feature 311: The secondary bandwidth part includes no control channel.

Feature 312: A period and/or period offset of the secondary bandwidth part in an activated state is determined according to a predetermined rule or received signaling information.

Feature 313: The primary bandwidth part and the secondary bandwidth part in the N bandwidth parts are determined according to a predetermined rule or received signaling information.

For example, it is determined which bandwidth part is a primary bandwidth part and which bandwidth part is a secondary bandwidth part through a BWP ID. For example, a bandwidth part with the minimum ID is the primary bandwidth part, and a bandwidth part with the maximum ID is the secondary bandwidth part.

Feature 314: When a CC to which the N bandwidth parts belong is a primary CC of one CC group, the primary bandwidth part exists in the N bandwidth parts.

It is to be noted that in this embodiment, the primary CC of one CC group represents a PCell in an MCG and/or an SPCell in an SCG.

Feature 315: When a CC to which the N bandwidth parts belong is a secondary CC of one CC group, the N bandwidth parts are all secondary bandwidth parts.

For example, there is certainly a primary bandwidth part in the PCell in the MCG, and there may be no primary bandwidth part in other CCs in the MCG. There is certainly a primary bandwidth part in the PSCell in the SCG, and there may be no primary bandwidth part in other CCs in the SCG.

Feature 316: When a CC to which the N bandwidth parts belong is an activated CC, the primary bandwidth part exists in the N bandwidth parts.

Feature 317: When a CC to which the N bandwidth parts belong to a non-activated CC, the N bandwidth parts are all secondary bandwidth parts.

Feature 318: Dynamic control information transmitted in the primary bandwidth part carries dynamic switching indication information of the primary bandwidth part.

Feature 319: Dynamic control information transmitted in the primary bandwidth part carries dynamic switching indication information of the secondary bandwidth part.

Feature 320: The number of bits of a bandwidth part indicator field in dynamic control information transmitted in the primary bandwidth part is determined according to the number of bandwidth parts configured in a CC.

Feature 321: The number of bits of a bandwidth part indicator field in dynamic control information transmitted in the primary bandwidth part is determined according to the number of bandwidth part sets configured in a CC.

Feature 322: The number of bits of a bandwidth part indicator files in dynamic control information transmitted in the secondary bandwidth part is 0.

In this embodiment, the N bandwidth parts may further satisfy at least one of the features described below.

Feature 41: An association relationship exists between a first bandwidth part of the N bandwidth parts and a second bandwidth part of the N bandwidth parts.

In this embodiment, the association relationship existing between the first bandwidth part and the second bandwidth part represents at least one of the following pieces of information that: 1. one bandwidth part may be determined according to the other bandwidth part; 2. activation signaling of one bandwidth part also activates the other bandwidth part, or 3. certain parameter combinations of the two bandwidth parts are not desired to occur simultaneously.

Feature 42: A first bandwidth part of the N bandwidth parts belongs to a first bandwidth part group.

Feature 43: A second bandwidth part of the N bandwidth parts belongs to a second bandwidth part group.

Feature 44: A first bandwidth part of the N bandwidth parts shares one set of parameter configurations of a channel and/or signal with a second bandwidth part of the N bandwidth parts.

Feature 45: A predetermined configuration condition is satisfied between a parameter configuration of a channel and/or signal carried on a first bandwidth part of the N bandwidth parts and a parameter configuration of a channel and/or signal carried on a second bandwidth part of the N bandwidth parts.

Feature 46: A first bandwidth part and a second bandwidth part are triggered by one piece of signaling information.

Here, it is to be noted that in this embodiment, the first bandwidth part and the second bandwidth part are two bandwidth parts of the N bandwidth parts. The first bandwidth part and the second bandwidth part may be any two bandwidth parts of the N bandwidth parts. The first bandwidth part and the second bandwidth part may be two specific bandwidth parts of the N bandwidth parts.

In this embodiment, the determined N bandwidth parts may satisfy at least one of the features described below.

Feature 51: The N bandwidth parts are each in an activated state in the same time unit.

Feature 52: The N bandwidth parts belong to one CC.

Feature 53: In the N bandwidth parts, an intersection of time resources of different bandwidth parts in an activated state exists.

Feature 54: In the N bandwidth parts, a channel and/or signal scheduled by a control channel in at least one bandwidth part is in another bandwidth part.

Feature 55: The N bandwidth parts have the same information transmission direction. The information transmission direction includes a downlink transmission direction and an uplink transmission direction.

Feature 56: When N is greater than a predetermined value, a parameter of a parameter set corresponding to each bandwidth part of the N bandwidth parts has a fixed value.

In this embodiment, the parameter having a fixed value represents that the parameter value is not dynamically notified in DCI. In addition, the parameter set includes at least one of the following parameters: a scrambling sequence parameter of a demodulation reference signal, or the number of time domain symbols included in a group of consecutive time domain symbols occupied by a demodulation reference signal.

Feature 57: An information field included in control signaling in one bandwidth part of the N bandwidth parts is determined according to the value of N.

For example, when the value of N is greater than or equal to a predetermined value, the signaling information includes no predetermined indication information. When the value of N is less than a predetermined value, the signaling information includes predetermined indication information. The information field may be determined according to the predetermined indication information.

Feature 58: Physical layer dynamic control information in M1 bandwidth parts of the N bandwidth parts may carry dynamic switching indication information of a bandwidth part.

Feature 59: Physical layer dynamic physical layer control information in M2 bandwidth parts of the N bandwidth parts cannot carry dynamic switching indication information of a bandwidth part.

Particularly, it is to be noted that in this embodiment, M1 and M2 are each a positive integer less than or equal to N, and the sum of M1 and M2 is less than or equal to N.

Particularly, it is to be noted that in this embodiment, when a bandwidth part corresponding to a bandwidth part index indicated by a physical layer control channel belongs to the N bandwidth parts, a bandwidth part switching process is not started. When the bandwidth part corresponding to the bandwidth part index indicated by the physical layer control channel does not belong to the N bandwidth parts, the bandwidth part switching process is started.

In addition, when the information transmission apparatus provided in this embodiment is applied to the terminal, since the terminal may receive information from multiple TRPs, the total number of control channel candidates may exceed the blind detection capability of the terminal in blind detections. In view of this, this embodiment provides control channel candidate screening modes described below that the information transmission apparatus may use in the case where the total number of control channel candidates exceeds the blind detection capability of the terminal.

Mode one: When the total number of control channel candidates included in the N bandwidth parts is greater than a first predetermined value, control channel candidates in M bandwidth parts may be monitored according to a predetermined rule and/or signaling information.

It is to be noted that M is an integer less than or equal to N, and the M bandwidth parts are M bandwidth parts of the N bandwidth parts. In addition, it is to further be noted that the number of control channel candidates in the M bandwidth parts should be less than or equal to the first predetermined value.

In addition, in this embodiment, the N bandwidth parts may be located in the same time unit.

Mode two: when the total number of control channel candidates included in the D control channel resource groups is greater than a second predetermined value, control channels in D4 control channel resource groups are monitored according to a predetermined rule and/or signaling information.

It is to be noted that the D4 control channel resource groups are D4 control channel resource groups of the D control channel resource groups.

In this embodiment, the selected M bandwidth parts should satisfy at least one of the features described below.

Feature 61: The M bandwidth parts have higher priorities in the N bandwidth parts.

Feature 62: The number of control channel candidates monitored in each bandwidth part of the M bandwidth parts is less than or equal to the number of candidate channels configured in each bandwidth part.

Feature 63: The M bandwidth parts are from Q bandwidth part groups.

It is to be noted that Q is a positive integer less than or equal to M, and the N bandwidth parts belong to a set of bandwidth parts in the Q bandwidth part groups.

Feature 64: Control channel candidates that need to be monitored are allocated in the M bandwidth parts according to a predetermined proportion.

In this embodiment, when the M bandwidth parts satisfy that the M bandwidth parts are from the Q bandwidth part groups, an intersection of each bandwidth part group of the Q bandwidth part groups and a set composed of the M bandwidth parts is nonempty; and/or at least one bandwidth part of the M bandwidth parts belongs to one bandwidth part group of the Q bandwidth part groups.

In this embodiment, at least one of the factors described below may further be determined according to signaling information and/or an agreed rule.

1. A respective time unit set corresponding to each bandwidth part of the N bandwidth parts may be determined.

In this embodiment, the bandwidth part is in an activated state in the time unit set corresponding to the bandwidth part.

2. A correspondence between T1 time unit sets and T1 bandwidth part sets may be determined.

In this embodiment, at least one bandwidth part in each bandwidth part set of the T1 bandwidth part sets is in an activated state in a respective time unit set corresponding to each bandwidth part set; and/or the N bandwidth parts belong to a bandwidth part set corresponding to time units where the N bandwidth parts are located.

3. It may be determined whether a bandwidth part indicator field in dynamic control information in one bandwidth part is acquired according to the number of bandwidth parts configured in a component carrier.

In this embodiment, when the bandwidth part indicator field cannot be acquired according to the number of bandwidth parts configured in the component carrier, the number of bits of the bandwidth part indicator field in the dynamic control information is 0. When the bandwidth part indicator field can be acquired according to the number of bandwidth parts configured in the component carrier, the number of bits of the bandwidth part indicator field in the dynamic control information is acquired according to the number of bandwidth parts configured in the component carrier.

4. It may be determined whether a bandwidth part indicator field in dynamic control information in one bandwidth part is acquired according to the number of bandwidth part sets configured in a component carrier.

In this embodiment, when the bandwidth part indicator field cannot be acquired according to the number of bandwidth part sets configured in the component carrier, the number of bits of the bandwidth part indicator field in the dynamic control information is 0. When the bandwidth part indicator field can be acquired according to the number of bandwidth part sets configured in the component carrier, the number of bits of the bandwidth part indicator field in the dynamic control information is acquired according to the number of bandwidth part sets configured in the component carrier.

5. It may be determined whether one bandwidth part includes dynamic control information in a predetermined format.

In this embodiment, the dynamic control information in the predetermined format may include DCI format 2_0.

6. It may be determined whether a bandwidth part indicator filed of dynamic control information in one control channel resource group is acquired according to the number of bandwidth parts configured in a component carrier.

7. It may be determined whether a bandwidth part indicator field in dynamic control information in one control channel resource group is acquired according to the number of bandwidth part sets configured in a component carrier.

In this embodiment, the information transmission apparatus further performs the following operations: determining whether a bandwidth part indicator field in dynamic control information in one bandwidth part needs to be obtained according to the number of bandwidth parts configured in a CC; and/or, determining whether a bandwidth part indicator field in dynamic control information in one bandwidth part needs to be obtained according to the number of bandwidth part sets configured in a CC.

In this embodiment, the determined N bandwidth parts should be from X CCs (where X is a positive integer greater than 1), and/or the determined N bandwidth parts should be from X1 CC groups (where X1 is a positive integer greater than 1). Further, bandwidth part groups where the N bandwidth parts are located may be determined according to CCs where the N bandwidth parts are located.

In addition, in this embodiment, the determined D control channel resource groups should be from Y CCs and/or Y1 CC groups (where Y and Y1 are each a positive integer greater than 1).

In this embodiment, the CCs should satisfy at least one of the conditions described below.

Condition 41: An overlap exists between a frequency domain resource of a first CC and a frequency domain resource of a second CC.

It is to be noted that the first CC and the second CC are two CCs of the X CCs. The two CCs may be any two CCs of the X CCs, or two specific CCs of the X CCs.

Feature 42: A CC in a first CC group has an associated CC in a second CC group.

It is to be noted that the first CC group and the second CC group are two CC groups of the X1 CC groups. The two CC groups may be any two CC groups of the X1 CC groups or two specific CC groups of the X1 CC groups. X1 is less than or equal to X and greater than or equal to 2.

Additionally/Alternatively, the first CC group and the second CC group are two CC groups of the Y1 CC groups. The two CC groups may be any two CC groups of the Y1 CC groups or two specific CC groups of the Y1 CC groups. Y1 is less than or equal to Y and greater than or equal to 2.

Additionally/Alternatively, an association relationship exists between parameter configurations of two CCs associated with each other.

Condition 43: Bandwidth parts included in one CC group belong to one bandwidth part group.

Condition 44: Bandwidth parts included in different CC groups belong to different bandwidth part groups.

Condition 45: Bandwidth parts included in one CC belong to one bandwidth part group.

Condition 46: Bandwidth parts included in different CCs belong to different bandwidth part groups.

Condition 47: An association relationship exists between parameter configurations of two CCs of the X CCs.

It is to be noted that the parameter configuration above may include slot structure indication information.

Condition 48: An association relationship exists between parameter configurations of two CCs of the Y CCs.

It is to be noted that the parameter configuration above may include slot structure indication information.

In this embodiment, the D control channel resource groups correspond to D reference signal sets. Each control channel resource group of the D control channel resource groups corresponds to a respective reference signal set.

In this embodiment, the reference signal set satisfies at least one of the features described below.

Feature 71: The reference signal set is an uplink reference signal set used as a codebook.

Feature 72: The reference signal set is an uplink reference signal set used as a non codebook.

Feature 73: The reference signal set is an aperiodic reference signal set.

Feature 74: A difference set of every two reference signal sets is nonempty.

Feature 75: A reference signal associated with a spatial transmit filter parameter of a demodulation reference signal scheduled by control information in one control channel resource group of the D control channel resource groups belongs to a reference signal set corresponding to the one control channel resource group.

Feature 76: A reference signal associated with a spatial receive filter parameter of a demodulation reference signal scheduled by control information in one control channel resource group of the D control channel resource groups belongs to a reference signal set corresponding to the one control channel resource group.

Feature 77: A reference signal scheduled by control information in one control channel resource group of the D control channel resource groups belongs to a reference signal set corresponding to the one control channel resource group.

In addition, it is further to be noted that in practical applications, there may be a conflict among transmitted channels and/or signals. For example, each TRP of two TRPs corresponds to a respective CC of two CCs, and there is an overlap in frequency domain between the two CCs. In this case, there may be a conflict between uplink signals scheduled by the two TRPs.

In this embodiment, when a conflict exists among resources occupied by Z types of channels and/or signals, Z1 types of channels and/or signals of the Z types of channels and/or signals may be transmitted according to signaling information and/or an agreed rule; and/or when a conflict exists among resources occupied by the Z types of channels and/or signals, a third type of channels and/or signals may be transmitted according to signaling information and/or an agreed rule. The third type of channels and/or signals is obtained according to parameter information of at least two types of channels and/or signals of the Z types of channels and/or signals, and/or an intersection of the third type of channels and/or signals and the Z types of channels and/or signals is empty.

Here, it is to be noted that Z is a positive integer greater than or equal to 2, and Z1 is a positive integer less than or equal to Z. In addition, different types of channels and/or signals of the Z types of channels and/or signals belong to different bandwidth parts of the determined N bandwidth parts (that is, different types of channels and/or signals of the Z types of channels and/or signals are carried on different bandwidth parts of the determined N bandwidth parts); and/or different types of channels and/or signals of the Z types of channels and/or signals are scheduled by control information in different control channel resource groups in Z control channel resource groups of the determined D control channel resource groups; and/or the Z types of channels include at least one of the following channel types: a data channel or a control channel, the Z types of signals include at least one of the following signal types: a measurement reference signal, a demodulation reference signal, a random access signal, a synchronization signal, a resource request signal or a phase-tracking signal.

In this embodiment, the conflict includes at least one of the conflicts described below.

Conflict 1: An overlap exists among time domain resources occupied by the Z types of channels and/or signals.

Conflict 2: An overlap exists among frequency domain resources occupied by the Z types of channels and/or signals.

Conflict 3: An overlap exists among demodulation reference signal resources included by the Z types of channels.

Conflict 4: An overlap exists among reference signal resources included by the Z types of signals.

Conflict 5: An overlap exists among spatial domain resources occupied by the Z types of channels and/or signals.

Conflict 6: Spatial domain resources occupied by the Z types of channels and/or signals are unable to be transmitted on a first communication node simultaneously.

Conflict 7: An overlap exists among antenna resources occupied by the Z types of channels and/or signals.

Conflict 8: Antenna resources occupied by the Z types of channels and/or signals are unable to be transmitted on a first communication node simultaneously.

Conflict 9: Group information to which reference signals corresponding to spatial domain resources occupied by the Z types of channels and/or signals belong does not satisfy an agreed condition.

Particularly, it is to be noted that in one specific implementation of this embodiment, when any one of conflicts 1 to 9 exists, it may be regarded that a conflict exists among resources occupied by the Z types of channels and/or signals. However, in another specific implementation of this embodiment, only when an overlap exists among time domain resources and/or frequency domain resources occupied by the Z types of channels and/or signals, and an overlap exists among spatial domain resources occupied by the Z types of channels and/or signals, it may be regarded that a conflict exists among resources occupied by the Z types of channels and/or signals; and/or, only when an overlap exists among time domain resources and/or frequency domain resources occupied by the Z types of channels and/or signals, and spatial domain resources occupied by the Z types of channels and/or signals are unable to be transmitted on the first communication node simultaneously, it may be regarded that a conflict exists among resources occupied by the Z types of channels and/or signals; and/or only when an overlap among exists time domain resources and/or frequency domain resources occupied by the Z types of channels and/or signals, and an overlap exists among antenna resources occupied by the Z types of channels and/or signals, it may be regarded that a conflict exists among resources occupied by the Z types of channels and/or signals.

Here, it is to be particularly noted that the first communication node is a communication node for transmitting the Z1 types of channels and/or signals.

For example, the Z types of channels and/or signals are uplink signals, the spatial domain resources of the Z types of channels and/or signals are indicated through an SRI. If at least Z SRS resources corresponding to the Z types of channels and/or signals indicated through the SRI belong to the same group but are for different SRSs, then it is indicated that the Z types of channels and/or signals cannot be sent simultaneously. If the at least Z SRS resources corresponding to the Z types of channels and/or signals indicated through the SRI belong to different groups, then it is indicated that the Z types of channels and/or signals can be sent simultaneously.

In another example of this embodiment, if SRS resources corresponding to the SRI belong to the same group, then it is indicated the Z types of channels and/or signals can be sent simultaneously. If the SRS resources corresponding to the SRI belong to different groups, then it is indicated that the Z types of channels and/or signals cannot be sent simultaneously.

Similarly, the Z types of channels and/or signals are downlink signals, the spatial domain resources of the Z types of channels and/or signals are indicated through a TCI. At least Z downlink reference signal or synchronization signal resources corresponding to the Z types of channels and/or signals indicated through the TCI belong to the same group, indicating that the Z types of channels and/or signals cannot be received simultaneously. On the contrary, the at least Z downlink reference signal or synchronization signal resources corresponding to the Z types of channels and/or signals indicated through the TCI belong to different groups, indicating that the Z types of channels and/or signals can be received simultaneously.

In another example of this embodiment, Z downlink reference signal/synchronization signal resources corresponding to the TCI belong to the same group, indicating that the Z types of channels and/or signals can be received simultaneously. The Z downlink reference signal/synchronization signal resources corresponding to the TCI belong to different groups, indicating that the Z types of channels and/or signals cannot be received simultaneously.

In this embodiment, the Z types of channels and/or signals satisfy at least one of the conditions described below.

Condition 51: A spatial domain resource occupied by one type of channels and/or signals of the Z types of channels and/or signals is represented by a reference signal. A spatial transmit filter parameter and/or spatial receive filter parameter of the one type of channels and/or signals is acquired according to a spatial transmit filter parameter and/or spatial receive filter parameter of the reference signal.

It is to be noted that in this embodiment, the one type of channels and/or signals of the Z types of channels and/or signals may be any one type of channels and/or signals of the Z types of channels and/or signals, or may be one certain specific type of channels and/or signals of the Z types of channels and/or signals.

Condition 52: A spatial domain resource occupied by one type of channels and/or signals of the Z types of channels and/or signals is represented by a reference signal. The reference signal and the one type of channels and/or signals satisfy a quasi co-location relationship with respect to one type of quasi co-location parameters.

Condition 53: The spatial domain resources occupied by the Z types of channels and/or signals being unable to be transmitted on the first communication node simultaneously includes that: multiple pieces of group information to which multiple reference signals associated with multiple spatial domain resources occupied by the Z types of channels and/or signals belong do not satisfy an agreed condition, and/or multiple reference signals associated with multiple spatial domain resources occupied by the Z types of channels and/or signals are the same reference signal.

In this embodiment, a reference signal resource included in a reference signal resource group may be indicated to the first communication node by a second communication node through signaling information, and/or may be fed back to the second communication node by the first communication node.

Condition 54: The spatial domain resources occupied by the Z types of channels and/or signals being unable to be transmitted on the first communication node simultaneously includes that: multiple reference signals associated with multiple spatial domain resources occupied by the Z types of channels and/or signals are unable to be transmitted on the first communication node simultaneously.

In this embodiment, at least one of the operations described below is further performed when a conflict exists.

1. The Z1 types of channels and/or signals are determined according to at least one of the following pieces of information: priorities of bandwidth parts associated with the Z types of channels and/or signals, priorities of control channel resource groups associated with the Z types of channels and/or signals, priorities of frequency domain bandwidth groups associated with the Z types of channels and/or signals, or priorities of CCs or CC groups associated with the Z types of channels and/or signals.

The Z1 types of channels and/or signals have higher priorities among the Z types of channels and/or signals.

2. At least one of the following pieces of information is determined according to the Z1 types of channels and/or signals: priorities of bandwidth parts associated with the Z types of channels and/or signals, priorities of control channel resource groups associated with the Z types of channels and/or signals, priorities of frequency domain bandwidth groups associated with the Z types of channels and/or signals, or priorities of CCs or CC groups associated with the Z types of channels and/or signals.

3. The Z1 types of channels and/or signals are determined according to at least one of the following pieces of information: whether bandwidth parts associated with the Z types of channels and/or signals are the same; whether control channel resource groups associated with the Z types of channels and/or signals are the same; whether frequency domain bandwidth groups associated with the Z types of channels and/or signals are the same; or whether CCs or CC groups associated with the Z types of channels and/or signals are the same.

4. The first communication node transmits none of channels and/or signals which are included in a difference set of the Z types of channels and/or signals and the Z1 types of channels and/or signals.

5. Parameter information, which belongs to a first predetermined parameter set and in Z2 types of channels and/or signals of the Z1 types of channels and/or signals, is adjusted. The Z1 types of channels and/or signals are sent according to the adjusted parameter information.

Z2 is a non-negative integer less than or equal to Z1. The parameter information in the first predetermined parameter set includes at least one of the following pieces of information: time advance information, sequence information, antenna information, demodulation reference signal information or the number of transmission code blocks.

6. Time advance information in Z2 types of channels and/or signals of the Z1 types of channels and/or signals is adjusted. The Z1 types of channels and/or signals are sent according to an adjusted power parameter. Z2 is a non-negative integer less than or equal to Z1.

In this embodiment, when a conflict exists among the resources occupied by the Z types of channels and/or signals, at least one of the operations described below is further performed.

1. When a conflict exists among the resources occupied by the Z types of channels and/or signals, the Z1 types of channels and/or signals of the Z types of channels and/or signals are transmitted according to signaling information and/or an agreed rule.

2. When a conflict exists among the resources occupied by Z types of measurement reference signals, the third type of channels and/or signals is transmitted according to signaling information and/or an agreed rule.

In this embodiment, parameter information of the third type of channels and/or signals is obtained according to configuration information of at least two types of channels and/or signals of the Z1 types of channels and/or signals of the Z types of channels and/or signals. The parameter information includes at least one of the following pieces of information: power information, time advance information, sequence information, antenna information or port information. In this embodiment, the parameter information of the third type of channels and/or signals may further be obtained according to signaling information and/or an agreed rule.

In this embodiment, the conflict existing among the resources occupied by the Z types of channels and/or signals includes that the Z types of channels and/or signals are associated with the same first information.

The first information includes at least one of the following: bandwidth parts associated with the Z types of channels and/or signals, control channel resource groups associated with the Z types of channels and/or signals, frequency domain bandwidth groups associated with the Z types of channels and/or signals, or CCs or CC groups associated with the Z types of channels and/or signals.

The Z types of channels include at least one of the following channel types: a data channel or a control channel. The Z types of signals include at least one of the following signal types: a measurement reference signal, a demodulation reference signal, a random access signal, a synchronization signal, a resource request signal or a phase-tracking signal.

In this embodiment, when an overlap exists among resources and/or reference signals occupied by the Z types of channels and/or signals, the Z types of channels and/or signals are associated with the same first information, a conflict occurs among the Z types of channels and/or signals, and Z1 is less than the value of Z; and/or, when an overlap exists among the resources occupied by the Z types of channels and/or signals, the Z types of channels and/or signals are associated with different first information, no conflict occurs among the Z types of channels and/or signals, and Z1 is equal to the value of Z.

It is to be noted that, the above resources include at least one of following resources: a time domain resource, a frequency domain resource or a spatial domain resource.

According to the information transmission apparatus provided in this embodiment of the present disclosure, the N bandwidth parts each of which is in an activated state are determined, and the channel and/or signal is transmitted on the N activated bandwidth parts; and/or the D control channel resource groups are determined, the control information is detected in the D control channel resource groups, and the channel and/or signal is transmitted according to control information which is detected. In this way, when multiple TRPs and/or terminals all transmit information, it can be effectively supported that multiple TRPs provide one terminal with effective services in a beam mechanism.

Embodiment Sixteen

Figure 29:
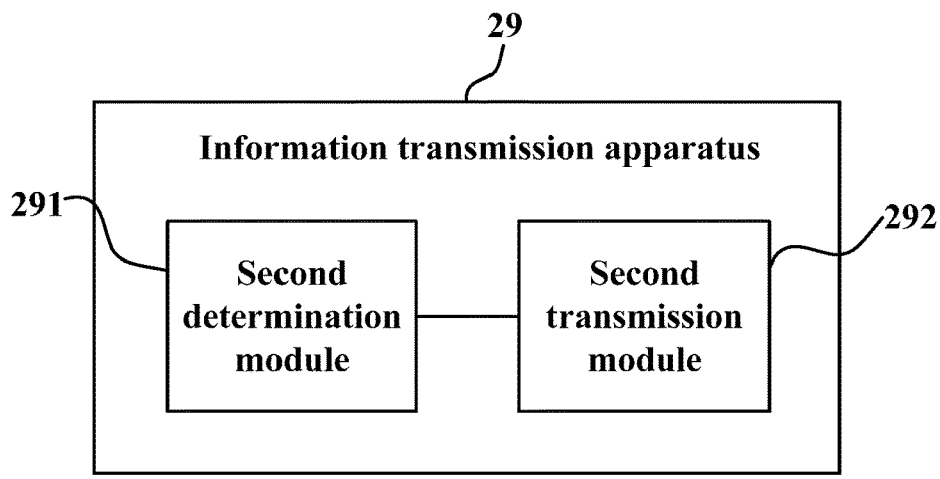
FIG. 29 is a structural diagram of an information transmission apparatus according to embodiment sixteen of the present disclosure.

This embodiment provides an information transmission apparatus. It is to be noted that in this embodiment, the information transmission apparatus may be applied to a terminal or a TRP (for example, a base station). Referring to FIG. 29, FIG. 29 shows an information transmission apparatus 29 according to this embodiment. The apparatus includes a second determination module 291 and a second transmission module 292.

The second determination module 291 is configured to determine a first resource and determine the number H of resource groups included in the first resource.

The second transmission module 292 is configured to transmit a channel and/or signal on the first resource according to the value of H.

The H resource groups correspond to H sets of configuration information of the channel and/or signal. The resource includes a time domain resource and/or a frequency domain resource.

In this embodiment, the second determination module 291 may determine the first resource according to acquired first control signaling. It is to be noted that the information transmission apparatus provided in this embodiment can be applied to the TRP (for example, the base station) or the terminal. When the apparatus is applied to the base station, the first control signaling may be generated by the base station. When the apparatus is applied to the terminal, the first control signaling may be sent to the terminal by the base station.

In this embodiment, the base station and/or the terminal has resources. The second determination module 291 may determine, according to the acquired first control signaling, which resources of the existing resources are used as first resources. For example, there are 100 resource blocks in the terminal originally, and the second determination module 291 may determine, according to the first control signaling, which resource blocks are the first resources.

It is to be noted that in this embodiment, a resource group refers to a group divided from the first resource, and the resource group is composed of at least one basic resource unit (for example, a resource block). For example, the first resource has 20 resource blocks numbered 1 to 20, and then resource blocks numbered 1 to 10 may be grouped into one resource group, and resource blocks numbered 11 to 20 may be grouped into one resource group.

In this embodiment, the H resource groups satisfy at least one of the features described below.

Feature 1: Each resource group of the H resource groups corresponds to respective K quasi co-location reference signal sets, and K groups of demodulation reference signals in each resource group correspond to the respective K quasi co-location reference signal sets corresponding to each resource group.

It is to be noted that K is a positive integer, and demodulation reference signals of a demodulation reference signal group and reference signals in a quasi co-location reference signal set corresponding to the demodulation reference signal group satisfy a quasi co-location relationship with respect to one type of quasi co-location parameters.

Feature 2: Each resource group of the H resource groups corresponds to a respective demodulation reference signal set. A channel in each resource group is transmitted on the respective demodulation reference signal set.

It is to be noted that one demodulation reference signal set includes K1 demodulation reference signal groups, where K1 is a positive integer.

Feature 3: Each resource group of the H resource groups corresponds to a respective channel. A frequency domain resource occupied by the respective channel belongs to each resource group.

Feature 4: The H resource groups correspond to H groups of ACK/NACK information. One group of ACK/NACK information includes a predetermined number of bits, and/or multiple pieces of information in one group of ACK/NACK information are jointly fed back.

Demodulation reference signals in one same demodulation reference signal group satisfy a quasi co-location relationship. Demodulation reference signals in different demodulation reference signal groups do not satisfy a quasi co-location relationship.

In this embodiment, the second determination module 291 may further acquire first control information and/or second control information; and determine, according to the first control information and/or second control information, division information and/or H pieces of configuration information of H resource groups included in the first resource. The first control information may be acquired before the first resource is determined. The second control information may be acquired before the number H of resource groups included in the first resource is determined.

In this embodiment, the value of H may be determined according to one or more of the following pieces of information: information indicated in the first control information, and/or parameter information required for decoding the first control information, and/or configuration information indicated in the first control information.

For example, the first control information may directly carry grouping information, and further, the value of H may be directly determined according to the grouping information.

It is to be noted that in this embodiment, the first control information satisfies at least one of the following features that: the first control information includes H1 pieces of resource group information; or the first control information includes H3 sets of configuration information.

The second control information satisfies at least one of the following features that: the second control information includes H2 pieces of resource group information; or the second control information includes H4 sets of configuration information.

H1, H2, H3 and H4 are each a non-negative integer.

Here, it is to be noted that the first control information and the second control information may be used for instructing the terminal or the TRP to divide resource groups. The resource group information here may refer to a division of resource groups. Meanwhile, since the H resource groups correspond to the H sets of configuration information of the channel and/or signal, that is, each set of configuration information corresponds to a respective resource group, the division of resource groups may be indicated by the configuration information.

In this embodiment, the configuration information includes at least one of the following pieces of information: a quasi co-location reference signal set of the channel, demodulation reference signal information of the channel, ACK/NACK information of the channel, information about the number of channels, or information about the signal.

According to this embodiment of the present disclosure, the first resource is determined; the number H of resource groups included in the first resource is determined; and the channel and/or signal is transmitted on the first resource according to the value of H. The H resource groups correspond to the H sets of configuration information of the channel and/or signal. The resource includes the time domain resource and/or frequency domain resource. Thus, when multiple TRPs and/or terminals all transmit information in this way, it can be effectively supported that multiple TRPs provide one terminal with effective services in a beam mechanism.

Embodiment Seventeen

Figure 30:
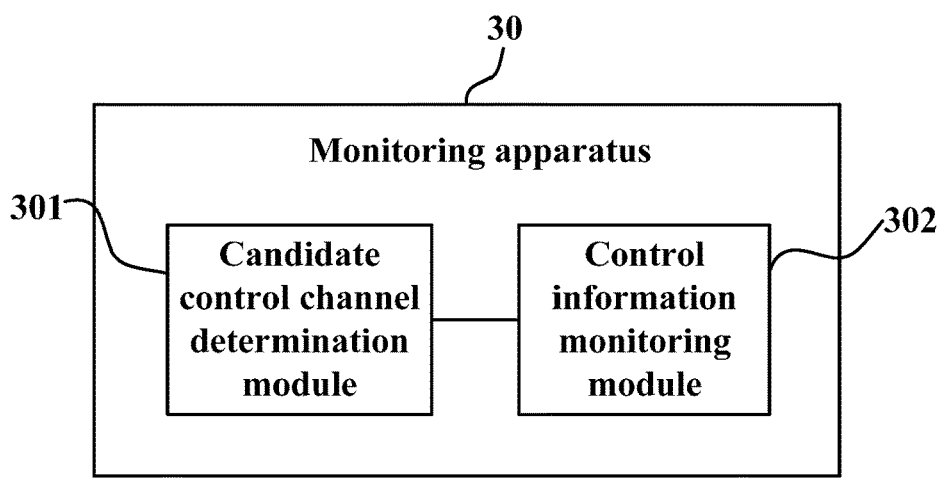
FIG. 30 is a structural diagram of a monitoring apparatus according to embodiment seventeen of the present disclosure.

This embodiment provides a monitoring apparatus. It is to be noted that the monitoring apparatus in this embodiment may be applied to a terminal. Referring to FIG. 30, FIG. 30 shows a monitoring apparatus 30 according to this embodiment. The apparatus includes a control channel candidate determination module 301 and a control information monitoring module 302.

The control channel candidate determination module 301 is configured to determine a control channel candidate to be monitored in one time unit according to at least one of the following pieces of information: a bandwidth part in an activated state in one component carrier, a control channel resource group, a set of search space groups, quasi co-location reference signal configuration information of a control channel candidate in the one time unit, or a conflict solution for spatial receive filter parameters of multiple control channel candidates in the one time unit.

The control information monitoring module 302 is configured to monitor control information on the determined control channel candidate to be monitored.

Here, it is to be noted that a conflict exists among the spatial receive filter parameters of the multiple control channel candidates in the time unit in any one of the cases described below.

1. Demodulation reference signals of the multiple control channels in the time unit do not satisfy a QCL relationship with respect to spatial receive parameters.
2. In the time unit, demodulation reference signals of multiple control channels overlapping with each other in time domain do not satisfy a QCL relationship with respect to spatial receive parameters.
3. Multiple control channels in the time unit are unable to be received by a first communication node simultaneously.
4. In the time unit, multiple control channels overlapping with each other in time domain are unable to be received by a first communication node simultaneously.

In this embodiment, the monitoring apparatus 30 determine the conflict solution for the spatial receive filter parameters of the multiple control channel candidates according to at least one of following pieces of information: 1. the bandwidth part in an activated state in the one component carrier; 2. the control channel resource group; or 3. the set of search space groups.

In this embodiment, the determined control channel candidate should satisfy the features described below.

In the one time unit, a demodulation reference signal of the control channel candidate monitored by the first communication node and a reference signal associated with a spatial receive parameter selected in the conflict solution for spatial receive parameters of the multiple control channel candidates in the time unit satisfy a quasi co-location relationship with respect to one type of quasi co-location parameters.

Additionally/Alternatively, if in the one time unit, a demodulation reference signal of at least one control channel candidate and a reference signal associated with a spatial receive parameter selected in the conflict solution for spatial receive parameters of the multiple control channel candidates do not satisfy a quasi co-location relationship with respect to one type of quasi co-location parameters, the first communication mode does not monitor the control channel candidate.

In this embodiment, the control channel candidate satisfies at least one of the features described below.

Feature 11: Each control channel resource group of multiple control channel resource groups includes at least one control channel candidate to be monitored.

Feature 12: Each set of search space groups of multiple sets of search space groups includes at least one control channel candidate to be monitored.

Feature 13: Each bandwidth part of multiple activated bandwidth parts in one component carrier includes at least one control channel candidate to be monitored.

In this embodiment, the determined control channel candidate to be monitored satisfies at least one of the features described below.

Feature 21: Control channel candidates monitored in the one time unit are allocated in multiple control channel resource groups according to a predetermined proportion.

Feature 22: Control channel candidates monitored in the one time unit are allocated in multiple sets of search space groups according to a predetermined proportion.

Feature 23: Control channel candidates monitored in the one time unit are allocated in multiple activated bandwidth parts in one component carrier according to a predetermined proportion.

Feature 24: An allocation of control channel candidates monitored in the one time unit in multiple control channel resource groups is determined according to the conflict solution for the spatial receive filter parameters of the multiple control channel candidates in the one time unit.

Feature 25: An allocation of control channel candidates monitored in the one time unit in multiple sets of search space groups is determined according to the conflict solution for the spatial receive filter parameters of the multiple control channel candidates in the one time unit.

Feature 26: An allocation of control channel candidates monitored in the one time unit in multiple activated bandwidth parts in the one component carrier is determined according to the conflict solution for the spatial receive filter parameters of the multiple control channel candidates in the one time unit.

In this embodiment, the control channel resource group to which the control channel resource belongs may be determined according to a frequency domain bandwidth where the control channel resource is located. The frequency domain bandwidth includes at least one of the following: a component carrier or a bandwidth part.

In this embodiment, control channels in the one time unit satisfy at least one of the features described below.

Feature 31: The number of control channels in the one time unit is greater than a predetermined threshold number of control channels.

Feature 32: The number of control channels in the one time unit is greater than or equal to the number of determined control channel candidates to be monitored in the one time unit.

According to this embodiment of the present disclosure, the control channel candidate to be monitored in the one time unit is determined according to at least one of the following pieces of information: the bandwidth part in an activated state in the one component carrier, the control channel resource group, the set of search space groups, the quasi co-location reference signal configuration information of the control channel candidate in the one time unit, or the conflict solution for the spatial receive filter parameters of the multiple control channel candidates in the one time unit; and then, the control information is monitored on the determined control channel candidate to be monitored. In this way, when multiple TRPs serve one terminal in a beam mechanism, the effectiveness of blind detections of control channels by the terminal is ensured, and it is effectively supported that the multiple provide the one terminal with effective services in the beam mechanism.

Embodiment Eighteen

Figure 31:
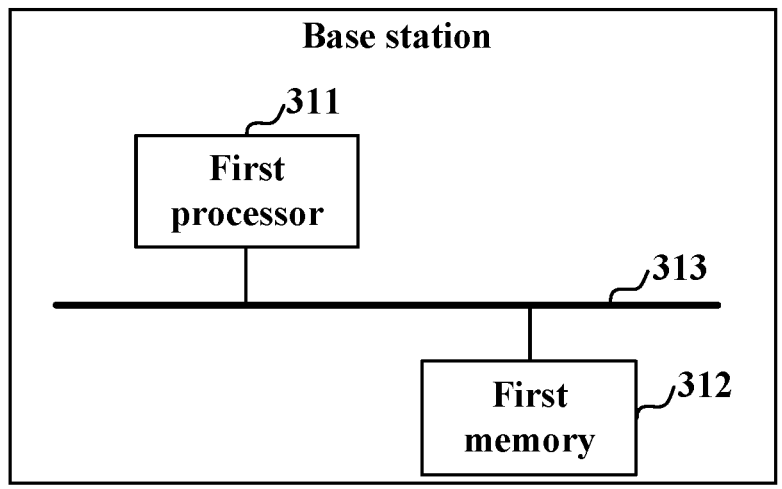
FIG. 31 is a structural diagram of a base station according to embodiment eighteen of the present disclosure.

This embodiment provides a base station. Referring to FIG. 31, the base station includes a first processor 311, a first memory 312 and a first communications bus 313.

The first communication bus 313 is configured to implement connection and communication between the first processor 311 and the first memory 312.

The first processor 311 is configured to execute one or more first programs stored in the first memory 312 to implement the information transmission method according to any one of embodiments one to eight.

Additionally/Alternatively, the first processor 311 is configured to execute one or more second programs stored in the first memory 312 to implement the information transmission method according to embodiment ten and/or embodiment eleven.

Figure 32:
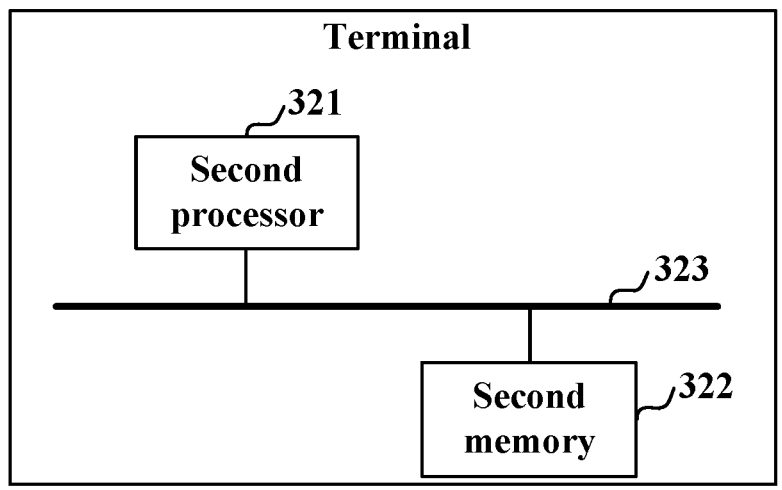
FIG. 32 is a structural diagram of a terminal according to embodiment eighteen of the present disclosure.

This embodiment provides a terminal. Referring to FIG. 32, the terminal includes a second processor 321, a second memory 322 and a second communications bus 323.

The second communication bus 323 is configured to implement connection and communication between the second processor 321 and the second memory 322.

The second processor 321 is configured to execute one or more third programs stored in the second memory 322 to implement the information transmission method according to any one of embodiments one to eight.

Alternatively, the second processor 321 is configured to execute one or more fourth programs stored in the second memory 322 to implement the information transmission method according to embodiment ten and/or embodiment eleven.

Alternatively, the second processor 321 is configured to execute one or more fifth programs stored in the second memory 322 to implement the information transmission method according to embodiment twelve and/or embodiment thirteen.

This embodiment further provides a storage medium. The storage medium includes volatile or nonvolatile, removable or non-removable media implemented in any method or technology for storing information (such as computer-readable instructions, data structures, computer program modules or other data). The storage medium includes, but is not limited to, a random access memory (RAM), a read-only memory (ROM), an electrically erasable programmable read only memory (EEPROM), a flash memory or other memory technologies, a compact disc read-only memory (CD-ROM), a digital versatile disc (DVD) or other optical disc storage, a magnetic cassette, a magnetic tape, disk storage or other magnetic storage apparatuses, or any other medium that may be used for storing desired information and that can be accessed by a computer.

In this embodiment, the storage medium stores computer executable instructions. The computer-executable instructions are executable by one or more processors to implement the steps of the information transmission method of any one of embodiments one to eight; and/or the steps of the information transmission method according to embodiment ten and/or embodiment eleven; and/or the steps of the information transmission method of embodiment twelve and/or embodiment thirteen. This is not repeated here.

It can be seen that those skilled in the art should understand that all or part of the steps of the method, and functional modules/units in the system and the apparatus disclosed above may be implemented as software (which may be implemented by computer program codes executable by a computing apparatus), firmware, hardware and appropriate combinations thereof. In the hardware implementation, the division of the functional modules/units mentioned above may not correspond to the division of physical components. For example, one physical component may have multiple functions, or one function or step may be performed jointly by several physical components. Some or all physical components may be implemented as software executed by a processor such as a central processing unit, a digital signal processor or a microcontroller, may be implemented as hardware, or may be implemented as an integrated circuit such as an application-specific integrated circuit.

In addition, as is known to those having ordinary skill in the art, a communication medium generally includes computer-readable instructions, data structures, computer program modules, or other data in modulated data signals such as carriers or other transmission mechanisms and may include any information delivery medium. Therefore, the present disclosure is not limited to any particular combination of hardware and software.

The above is a more detailed description of the embodiments of the present disclosure in conjunction with specific implementations, and the specific implementations of the present disclosure cannot be construed as being limited to the description. For those having ordinary skill in the art to which the present disclosure pertains, several simple deductions or substitutions may be made without departing from the concept of the present disclosure and should fall within the scope of the present disclosure.

What is claimed is:

1. An information transmission method, comprising:
receiving, by a terminal, a first control information from a base station;
determining a first frequency domain resource according to the first control information, wherein the first frequency domain resource is a physical resource blocks (PRB) set in one bandwidth part (BWP);
determining, by the terminal, H resource groups in the first frequency domain resource, wherein determining the H resource groups further comprises:
determining a value of H according to a number of sets of quasi co-location reference signal,
wherein each of the H resource groups corresponds to one of the sets of quasi co-location reference signal of one channel, the sets of quasi co-location reference signal are indicated by the first control information, H is a positive integer value; and
receiving at least one channel on at least one of the determined H resource groups.

2. The information transmission method of claim 1, wherein the first control information further indicates division information of the H resource groups in the first frequency domain resource, wherein the division information comprises information on grouping physical resource blocks (PRBs).

3. The information transmission method of claim 1, wherein there is no overlap between resources of the H resource groups.

4. An information transmission method, comprising:
transmitting, by a base station, a first control information to a terminal, wherein:
the first control information indicates: a first frequency domain resource and a number of sets of quasi co-location reference signal of at least one channel,
the first frequency domain resource is a physical resource blocks (PRB) set in one bandwidth part (BWP),
each of H resource groups in the first frequency domain resource corresponds to one of the sets of quasi co-location reference signal of one channel, the sets of quasi co-location reference signal are indicated by the first control information, H is a positive integer value,
a value of H is determined according to the sets of quasi co-location reference signal; and
transmitting, by the base station, at least one channel to the terminal on at least one of the H resource groups.

5. The information transmission method of claim 4, wherein the first control information further indicates division information of the H resource groups in the first frequency domain resource, wherein the division information comprises information on grouping physical resource blocks (PRBs).

6. The information transmission method of claim 4, wherein there is no overlap between resources between the H resource groups.

7. A terminal, comprising:
a receiver configured to receive a first control information from a base station; and
at least one processor configured to:
determine a first frequency domain resource according to the first control information, wherein the first frequency domain resource is a physical resource blocks (PRB) set in one bandwidth part (BWP);
determine H resource groups in the first frequency domain resource, wherein the at least one processor is configured to determine the H resource groups by:
determining a value of H according to a number of sets of quasi co-location reference signal,
wherein each of the H resource groups corresponds to one of the sets of quasi co-location reference signal of one channel, the sets of quasi co-location reference signal are indicated by the first control information, H is a positive integer value; and
receive at least one channel on at least one of the determined H resource groups.

8. The terminal of claim 7, wherein the first control information further indicates division information of the H resource groups in the first frequency domain resource, wherein the division information comprises information on grouping physical resource blocks (PRBs).

9. The terminal of claim 7, wherein there is no overlap between resources of the H resource groups.

10. A base station comprising:
a transceiver configured to:
transmit a first control information to a terminal, wherein:
the first control information indicates: a first frequency domain resource and a number of sets of quasi co-location reference signal of at least one channel,
the first frequency domain resource is a physical resource blocks (PRB) set in one bandwidth part (BWP),
each of H resource groups in the first frequency domain resource corresponds to one of the sets of quasi co-location reference signal of one channel, the sets of quasi co-location reference signal are indicated by the first control information,
H is a positive integer value,
a value of H is determined according to the sets of quasi co-location reference signal; and
transmit at least one channel to the terminal on at least one of the H resource groups.

11. The base station of claim 10, wherein the first control information further indicates division information of the H resource groups in the first frequency domain resource, wherein the division information comprises information on grouping physical resource blocks (PRBs).

12. The base station of claim 10, wherein there is no overlap between resources of the H resource groups.

* * * * *